(12) United States Patent
Wookey et al.

(10) Patent No.: US 8,577,761 B1
(45) Date of Patent: Nov. 5, 2013

(54) SYSTEM AND METHOD FOR DYNAMIC OFFERING TOPOLOGIES

(75) Inventors: Michael J. Wookey, Los Gatos, CA (US); Michael J. Gionfriddo, Colorado Springs, CO (US)

(73) Assignee: Oracle America, Inc., Redwood City, CA (US)

( * ) Notice: Subject to any disclaimer, the term of this patent is extended or adjusted under 35 U.S.C. 154(b) by 2308 days.

(21) Appl. No.: 11/326,549

(22) Filed: Jan. 5, 2006

Related U.S. Application Data

(63) Continuation-in-part of application No. 11/174,207, filed on Jun. 30, 2005.

(51) Int. Cl.
 *G06Q 40/00* (2012.01)
(52) U.S. Cl.
 USPC .............................................. 705/35; 717/168
(58) Field of Classification Search
 None
 See application file for complete search history.

(56) References Cited

U.S. PATENT DOCUMENTS

| | | | |
|---|---|---|---|
| 6,055,513 A * | 4/2000 | Katz et al. ........................ 705/26 |
| 6,336,138 B1 * | 1/2002 | Caswell et al. ................ 709/223 |
| 7,523,170 B1 * | 4/2009 | Allen et al. .................... 709/217 |
| 7,542,919 B1 * | 6/2009 | Mueller et al. .................. 705/16 |
| 7,627,498 B1 * | 12/2009 | Walker et al. .................... 705/26 |
| 2003/0097485 A1 * | 5/2003 | Horvitz et al. ................ 709/313 |
| 2003/0177173 A1 * | 9/2003 | Belimpasakis et al. ........ 709/203 |
| 2004/0002943 A1 * | 1/2004 | Merrill et al. ...................... 707/1 |
| 2005/0125520 A1 * | 6/2005 | Hanson et al. ................ 709/223 |
| 2005/0132348 A1 * | 6/2005 | Meulemans et al. .......... 717/168 |
| 2005/0132349 A1 * | 6/2005 | Roberts et al. ................ 717/168 |
| 2005/0132359 A1 * | 6/2005 | McGuire et al. .............. 717/175 |
| 2005/0132382 A1 * | 6/2005 | McGuire et al. .............. 719/311 |
| 2005/0203968 A1 * | 9/2005 | Dehghan et al. .............. 707/203 |
| 2005/0210459 A1 * | 9/2005 | Henderson et al. ........... 717/168 |
| 2006/0059481 A1 * | 3/2006 | Smith et al. ................... 717/173 |
| 2007/0143375 A1 * | 6/2007 | Tom et al. ...................... 707/204 |

OTHER PUBLICATIONS

Belsie, Laurent; Microsoft, IBM Race for Market; The Christian Science Monitor; vol. 84, Iss. 91, p. 7; Apr. 6, 1992.*
O'Connor et al.; Multimedia Era Draws Near; Calgary Herald; Nov. 11, 1991.*
Rosenberg, Ronald; Techno Bytes/Better Shop Early; Boston Globe; Nov. 1, 1983.*

* cited by examiner

*Primary Examiner* — Virpi Kanervo
(74) *Attorney, Agent, or Firm* — Marsh Fischmann & Breyfogle, LLP; Kent A. Lembke

(57) ABSTRACT

Methods, systems, and articles of manufacture consistent with the present invention provide for managing offerings in a data processing system having offering platform programs operatively connected to a distributed offering network. At least one is deployed offering via an offering platform program. A topology of offerings is created. It is determined whether there is an association between two or more of the offerings. When there is an association between two or more of the offerings, the association is included in the topology.

12 Claims, 52 Drawing Sheets

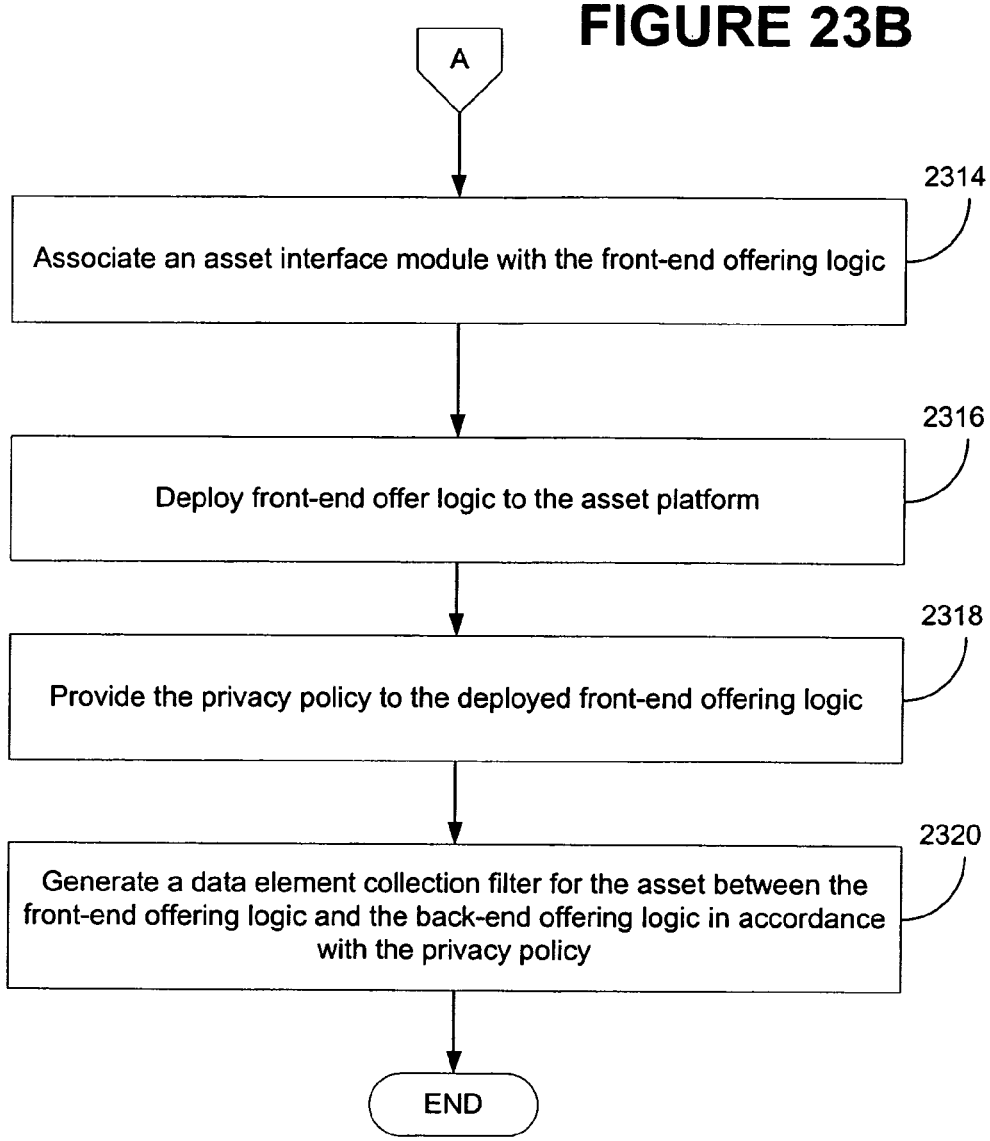

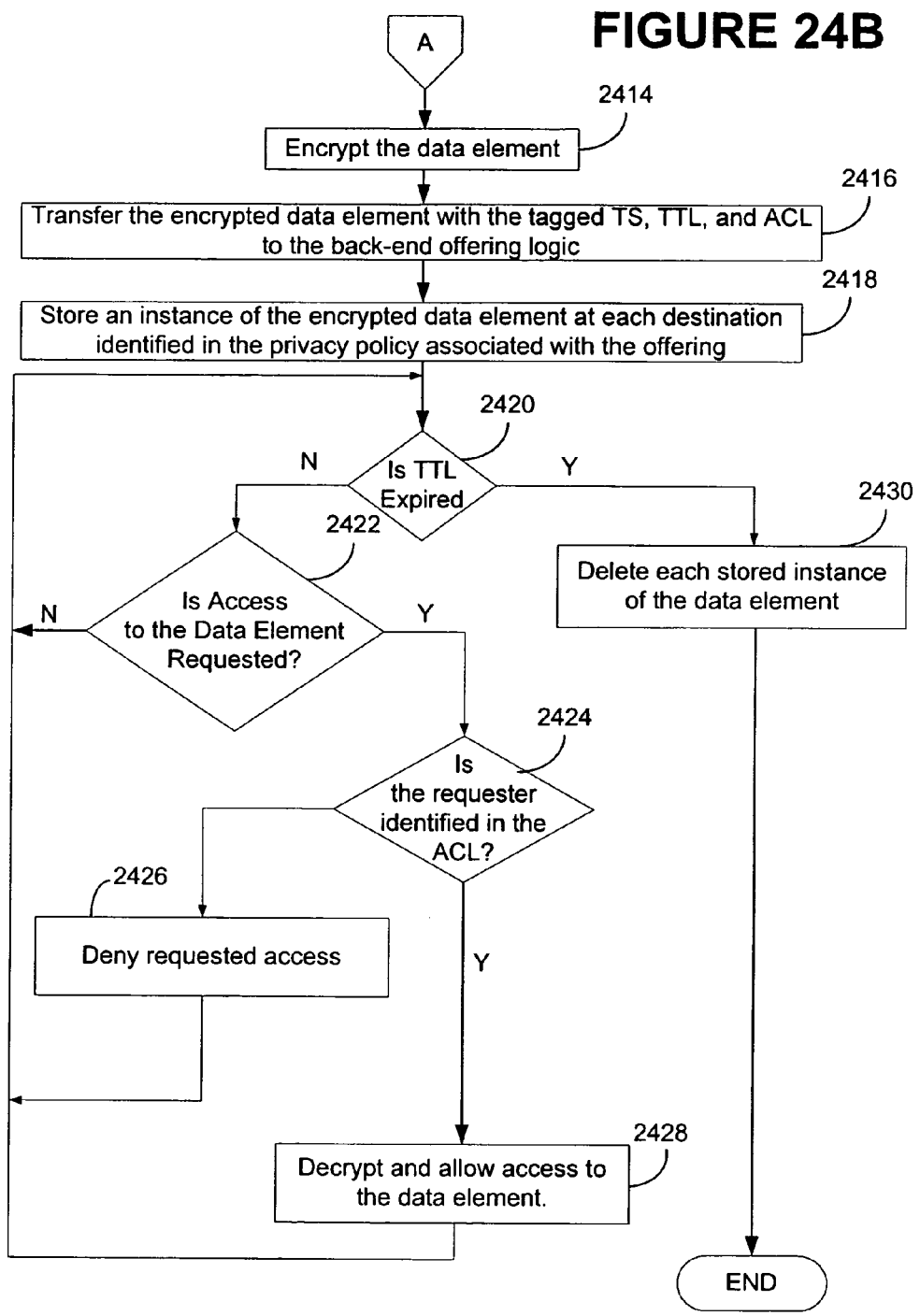

FIGURE 28A

```xml
<?xml version="1.0" encoding="ISO-8859-1"?>
<fmaevent eventid="889923"
xmlns:xsi="http://www.w3.org/2001/XMLSchema-instance"
xsi:noNamespaceSchemaLocation="cnsinfomodel.xsd">
 <eventtype>Critical</eventtype>
 <hostname>xbr31</hostname>
 <eventtime>128374</eventtime>
 <eventdata>Memory Module 4 is bad</eventdata>
</fmaevent>
```

FIGURE 28B

```xml
<?xml version="1.0" encoding="ISO-8859-1"?>
<fmaevent eventid="889923"
xmlns:xsi="http://www.w3.org/2001/XMLSchema-instance"
xsi:noNamespaceSchemaLocation="cnsinfomodel.xsd">
 <eventtype>Critical</eventtype>
 <hostname>xbr31</hostname>
 <eventtime>128374</eventtime>
 <eventdata>Memory Module 4 is bad</eventdata>
 <ACLKey>79394</ACLKey>
 <TTL>2249</TTL>
</fmaevent>
```

SYSTEM AND METHOD FOR DYNAMIC OFFERING TOPOLOGIES

CROSS-REFERENCE TO RELATED APPLICATIONS

This application is a Continuation-In-Part of application Ser. No. 11/174,207 filed on Jun. 30, 2005, entitled "System and Method for Managing Distributed Offerings."

This application is related to the following U.S. patent applications, which are filed concurrently with this application, and which are incorporated herein by reference to the extent permitted by law:

Ser. No. 11/326,085, entitled "System and Method for Assigning a Unique Asset Identity;"

Ser. No. 11/326,527, entitled "System and Method for Dynamic Asset Topologies in a System for Managing Distributed Offerings;"

Ser. No. 11/325,820, entitled "System and Method for Managing Privacy for Offerings;"

Ser. No. 11/325,893, entitled "System and Method for Asset Module Isolation;"

Ser. No. 11/325,948, entitled "System and Method for Managing Asset-Side Offering Modules;"

Ser. No. 11/325,939, entitled "System and Method for Dynamic Offering Deployment;"

Ser. No. 11/325,916, entitled "System and Method for Managing Offering and Asset Entitlements;"

Ser. No. 11/325,757, entitled "System and Method for Providing Web Service Interfaces;"

Ser. No. 11/325,962, entitled "System and Method for Providing an Offering Registry."

FIELD OF THE INVENTION

The present invention relates to deploying software and services, and in particular, to a platform for managing offerings of computer software and services.

BACKGROUND OF THE INVENTION

As is known, offerings, such as software and services, can be deployed to customers via a network. Conventionally, a provider, such as a software manufacturer, sends its offerings from the provider's server to its customer's assets (e.g., a customer's computer). The topology resembles a wheel, with the provider's server as the "hub" of the wheel and the customer assets connected via network "spokes" to the hub. Accordingly, this topology is known as the hub and spokes model. The hub and spoke model is focused on delivering offerings where the resources needed to deliver the offerings are centrally located.

However, there are cases in which the hub and spoke model makes it difficult to service customers. For example, the provider may have a partner (e.g., a distributor) who has the primary relationship with the customer. In this case, the partner must coordinate with the provider to deliver offerings from the provider's central hub. This is inefficient for the partner, as well as for the customer who must establish a network connection with the provider.

Further, recent privacy laws have placed a strain on the hub and spoke model. Data collected from customers' environments needs to be not only logged and agreed upon, but the purpose of the collection needs to be controlled and noted. The architecture therefore needs to provide a tighter relationship between data collected from the customer and its analysis and purpose. Customers, such as military organizations, may be sensitive to the recording of such information. As customer information is gathered at the provider in the hub and spoke model, this model has disadvantages to information-sensitive customers. Customers may prefer to maintain control of their own data within their proprietary network and host the provided offerings within their datacenters.

In particular, new privacy related laws, such as the Health Insurance Portability and Accountability Act (the HIPAA Act), the Sarbanes-Oxley Act, and the Patriot Act, has placed significant problems on maintaining the security and privacy of data transferred within a network. For example, under the HIPAA Act, medical facilities cannot transfer patient records to others, including insurance companies, without explicit patient authorization. Conventional secure data storage solutions often are based on the principle of access control to the data collected in a central facility. Other conventional secure data storage solutions have provided discrete data segmentation within a data store or repository. However, these conventional secure data storage solutions do not provide a company with the flexibility to selectively implement privacy control over data to meet the requirements of the current privacy laws, especially when the company's data is being transferred outside of the company's environment or control, for example, to vendors providing related services to the company.

Therefore, a need has long existed for a method and a system that overcome the problems noted above and others previously experienced.

SUMMARY OF THE INVENTION

Methods, systems, and articles of manufacture consistent with the present invention manage distributed offerings to customers. A customer may have one or more assets for which offerings may be available. An asset is an item that is identified by and monitored or acted upon by an offering. An asset can be, for example, hardware, software, storage, a service processor, a cell phone, or a human being. An offering describes a capability, which may be provided by a vendor (e.g., a software manufacturer) or a partner of the vendor (e.g., a distributor), that is deemed valuable to the customer. Offerings can be, for example, software updates, asset management, online learning, skills assessment, compliance reporting, and availability management, or other services. Methods, systems, and articles of manufacture consistent with the present invention provide an infrastructure that enables deployment of offerings to the customer.

Offerings are deployed from offering platforms, which are programs and associated information for administering offerings to assets. Offering platforms may reside on a vendor's system, a system of one of the vendor's partners, or on a system possessed by the customer. When an offering is deployed, where and how the offering is implemented, which assets are associated with the offering, and any communication from the asset to vendor, partner, and customer systems is defined by the offering itself. That is, the offering deployment is defined by the offering (i.e., business logic), not by the hardware or network architecture.

When deploying an offering, an offering platform may preliminarily instantiate an asset platform, which is local to the asset. An asset platform is one or more programs that can discover customer assets, register those customer assets with offering platforms, and provision offerings from offering platforms to the customer assets. Like offering platforms, asset platforms can reside on vendor, partner, customer, or other systems.

Offerings are deployed based on a model of business process abstraction, where the business process that describes the interaction between the customer and the offering is managed separately from the program modules that deliver the offerings capabilities. This allows the offering administrator to change and modify the business process and even create new offerings without having to create new deployment software. Further, this model mitigates the software development cycle and allows the offering administrator to adapt more rapidly to changing business needs. This model also allows customized offerings to be created to reflect specialized customer needs with little to no software engineering or third party integration commitment. This combined with flexible deployment of offerings provides a flexible architecture that is rapidly adaptable to the customer's needs.

In accordance with methods consistent with the present invention, a method of managing offerings in a data processing system having a plurality of offering platform programs operatively connected to a distributed offering network is provided. The method comprises the steps of: deploying at least one offering via an offering platform program; creating a topology of offerings; determining whether there is an association between two or more of the offerings; and when there is an association between two or more of the offerings, including the association in the topology.

In accordance with articles of manufacture consistent with the present invention, a computer-readable medium containing instructions that cause a program in a data processing system to perform a method of managing offerings is provided. The method comprises the steps of: deploying at least one offering via an offering platform program; creating a topology of offerings; determining whether there is an association between two or more of the offerings; and when there is an association between two or more of the offerings, including the association in the topology.

In accordance with systems consistent with the present invention, a data processing system for managing offerings and having a plurality of offering platform programs operatively connected to a distributed offering network is provided. The data processing system comprises: a memory having a program that deploys at least one offering via an offering platform program, creates a topology of offerings, determines whether there is an association between two or more of the offerings, and when there is an association between two or more of the offerings, including the association in the topology; and a processing unit that runs the program.

Other systems, methods, features, and advantages of the invention will become apparent to one with skill in the art upon examination of the following figures and detailed description. It is intended that all such additional systems, methods, features, and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIGS. 23A-B depict a flow diagram illustrating an exemplary process for defining a privacy zone in accordance with the deployment of an offering from an offering platform to an asset platform in the data processing system;

FIGS. 24A-B depict a flow diagram illustrating an exemplary process for maintaining the privacy of a data element within the privacy zone in accordance with a privacy policy associated with the offering;

DETAILED DESCRIPTION OF THE INVENTION

Reference will now be made in detail to an implementation consistent with the present invention as illustrated in the accompanying drawings. Wherever possible, the same reference numbers will be used throughout the drawings and the following description to refer to the same or like parts.

Methods, systems, and articles of manufacture consistent with the present invention manage distributed offerings for customers. As will be described in more detail below, customers may have one or more assets for which offerings may be available. An asset can be, for example, hardware, software, storage, a service processor, or a cell phone. An offering describes a capability, which may be provided by a vendor (e.g., a software manufacturer) or a partner of the vendor (e.g., a distributor), that is deemed valuable to the customer. Offerings can be, for example, software updates, asset management, online learning, skills assessment, compliance reporting, and availability management, or other services. Methods and systems consistent with the present invention provide an infrastructure that enables deployment of offerings to the customer. In an embodiment, offerings are deployed to customer assets as software plug-ins.

Figure 1:
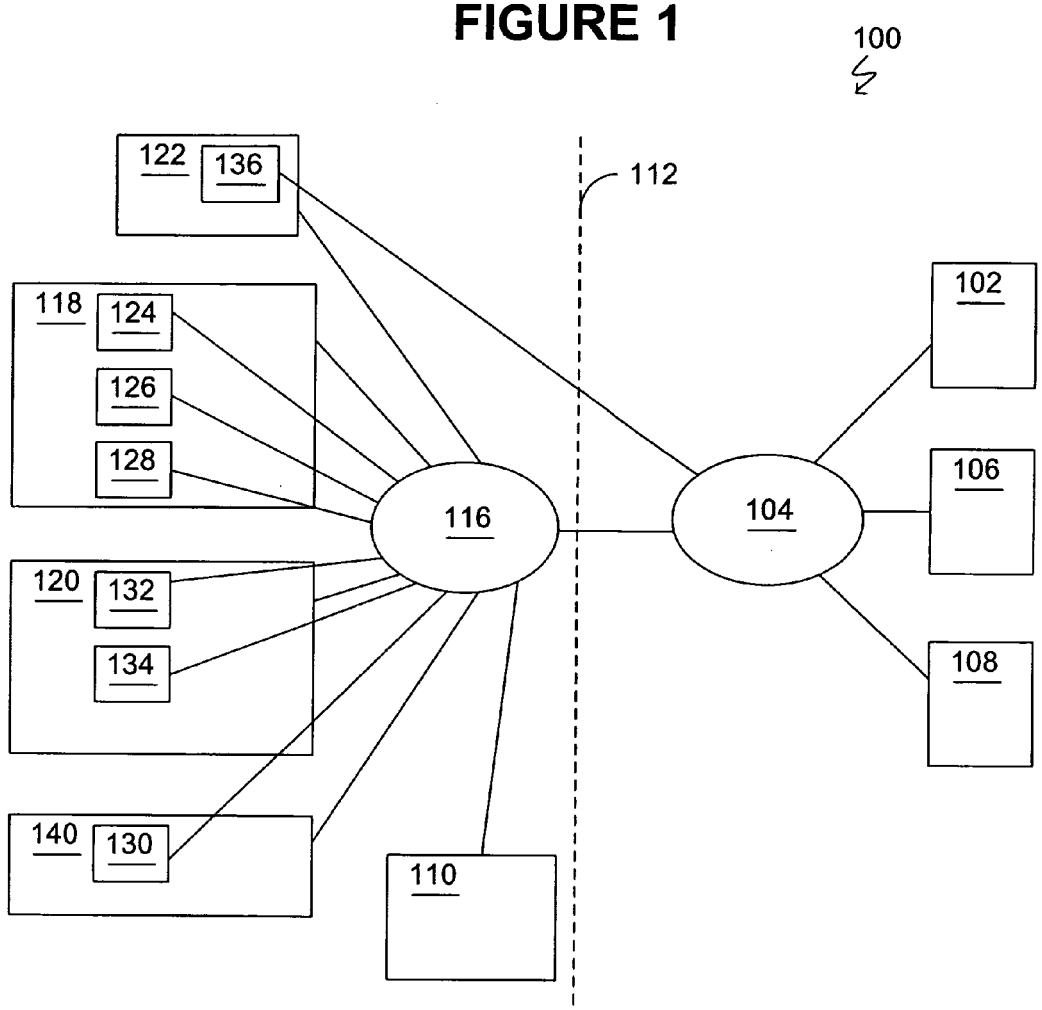
FIG. 1 shows a block diagram illustrating a data processing system suitable for use with methods and systems consistent with the present invention.

FIG. 1 depicts a block diagram of a data processing system 100 suitable for use with methods and systems consistent with the present invention. Data processing system 100 is referred to hereinafter as "the system." The system is an infrastructure that enables the management of offerings that may be deployed to customers. The system comprises one or more vendor systems 102 connected to a network 104. The network is a network suitable for use with methods and systems consistent with the present invention, such as a Local Area Network or Wide Area Network. In the illustrative embodiment, the network is the Internet. One or more vendor partner systems 106 and 108 may also be connected to the network, as well as one or more customer systems 110. For purposes of this disclosure, partners are entities other than the vendor and are associated with the vendor, such as distributors, contractors, and retailers.

Items to the left of dashed line 112 are in the customer's possession, such as items on the customer's premises or possessed by the customer's employees. The customer may have the customer system 110 and also may have a proprietary customer network 116, such as a LAN. Further the customer may have one or more assets, such as various hardware and software items. In the illustrative example, the customer has devices that include a first workstation 118, a second workstation 120, a mobile phone 122, and a file server 140. The customer's assets include, for example, the first workstation's hardware 124, the first workstation's operating system 126, an accounting software on the first workstation 128, a storage jukebox 130 attached to the file server 140, the second workstation's hardware 132, a StarOffice™ software 134 on the second workstation, and a firmware 136 on the mobile phone 122. In the illustrative example, the first and second workstations and the file server are connected to customer network 116, and therefore assets 124-134 are accessible via customer network 116, while the firmware 136 asset on the mobile phone is not. One having skill in the art will appreciate that the configuration of FIG. 1 is an illustrative example, and that the various items can be configured differently. For example, the customer may not have a customer network such that the customer assets are accessible by the vendor and partner systems without the use of a customer network.

As will be described in more detail below, one or more of the vendor, partner, and customer systems may be configured to host an offering platform for deploying offerings to one or more of the customers assets. An offering platform is one or more programs and associated information for administering offerings to assets. In the illustrative embodiment, the offering platform is a program that can be instantiated in memory on one or more of the vendor, partner, and customer systems. The functionality of an offering platform can be moved from one system to another, such as from vendor system 102 to customer system 110. This may be done, for example, if the customer is concerned about sharing information with the vendor and decides that it would prefer to have offerings deployed from the customer system instead of from the vendor system. The features of relocatable offering platforms and the ability to plug in offering capabilities into the system enable the implementation of flexible business scenarios, which are unrestricted by the underlying technology. The offering platform, and the other programs described herein, may be implemented as software, hardware, or a combination of software and hardware.

Figure 2:
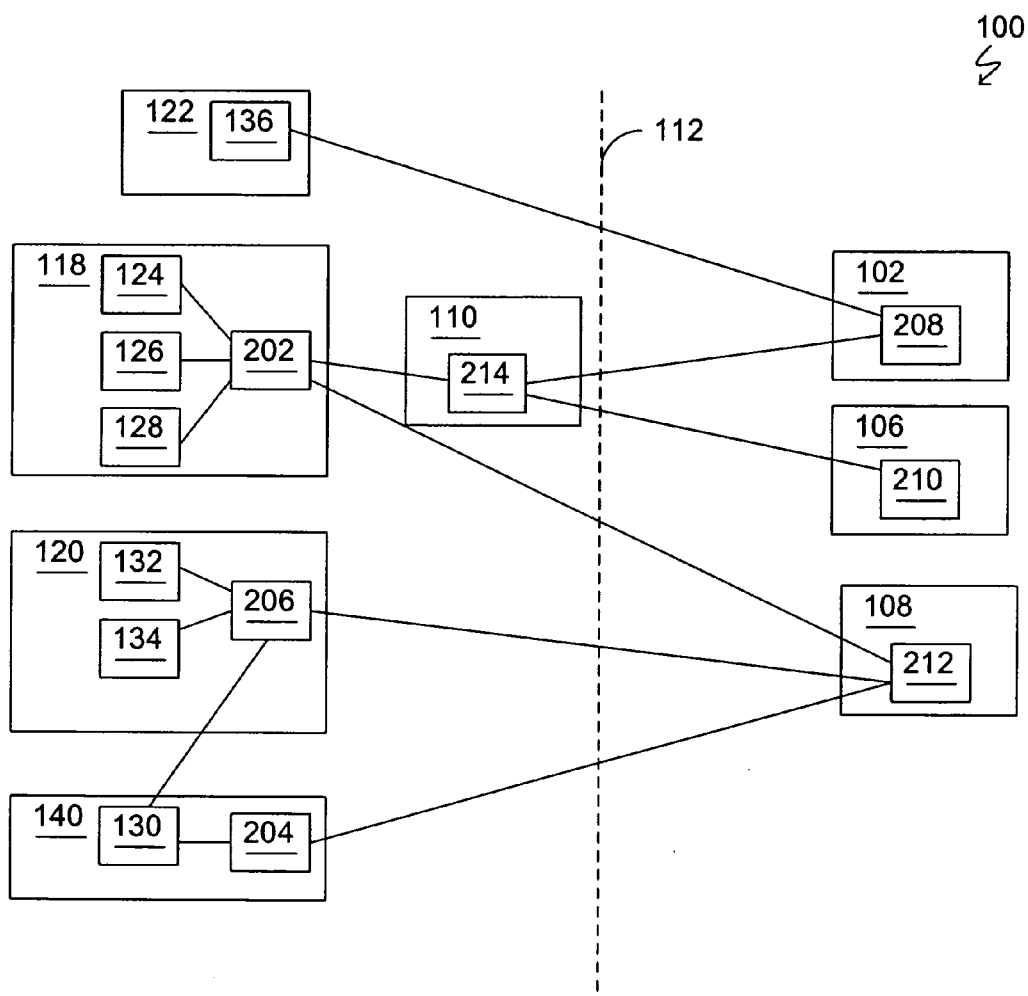
FIG. 2 shows illustrative associations between the vendor, partner, and customer systems and the customer assets.

FIG. 2 shows associations between the vendor, partner, and customer systems and the customer assets of the illustrative example. In the example, most of the customer assets are associated with one or more asset platforms 202, 204, and 206. As will be described in more detail below, an asset platform is one or more programs that can discover customer assets, register those customer assets with offering platforms, and provision offerings from offering platforms to the customer assets. In the illustrative embodiment, the asset platforms are programs that can be instantiated on a data processing system. These data processing system can be a vendor, partner, or customer system or another data processing system. For example, an asset platform may be deployed on a customer system that includes customer assets for the customer system hardware and operating system. Further, multiple asset platforms can be instantiated on the same data processing system.

As shown in FIG. 2, a customer asset can be associated with more than one asset platform (see, e.g., customer asset 130). In the illustrative example, customer assets 124, 126, and 128 are associated with asset platform 202, which resides for example on first workstation 118. Customer asset 130 is associated with asset platforms 204, which resides on a file server 140, and asset platform 206, which resides on second workstation 120. Customer assets 132 and 134 are associated with asset platform 206, which resides on a second workstation 120.

Each customer asset can also be registered with one or more offering platforms that host offerings for the asset. When a customer asset is registered with an offering platform, the offering platform can coordinate the distribution of an offering to the asset's associated asset platform, which in turn implements the offering to the customer asset. As shown in the illustrative example, offering platforms can be associated with one or more other offering platforms. In that case, one of the offering platforms provides the offering to the customer, while one or more other offering platforms provide a level of capability associated with the offering and participate in the provision of the offering. For example, a customer may log onto a portal hosted by a local offering platform to request an offering that is deployed from a remote offering platform. The local and remote offering platforms coordinate deployment of the offering to the customer. In another example, an offering deployed from a first offering platform may have a hierarchical relationship with an offering deployed from a second offering platform. In this example, the first offering may be an incident management offering deployed from a local customer offering platform that coordinates with an incident management offering deployed from an offering platform at the vendor's location.

FIG. 2 shows illustrative relationships between assets, asset platforms, and offering platforms. In the example, asset 124 may be associated with an offering (e.g., incident management) from offering platform 208 via asset platform 202, with offering platform 214 participating in the provision of the offering; asset 126 may be associated with an offering (e.g., hardware replacement and incident management) from offering platform 210 via asset platform 202, with offering platform 214 participating in the provision of the offering; asset 128 may be associated with an offering (e.g., automated incident management) from offering platform 214 via asset platform 202; asset 128 may be associated with another offering (e.g., a software update) from offering platform 212 via asset platform 202; asset 130 may be associated with an offering (e.g., software update) from offering platform 212 via asset platform 204 or asset platform 206; asset 132 may be associated with an offering (e.g., hardware update) from offering platform 212 via asset platform 206; and asset 134 may be associated with an offering (e.g., software update) from offering platform 212 via asset platform 206.

The example shown in FIG. 2 illustrates, in part, an incident management solution being offered by a set of offerings, organized in a hierarchical manner. Delivered from the customer's premises the automated incident management offering on customer offering platform 214 logs the incident, recommends remediation steps, and integrates with the customer's incident management system. The offering hardware replacement is delivered by partner offering platform 210. If the incident management offering at the customer's premises recognizes that a hardware element generating the incident needs replacement, it forwards the request to the hardware replacement service automatically. As part of the offering platform setup, the two instances of the offering platforms (i.e., offering platforms 214 and 210) have exchanged managed asset information and the relationship between the two offerings is established.

Further, the customer may be concerned with privacy, so the incident management offering for asset 124 may be relocated from vendor offering platform 208 to customer offering platform 214. In this case, the incident management offering may be within the customer's firewall, and thus may have little or no connectivity back to the vendor. Further, since partner systems may host offerings for the assets, there may be little or no connectivity back to the vendor in these cases as well. For example, the partners may receive software updates from the vendor on compact disks and offer the software updates to the customer via the compact disks. Thus, how the offering is deployed is driven by business logic associated with the offering itself, not by the system architecture.

When an asset (e.g., customer asset 136) is not associated with an asset platform (e.g., when an asset platform cannot be deployed onto the customer device), the customer asset may receive an offering from an offering platform via a clientless interface between the asset and the offering platform. For example, customer asset 136 receives an offering (e.g., a firmware upgrade) that is hosted by vendor offering platform 208.

The system provides benefits, such as scalability, as assets may not be required to communicate with a hub—instead they may communicate with an asset platform that delivers their business needs as governed by their own business and privacy parameters. In other words, the system adapts to the business needs of the relationship between the customer, the vendor, and the partners as opposed to focusing on a telemetry pipe to the vendor.

The system utilizes a model of business process abstraction, where the business process that describes the interaction between the customer and the offering is managed separately from the program modules that deliver the offerings capabilities. This allows the offering administrator to change and modify the business process and even create new offerings without having to create new deployment software. Further, this model mitigates the software development cycle and allows the offering administrator to adapt more rapidly to changing business needs. This model also allows customized offerings to be created to reflect specialized customer needs with little to no software engineering or third party integration commitment. This combined with flexible deployment of offerings provides a flexible architecture that is rapidly adaptable to the customers' needs.

Figure 3:
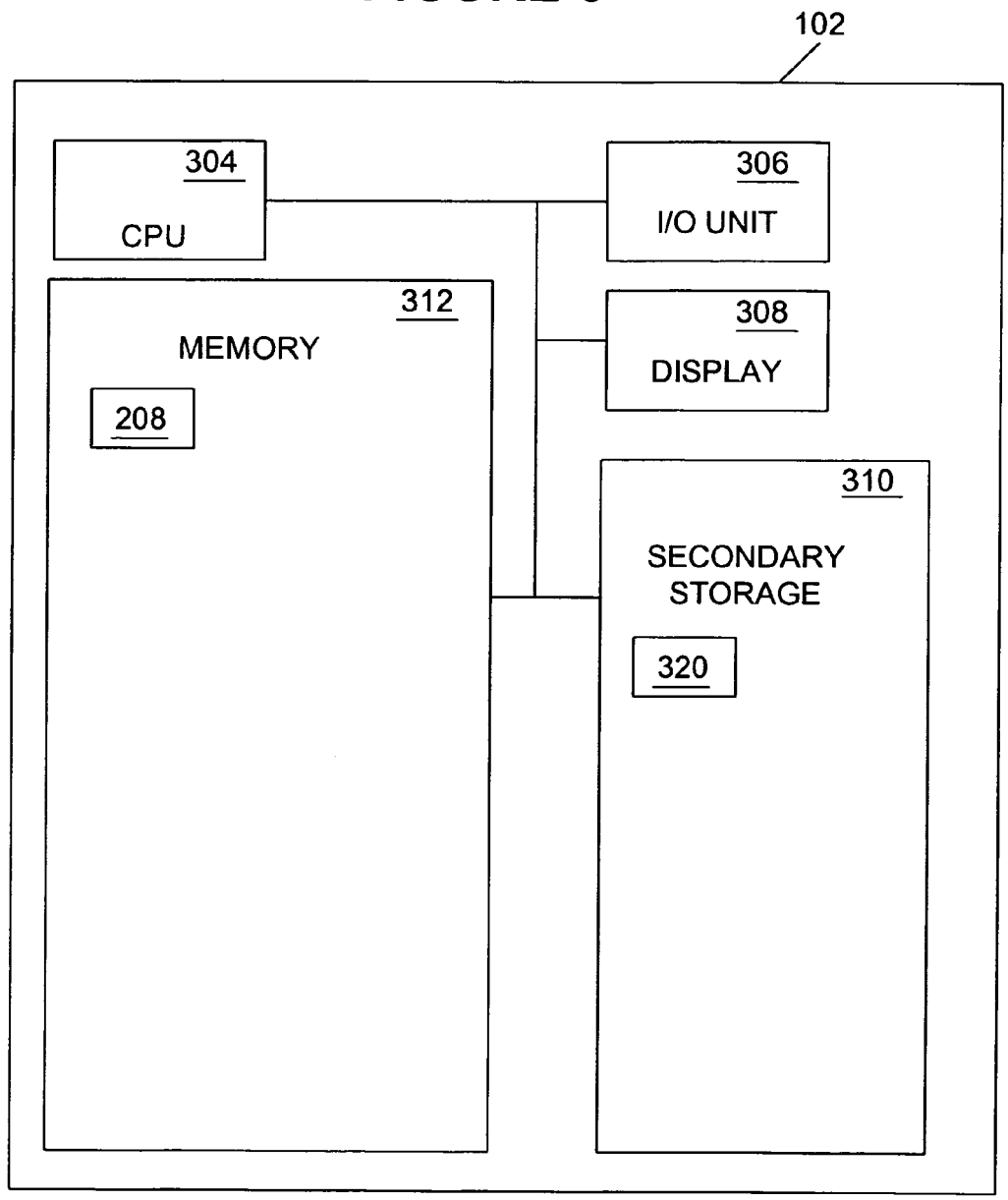
FIG. 3 depicts a block diagram of a vendor data processing system consistent with the present invention.
Figure 4:
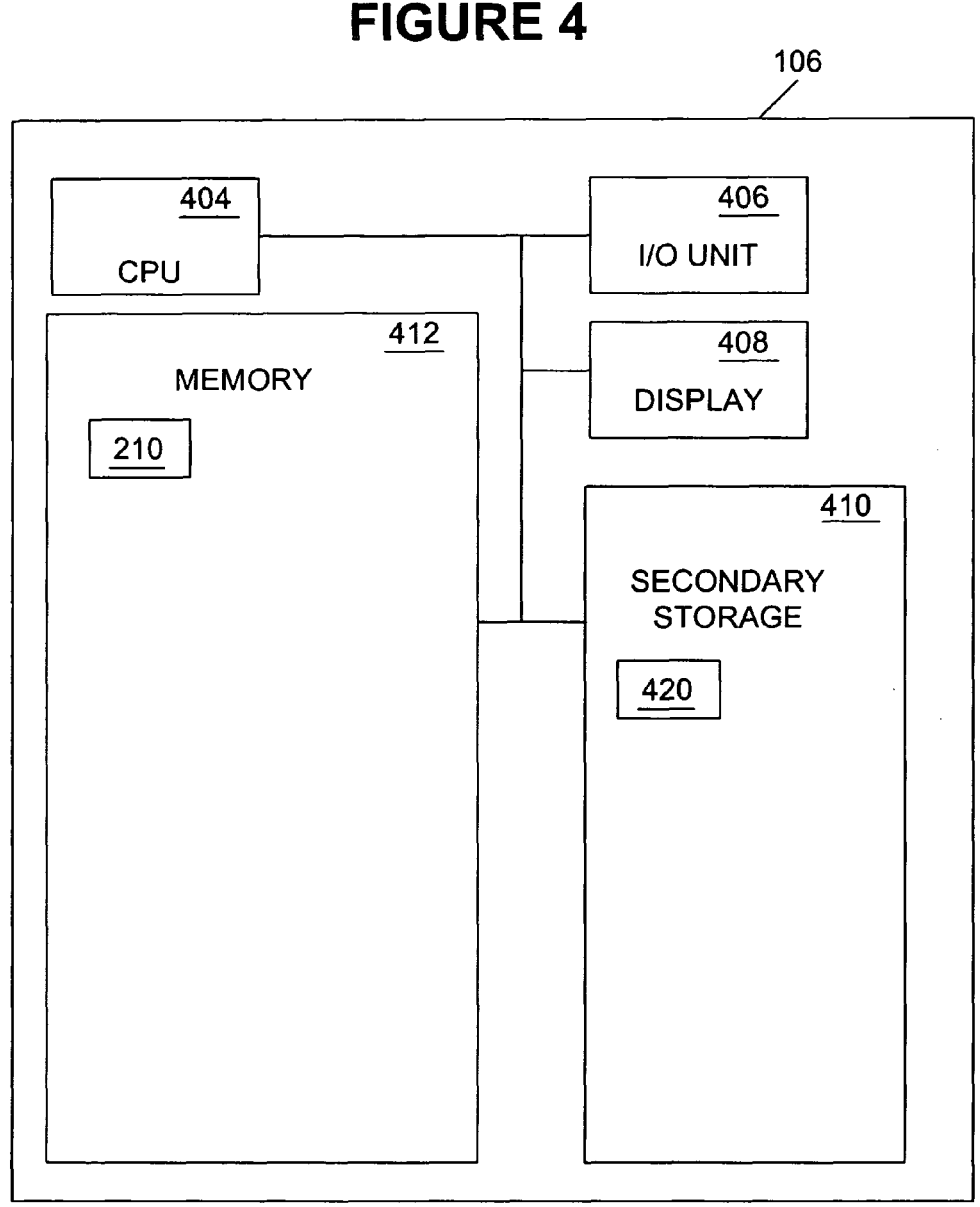
FIG. 4 depicts a block diagram of a partner data processing system consistent with the present invention.
Figure 5:
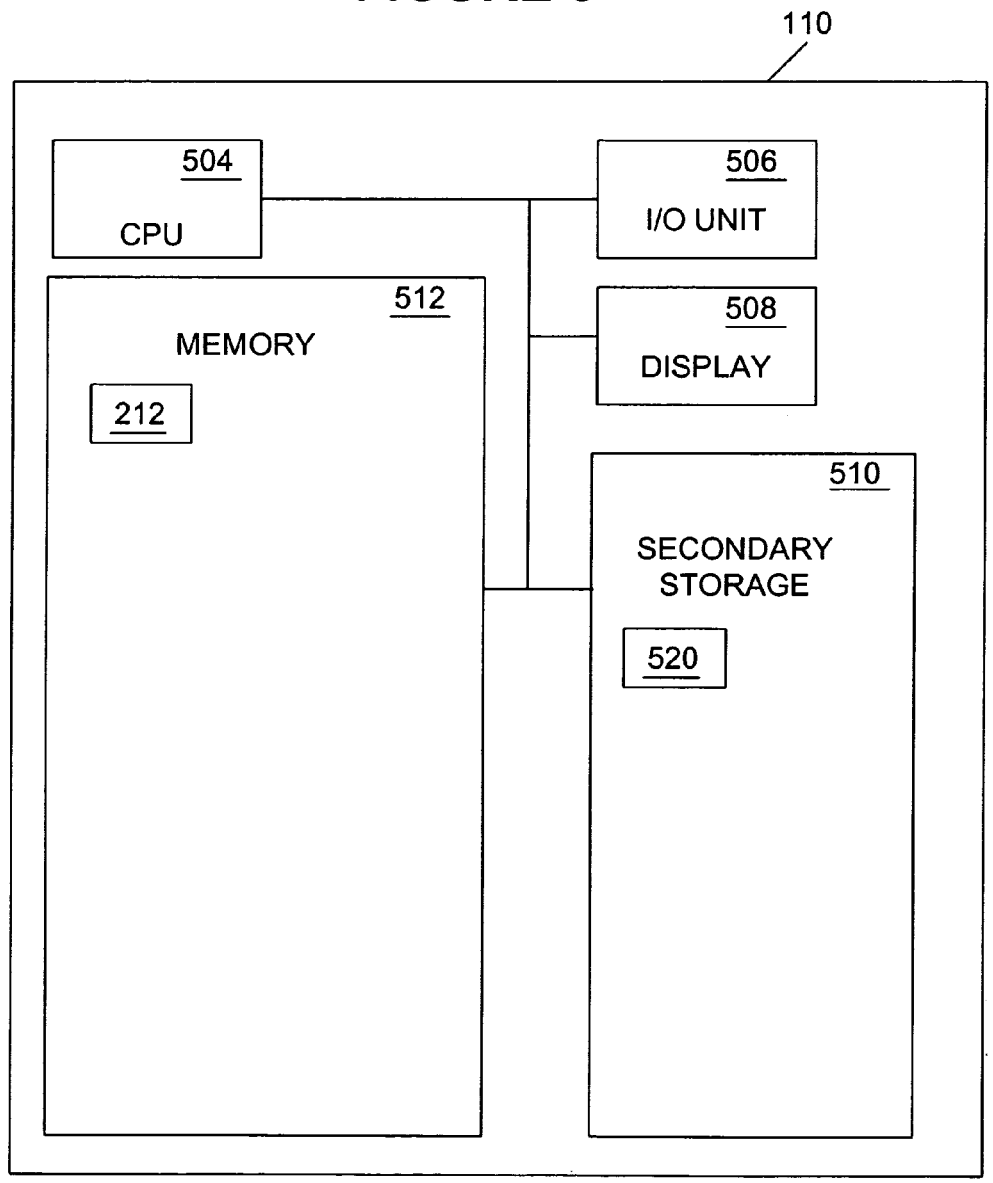
FIG. 5 depicts a block diagram of a customer data processing system consistent with the present invention.

FIGS. 3-5 depict more detailed views of illustrative vendor, partner, and customer systems, respectively. FIG. 3 depicts a more detailed view of a vendor system, such as vendor system 102. The vendor system is, for example, a Sun SPARC® data processing system running the Solaris® operating system. One having skill in the art will appreciate that hardware and programs other than those described in the illustrative examples can be implemented. Sun, SPARC, Java, the Sun logo, Solaris, StarOffice, and Sun ONE are trademarks or registered trademarks of Sun Microsystems, Inc., Palo Alto, Calif., in the United States and other countries. Other names used herein are the property of their respective owners.

The vendor system comprises a central processing unit (CPU) 304, an input/output (I/O) unit 306, a display device 308, a secondary storage device 310, and a memory 312. The vendor system may further comprise standard input devices such as a keyboard, a mouse or a speech processing means (each not illustrated). Memory 312 may comprise one or more offering platforms 208. The offering platform will be described in more detail below. One of skill in the art will appreciate that each program and module described herein can be a stand-alone program and can reside in memory on a data processing other than the described system. The program and modules may comprise or may be included in one or more code sections containing instructions for performing their respective operations. While the programs and modules are described as being implemented as software, the present implementation may be implemented as a combination of hardware and software or hardware alone. Also, one having skill in the art will appreciate that the programs and modules may comprise or may be included in a data processing device, which may be a client or a server, communicating with described system.

Although aspects of methods, systems, and articles of manufacture consistent with the present invention are depicted as being stored in memory, one having skill in the art will appreciate that these aspects may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of system 100 have been described, one skilled in the art will appreciate that a data processing system suitable for use with methods, systems, and articles of manufacture consistent with the present invention may contain additional or different components.

One having skill in the art will appreciate that vendor, partner, and customer systems can themselves also be implemented as client-server data processing systems. In that case, a program or module can be stored on, for example, the vendor system as a client, while some or all of the steps of the processing of the program or module described below can be carried out on a remote server, which is accessed by the server over the network. The remote server can comprise components similar to those described above with respect to the server, such as a CPU, an I/O, a memory, a secondary storage, and a display device.

The vendor system secondary storage 310 may include a database 320 that includes a unique identification for each registered asset, customer, asset platform, offering platform, and offering that is registered by the vendor system. The database may also include information about the relationships between offerings and offering platforms. Similar to the databases on the partner and customer systems, information may be stored in the database using anonymous identifications. At the customer's request, no customer information that would be considered confidential is stored in the databases or transferred between the respective vendor, partner, and customer systems.

FIG. 4 depicts an illustrative partner system, such as partner system 106 or 108. In the illustrated example, partner system 106 is represented. The partner system can be, for example, a Sun SPARC® data processing system running the Solaris® operating system. The partner system comprises a central processing unit (CPU) 404, an input/output (I/O) unit 406, a display device 408, a secondary storage device 410, and a memory 412. The partner system may further comprise standard input devices such as a keyboard, a mouse or a speech processing means (each not illustrated). Memory 412 may comprise one or more offering platforms 210. The partner system secondary storage 410 may include a database 420 that includes a unique identification for each asset, customer, asset platform, offering platform, and offering that is registered by the partner system. The database may also include information about the relationships between offerings and offering platforms.

FIG. 5 depicts an illustrative customer system, such as customer system 110. The customer system can be, for example, a Sun SPARC® data processing system running the Solaris® operating system. The customer system comprises a central processing unit (CPU) 504, an input/output (I/O) unit 506, a display device 508, a secondary storage device 510, and a memory 512. The partner system may further comprise standard input devices such as a keyboard, a mouse or a speech processing means (each not illustrated). Memory 512 may comprise one or more offering platforms 214. The partner system secondary storage 510 may include a database 520 that includes a unique identification for each registered asset, customer, asset platform, offering platform and offering that is registered by the customer system. The database may also include information about the relationships between offerings and offering platforms.

As described above with reference to FIGS. 1 and 2, system 100 can include other data processing systems, such as customer workstations 118 and 120, file server 140, and mobile phone 122. Each of these other data processing systems may include hardware and software components similar to those of the vendor, partner, and customer systems, such as a CPU, a memory, an I/O device, a display device, and a secondary storage. In the illustrative example, vendor system 104 has offering platform 208 in memory, partner system 106 has offering platform 210 in a memory, partner system 108 has an offering platform 212 in a memory, and customer system 110 has offering platform 214 in a memory. Workstation 118 has asset platform 202 in a memory, workstation 120 has asset platform 140 in a memory, and file server 210 has asset platform 204 in a memory.

Web browsers are popular user interface tools for accessing distributed information. The system's architecture leverages web browsers by associating a portal with each instance of an offering platform. In general, a portal is a framework for a Web site or for an application that aggregates information from a variety of sources. As will be described in more detail below, a user, such a customer, can log onto a portal to access offerings that are available for the customer's registered assets. To enhance the user experience, the system may include federated identity for users. Federated identity allows individuals to use the same user name, password, or other personal identification to sign on to the system using browsers at different locations.

In the illustrative embodiment, the portal framework is integrated using portlets that are defined by the Java Community Process in JSR 168. Portlets are an industry standard approach to portal presentation. The portlets provide an integration component between applications and portals that enables delivery of an offering through a portal. Architecturally, the illustrative portlet is a Java Server Page (JSP) with some eXtensible Markup Language (XML)-based metadata that fits into a portal. A portlet provides a focused channel of information directed to a specific user or group using a portal as its container. Portals and their implementation are known to one having skill in the art and therefore will not be described in detail herein.

In the illustrative example, portals are implemented using Web Services for Remote Portlets (WSRP), JSR 168 compliant portlets, and Java Server Faces (JSF). The Web Services for Remote Portlets (WSRP) specification is a basis for the distribution of functional views. The distribution of these functional views allows an administrator to add new feature sets to a portal instance such that other portal instances would be able to discover the new features on an ongoing basis over the WSRP protocol. In addition, offering applications deployed within the vendor system may deploy functional views via portlets on their own servers and expose them via WSRP to portal instances. To scale the portal at the vendor system, offering features are allowed to deploy their own applications and provide a functional view that is presented in the aggregated portal. An offering feature is a component that enables the user to manage offerings. In this case, the offering features deploy a WSRP producer with their application deployment. In the illustrative example, the WSRP is a servlet. The vendor portal is further configured to include the remote portlets in its aggregated view.

Portlets deployed on the vendor portal may be remotely displayed on a partner or customer portal. WSRP is used in the illustrative example to enable this differing mix of views. To provide such mixing of views, the partner and customer portals may be configured to know about the vendor portal so that they would be able to discover the portlets to which they would have access to display to their users.

JSR 168 provides a standard API for creating portlets. In the illustrative example, content is deployed into the platform portal framework using JSR 168 compliant portlets.

Java Server Faces (JSF) technology is a user interface component framework for building Java Web applications. It is designed to ease the burden of writing and maintaining applications that run on a Java application server and render their user interfaces back to a target client. A JSF user interface component is the basic building block for creating user interfaces. If a component uses no proprietary API's, it can be reused over and over again in a number of applications, making it easier to develop applications and improve developer productivity. In the illustrative example, the presentation view tier components of the system's portal framework are based on JSF.

Figure 6:
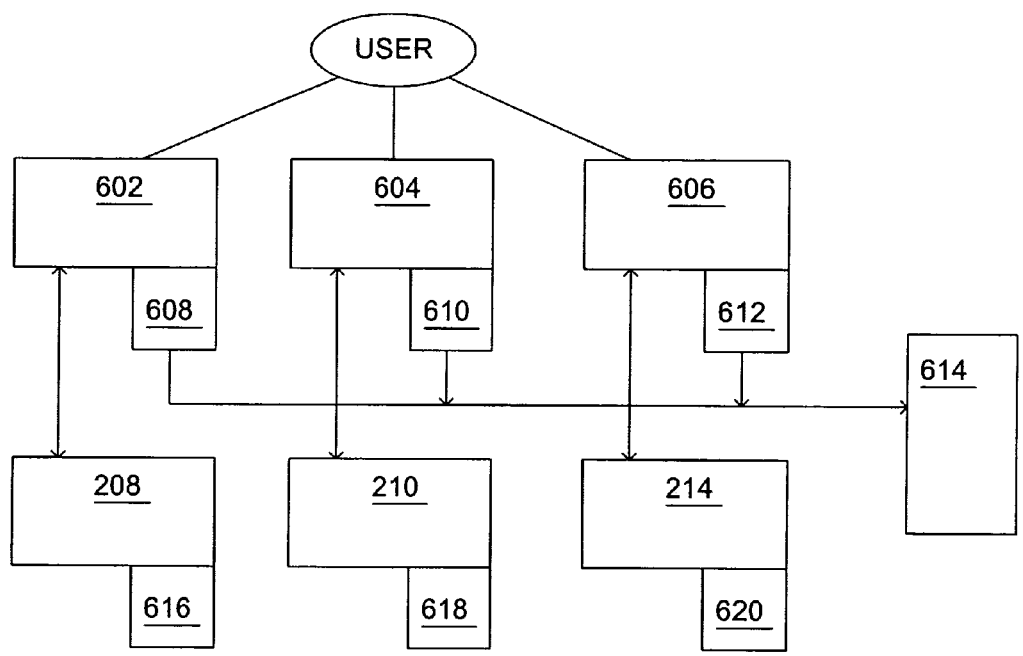
FIG. 6 shows a functional block diagram of offering platforms and their associated portals.

FIG. 6 is a functional block diagram of offering platforms and their associated portals. As shown, each offering platform is a associated with a respective portal. Offering platform 208 on the vendor system is associated with portal 602. Offering platform 210 on one of the partner systems is associated with portal 604. Offering platform 214 on the customer system is associated with portal 606. Each portal includes an identity module 608, 610, and 612 which authenticate users and coordinate with a federated identity module 614. After a user is authenticated, the user can manage the deployment of offerings 616, 618, and 620 that may be available to the user.

In the illustrative example, the identity modules and the federated identity module are implemented using the Liberty Alliance Project Identity Federation Framework (ID-FF) and Liberty Alliance Project Personal Profile Service (PPS). The ID-FF provides a standardized approach for implementing single sign-on with federated identities. This allows a user or system to have their identity federated across the different vendor, partner, and customer systems and enables the use of a single sign on. PPS is a collection of specifications for interoperable services that are built on top of ID-FF. The ID Personal Profile service of PPS defines schemas for basic profile information of a use, such as name, legal identity, legal domicile, home and work addresses and can also include phone numbers, email addresses, demographic information, public key details, and other online contact information.

Figure 7:
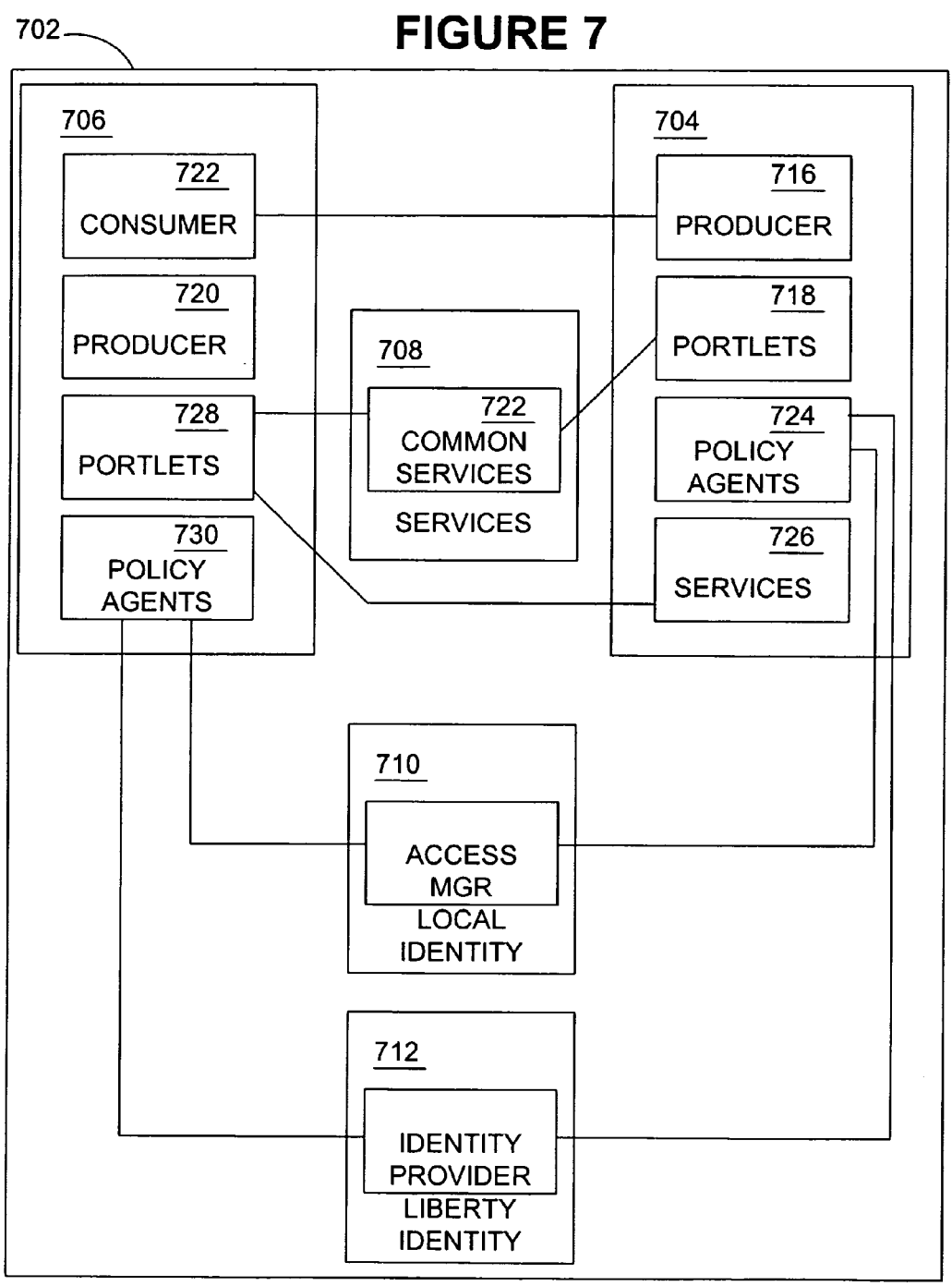
FIG. 7 illustrates a block diagram of a portal framework consistent with the present invention.

FIG. 7 depicts a block diagram of the structure of a portal framework consistent with the present invention. The illustrative portal framework 702 includes an offering feature 704, a portal 706, a services component 708, a local identity component 710, and a federated identity component 712. To maintain scalability, extensibility and local control, the offering feature portlets are deployed into different containers and remotely aggregated into a central portal by publishing them through WSRP producers and consumed at the portal by WSRP consumers. Each offering feature deployed has a producer 716 that enables this integration. Further, in the illustrative example, the offering features implement the presentation tier of the feature using JSR 168 compliant portlets 718. These are the views that are aggregated onto the central portal. Offering feature 702 provides the front-end functionality for the customer to interact with the offering module via the portal. The offering feature may deploy its own services 724, some of which may contain presentations as portlets deployed with the offering feature or more common portlets deployed directly into the portal. The portlets deployed with the offering feature may also make use of other common services or even services of other offering features. The offering feature may also include policy agents 726, such as J2EE policy agents.

In the illustrative embodiment, portal 706 is maintained as thin as possible. For example, the functional components that are preferably deployed into the portal server itself are those that are common across the offering features. The illustrative portal also contains a WSRP producer 720 and a consumer 722. The consumer is used to retrieve remotely deployed portlets 728 from offering feature deployments or other service centers and aggregate them into the central portal. The portal may also include policy agents 730.

The services components 708 of the framework are those that are made available via the web services framework. These are sets of common services and business services that make up the business tier and provide the business logic functionality that drives the presentations. These services may be aggregated into business processes that may be the dependency for the different presentations portlets.

The local identity/access system 710 enables local identity and access control via the portal. This allows local authentication and authorization policies via the portal. The authentications and user identities may be federated to other service center deployments via the liberty identity federation framework. The portal framework uses identity federation to allow authentication and single sign on across deployed instances of the portal and offering features. Although other systems may be used, in the illustrative example, the use of identity federation is based on specifications from the Liberty Alliance Project Identity Federation Framework (ID-FF) and Liberty Alliance Project Personal Profile Service (PPS). A dependency point with the ID-FF is preferably through the J2EE policy agents that are deployed into the features and the portal, as discussed above. These agents perform authentication checks as users access the user interface of the portal or the features, and validate the user's credentials at that time. Depending on whether the user seeks to access an offering that is locally or remotely deployed, the validation may go validate via the local access system or the federated identity system.

In the illustrative embodiment, JSR 168 portlets provide a portlet interface that developers may use to integrate user interface functionality into the portal instances. These interfaces provide the mechanisms by which features are able to control the flow and view of their functionality with the portal and how their view will interact with the portal. Also in the illustrative embodiment, Java Server Faces (JSF) provides an interface via which individual JSF components are integrated into a user interface.

The portal framework is the presentation tier for the portal and identity framework, and can provide the presentation tier for offering features. As discussed above, the portal provides services that aggregate and personalize content and format it into channels and application specific user interfaces. In addition, the presentation tier manages session state for users of the system and translation of inbound requests to the appropriate services. In the illustrative embodiment, the Sun Java System Portal Server is the product on which the presentation tier of the framework is deployed. This provides capabilities by which presentation is derived.

The portal framework, although primarily a presentation tier, also addresses the business tier of the architecture. Common functional elements of the portal framework that are reusable across offering features provide services that execute business logic and manage their transactions. The application logic that executes for these presentation tier components reside within the business tier. The business tier is based on the web services architecture and the business process architecture that is described above.

An offering platform's role in the system is defined by the offerings that are loaded into the offering platform. The offerings further define an offering platforms relationship with other offering platforms and its relationships with its asset platforms. The offering determines the offering platform behavior, the associated data transmission, and the knowledge application. The offering platform provides the common features that allows this to happen. From a platform perspective, offering platforms are peers of each other, such that an offering platform can be relocated into different business-driven locations.

Figure 8:
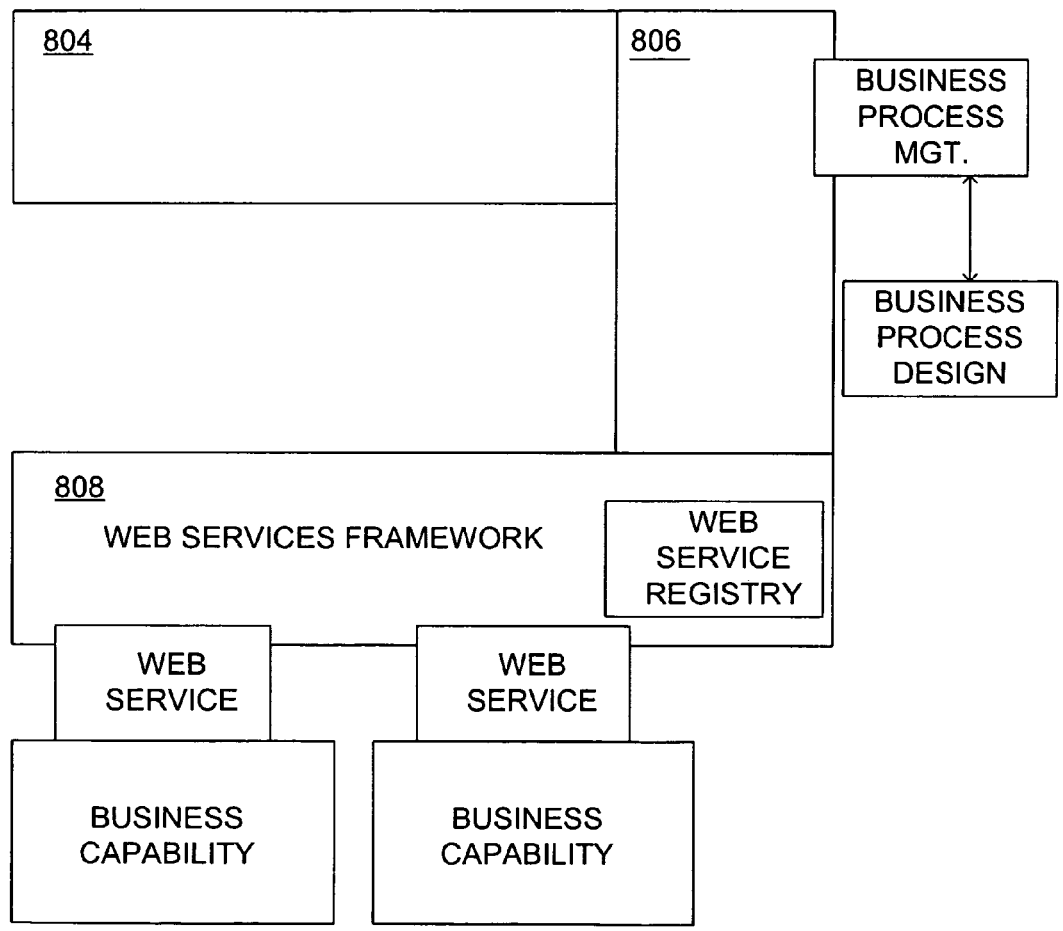
FIG. 8 depicts illustrative components of an offering platform.

In an illustrative example, offering platforms are deployed using a service-oriented architecture approach, in which business processes are separated from the business logic of applications. A business process drives the order in which an application processes data and displays screens in a portal. In the illustrative embodiment, business processes are described using flow style diagrams that have the capability to be compiled into Business Process Execution Language (BPEL). This control may be referred to as "orchestration" and it leverages the publicly exposed standard interfaces that web services provide. FIG. 8 shows illustrative components of an offering platform 802. The offering platform comprises a portal 804, a business process engine (BPE) 806, and a web services framework 808. The illustrative offering platform is implemented using Business Process Modeling Notation (BPMN). Business Process Management (BPM) systems encompass the life cycle management of the business processes as well as the business process engine 806 that performs the business process execution and status tracking. The business processes can be fully automated or a blended mixture of human and automated tasks. The business process engine interfaces within portal 804 manage requests from a user which may initiate a new process or be the continuance of a process. Web services framework 808 executes tasks through the interfaces exposed by the business capabilities through web services. These web services interfaces can be read in through the business process management to provide the business process designer a palette of existing capabilities. The service oriented architecture enables reuse by supporting assembly of existing components described within the web services registry.

The business process engine and web services framework components work together to provide the business functionality delivered by offerings. The business processing engine executes business processes as defined by the BPEL language. This engine takes the BPEL and provides a runtime environment allowing business process management and monitoring.

Figure 9:
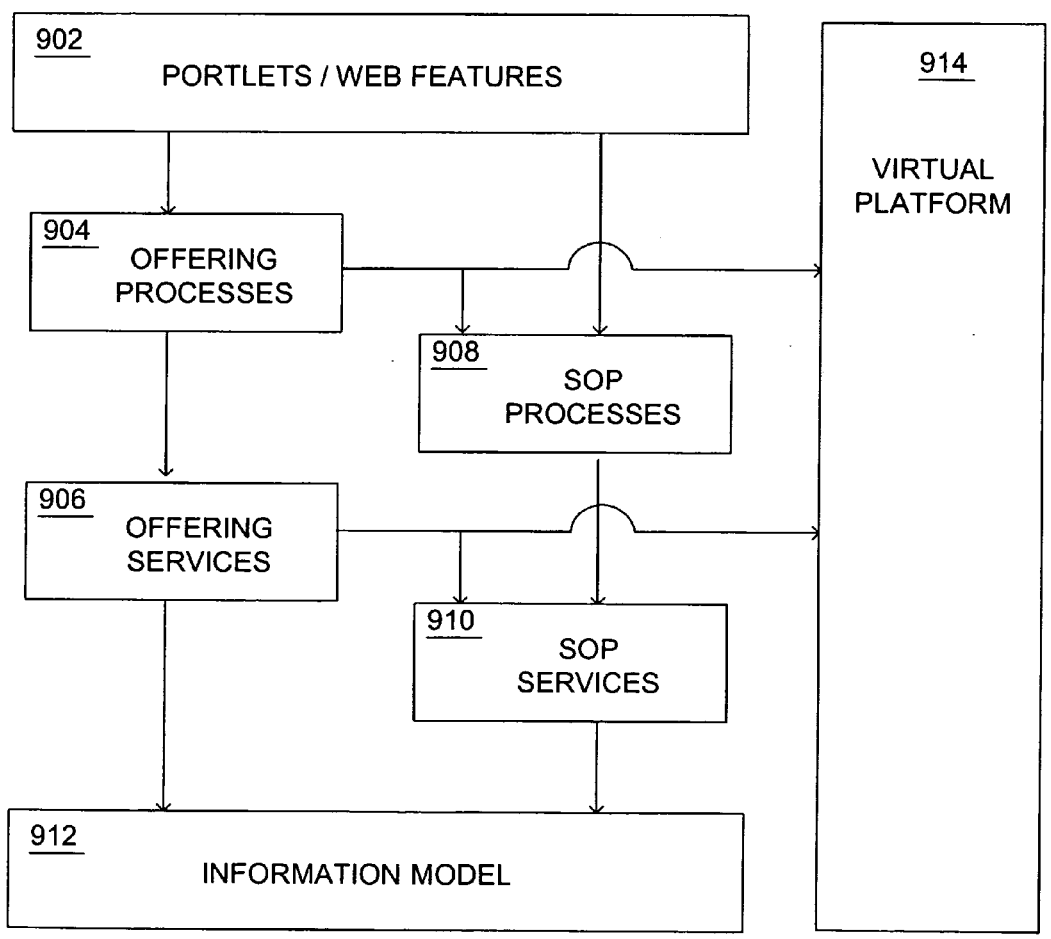
FIG. 9 shows how an architectural pattern applies to the offering platform, including offering processes and services, consistent with the present invention.

In the illustrative example, the functional decomposition architectural pattern of the offering platform is a class-type architecture and is based on the Layer pattern (See, e.g., Buschmann, Meunier, Rohnert, Sommerlad, Stal, 1996). For this pattern, a "component" within a given layer may interact with other classes in that layer or with classes in an adjacent layer. FIG. 9 shows how this architectural pattern applies to the offering platform, including offering processes and services. As shown, components within a portlet/web feature layer 902 can interact with offering processes 904 and SOP (server offering platform) processes 908. Components in the offering processes and SOP processes can also interact with each other and with offering services 906 and SOP services 910. The offering services and SOP services can also interact with each other and with an information model layer 912. Components for each of these layers can interact with a virtual platform 914. Using a class-type pattern in constructing the offering platform allows specialization in the particular layers and permits reduced coupling between the offering platform components.

The architectural approach for the offering platform is a service-oriented architecture. Processes constructed using the BPEL standard allow services to be integrated in a flexible manner. In addition to the architectural standard and interfaces, a set of common services built on top of the those interfaces are made available for each deployment of an offering platform. These platform services are layered on the virtual platform and exposed via web services. Exposing them as web services allows them to be accessed remotely using standard protocols and to be able to integrate easily into the platform processes.

Figure 10:
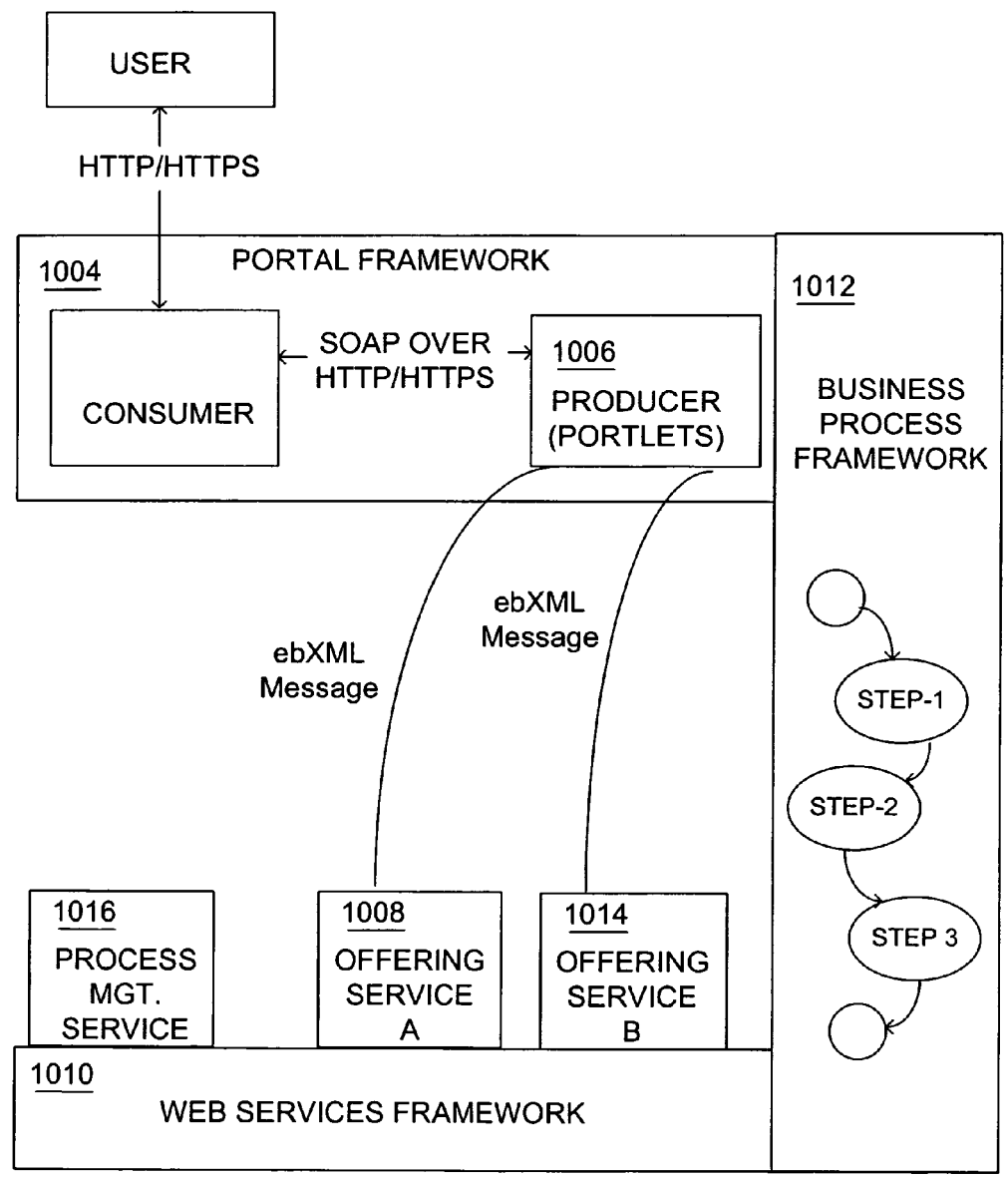
FIG. 10 shows an example where the portal is the primary user interface mechanism for customers.
Figure 11:
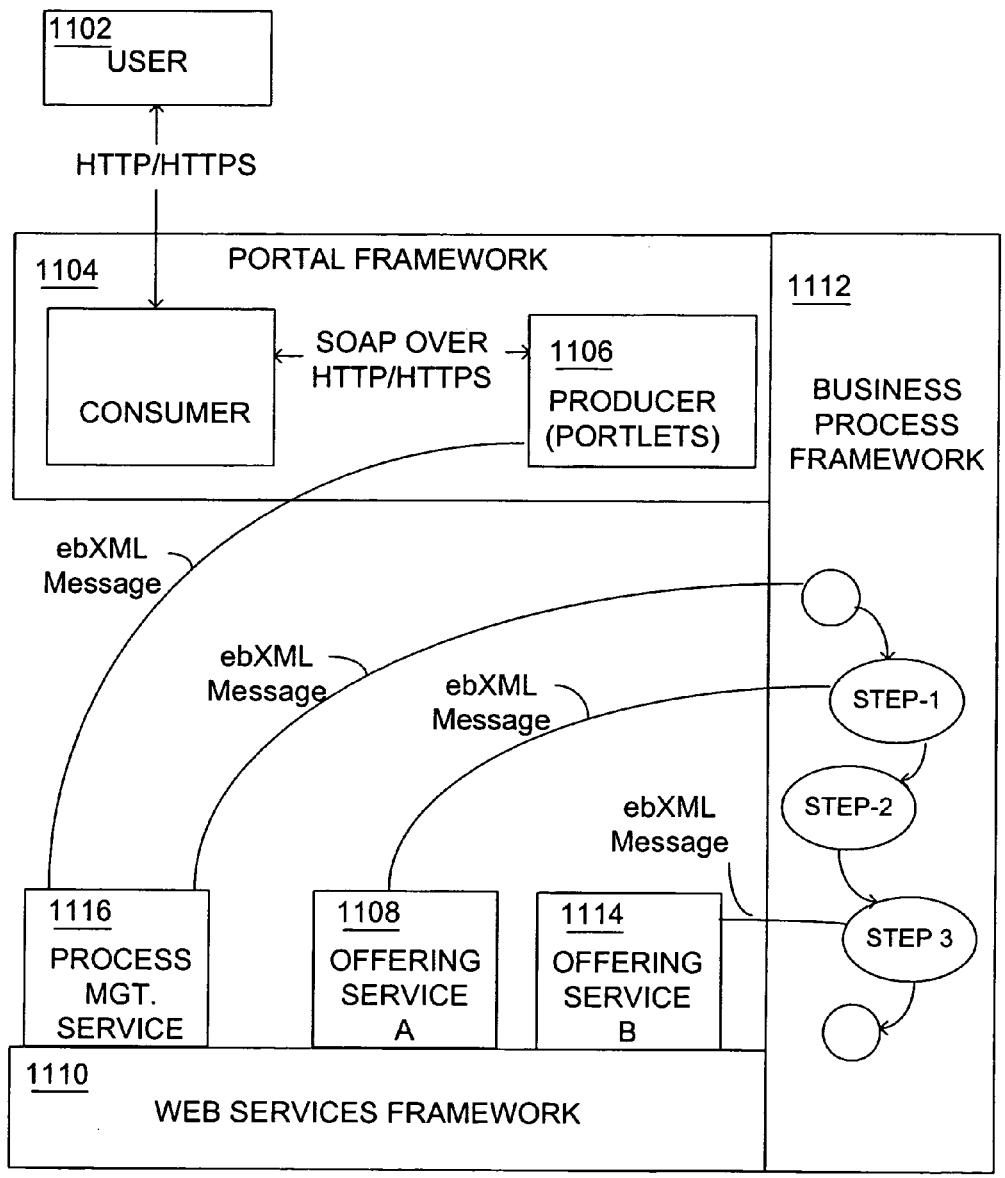
FIG. 11 depicts another example where the portal is the primary user interface mechanism for customers.

As noted above, the virtual platform specifies standards that are used for communication between various components of the offering platform. FIG. 10 shows an example where the portal is the primary user interface mechanism. As shown in FIG. 10, the offering platform includes a portal 1004, a web services framework 1010, and a business process framework 1012. A user 1002 communicates with a portal 1004 using HTTP or HTTPs. Using a protocol, such as HTTP/SOAP or WSRP, a portlet 1006 makes requests to instances of web services 1008 and 1014, which are offering services, hosted in the web services framework 1010. In the example, the web services framework also hosts a business process, process management service 1016. In another example that is shown in FIG. 11, using WSRP for example, the portlet 1006 requests the business process 1016 to be executed.

Offerings are delivered by provisioning their elements in an instance of an offering platform. As discussed below, an offering's elements may also be provisioned into an asset platform. To provision an offering, its components are broken into two logical units (e.g., front-end offering logic and back-end offering logic). The first is the software package that is deployed into the offering platform environment. This may be packaged as WAR file and include classes, portlets, business processes, and the like, that comprise executable elements of the offering. The second element is the deployment package. The deployment package handles operations that an application server deployment descriptor would typically handle, and also describes two other relationships. The deployment package describes relationships with offerings or offering components not installed on the offering platform where the offering is being deployed. Further, the deployment package describes the connection mode required for transmitting the offering. As part of the provisioning process on the offering platform, the communications management service is used to bind the offering to the appropriate communication channel for the required connection mode.

Each offering platform has a registry, which is an XML registry in the illustrative example, to store offering information for that offering platform. During an offering provisioning process, the registry local to the offering platform where the offering is being deployed is updated. In order not to hard code the location of a registry and because an offering can require services or business processes that may reside on another instance of an offering platform, JNDI can be used to locate the appropriate registry. The JNDI resides over a naming service to provide this level of abstraction. A JAXR ConnectionFactory object is registered via JNDI. This registration associates the ConnectionFactory object with a logical name. When an offering platform wants to establish a connection with the provider associated with that ConnectionFactory object, it does a lookup, providing the logical name. The offering platform can then use the ConnectionFactory object that is returned to create a connection to the registry provider. In the illustrative example, the registry is stored in the local database, such as database 520 on the customer system. The JNDI and ConnectionFactory object can reside in memory of the system in which the relevant offering platform is implemented.

An offering platform may need to communicate with another offering platform, for example when the offering platform (e.g., on the customer system) deploys an offering that is provided from another offering platform (e.g., the vendor system). For offering platforms to operate cooperatively to deliver offerings, the following illustrative information may be specified:
- The offering platform instances where offerings or offering components reside that are not installed on the offering platform where the offering is resident.
- The messaging format used to communicate with offerings or offering components not installed on the offering platform where an offering is resident.
- The connection mode and messaging direction flow between an offering or offering components delivered on two or more instances of an offering platform.
- When an offering is deployed, its deployment package provides the necessary information to locate the components that comprise an offering.
- The information model defines a schema and that schema is represented in XML-Schema (XSD) used in messaging between offering platforms.

In addition to the above definitions, the architecture may assume that offering platform to offering platform communication will be performed in the context of a web service operation. The web service operation can either be a remote invocation of an instance of a web service or the remote execution of a business process. In the illustrative example, the offering platform relies on the kernel platform services and defined processes to implement these operations.

Figure 12:
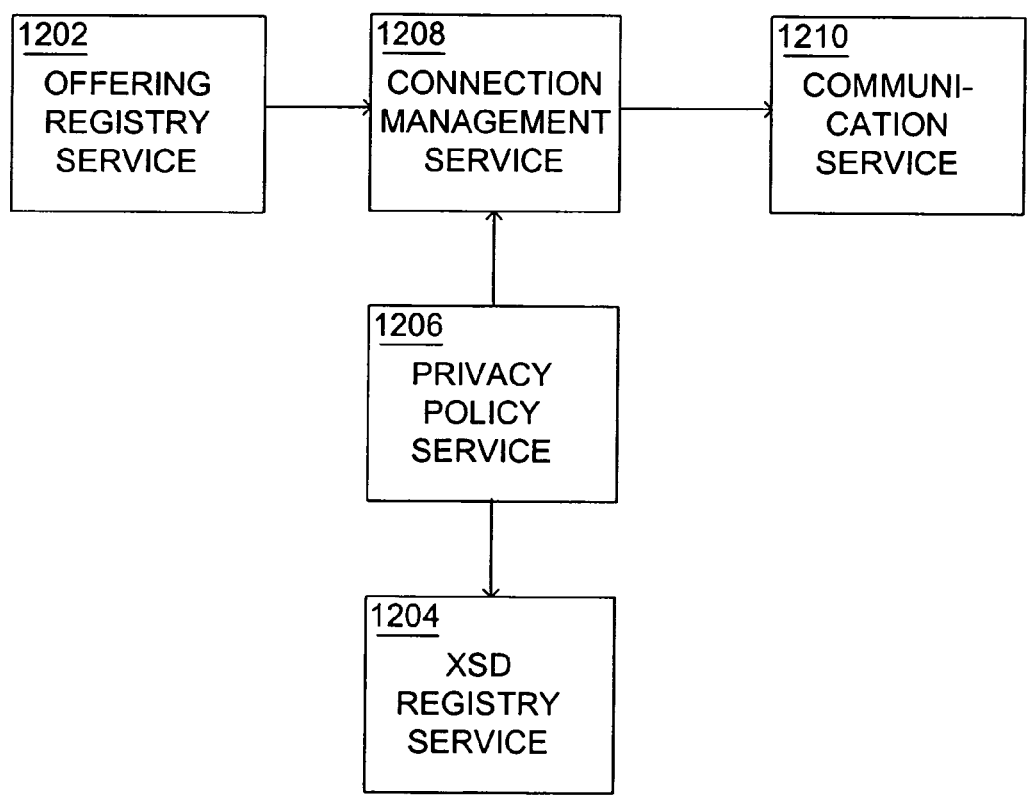
FIG. 12 is a block diagram that illustrates components of the offering platform that are involved in offering platform to offering platform communications.

FIG. 12 is a block diagram that illustrates components of the offering platform that are involved in offering platform to offering platform communications. As shown, the offering registry service 1202 provides access to the registry for components of an offering. This includes components that may not be local to this instance of the offering platform. In the illustrative example, XML schema are used for communication, however, additional or alternative definitions may be used. In the illustrative example, the XSD registry service 1204 contains the valid XML schema definitions that can be used to communicate between web services. The privacy policy service 1206 creates a mapping of a privacy policy to a given data element of an offering. The connection management service 1208 takes the higher level request for a service and along with the policy service constructs the message to send to the remote service. This service may not perform the actual message passing or lower level communication operations. It coordinates with the communication service 1210 to perform those operations. The communication service abstracts away the lower level details of supplying reliable communications between offering platforms. Depending on the systemic qualities required by the offerings hosted on the offering platform, the communication service may be configured, for example, to handle large volumes of data and more reliable transport of the data.

An offering may be deployed where its relationship with other offerings is determined by the connection properties specified in an offering deployment package. The combination of these properties can be used to deploy an offering. This gives the offering development teams a mechanism to create different offering "models" by simply specifying different communication properties. One property is the connection mode property, which specifies the state change which causes a connection to be enabled and the state change which causes the connection to be disabled. In the table below are illustrative connection modes specified by the system.

| Connection Mode | Definition | Enable Trigger | Disable Trigger |
| --- | --- | --- | --- |
| Always | A connection is permanently established between two offering platforms | Offering is installed | Offering is uninstalled |
| Scheduled | A connection is established with a remote offering platform on a scheduled basis | Scheduled Time | Completion of operations |
| Alarm | A connection is established with a remote offering platform when an offering is processing an alarm. An alarm is the recognition of a significant state change in the one or more the managed assets under the control of a offering platform | Alarm is detected and an offering has another offering or offering component to which to pass the alarm | Alarm has been received by the remote offering platform |
| None | No remote connections are allowed | Not Applicable | Not Applicable |

In addition to connection types, offerings can specify a connection direction. This property specifies the data flow direction from a "local" offering platform of reference to a "remote" offering platform. The following three connection directions are specified by the illustrative architecture.

| Connection Direction | Definition | Example |
| --- | --- | --- |
| Bi-Directional | Data moves to and from the local and remote offering platform | An offering requiring command response interactions among various offering platforms |
| Upstream | Data moves only from the local offering platform to the remote offering platform | Selected event data flows upstream to different instances of an offering platform to implement an automated escalation offering |
| Downstream | Data moves only from the remote offering platform | Software updates flow downstream on a scheduled basis |

Quality of service properties define the quality of attributes for a connection, once it is established. The connection manager relies on the underlying implementation of the communication services to implement these properties. In the illustrative example, the architecture specifies an implementation that provides the attributes recited in the table below.

| Quality of Service Attribute | Definition | Default Value |
| --- | --- | --- |
| GuaranteedDelivery | The message sent to a remote offering platform is guaranteed to be delivered | No |
| ConnectionTimeout | The amount of time the communication manager will wait to make a connection to a remote offering platform | 60 seconds |

An offering may have an explicit privacy policy associated with each data element that an offering can process. This privacy policy consists of an access control list (ACL) which specifies what users or groups can access the data and a Time To Live attribute (TTL). The connection management service is responsible for creating a message to send to the remote instance of the offering platform that contains this privacy policy.

Figure 28:
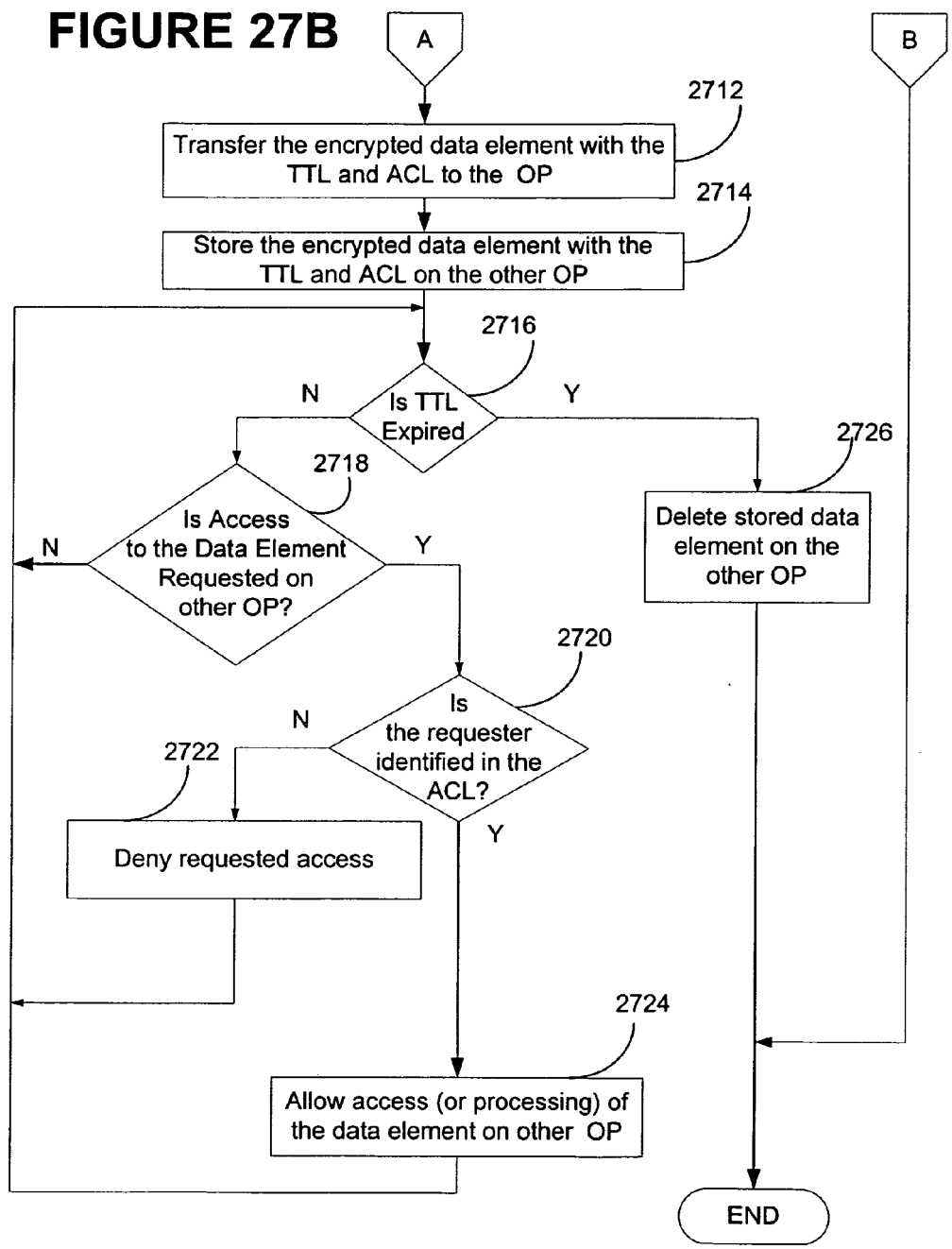
FIGS. 28A-B depict the transformation of a data element after the application of a privacy policy.

Web services share schemas in the illustrative example, not types, hence the privacy policy is mapped onto each schema element (or agreed up level of schema element) in the documents exchanged as part of web services orchestration. FIGS. 28A and 28B depict an example of how the Connection Management Service 1208 may map privacy policy to an instance of a simple XML schema. The XML document in FIG. 28A comprises a root element, "fmaevent," that contains a required attribute called "eventid." The "fmaevent" element contains four different child elements: "eventtype," "hostname," "eventtime" and "eventdata." A simple transformation to include the privacy policy would be to include the privacy policy elements as child elements under "fmaevent." After the transformation, the schema would appear like the XML document depicted in FIG. 28B. The child element "ACLKey" is a reference to an access control list for the data element and "TTL" represents the time to live for the data and is specified in, for example, Greenwich Mean Time. This transformation may be applied to any schema element.

Figure 13:
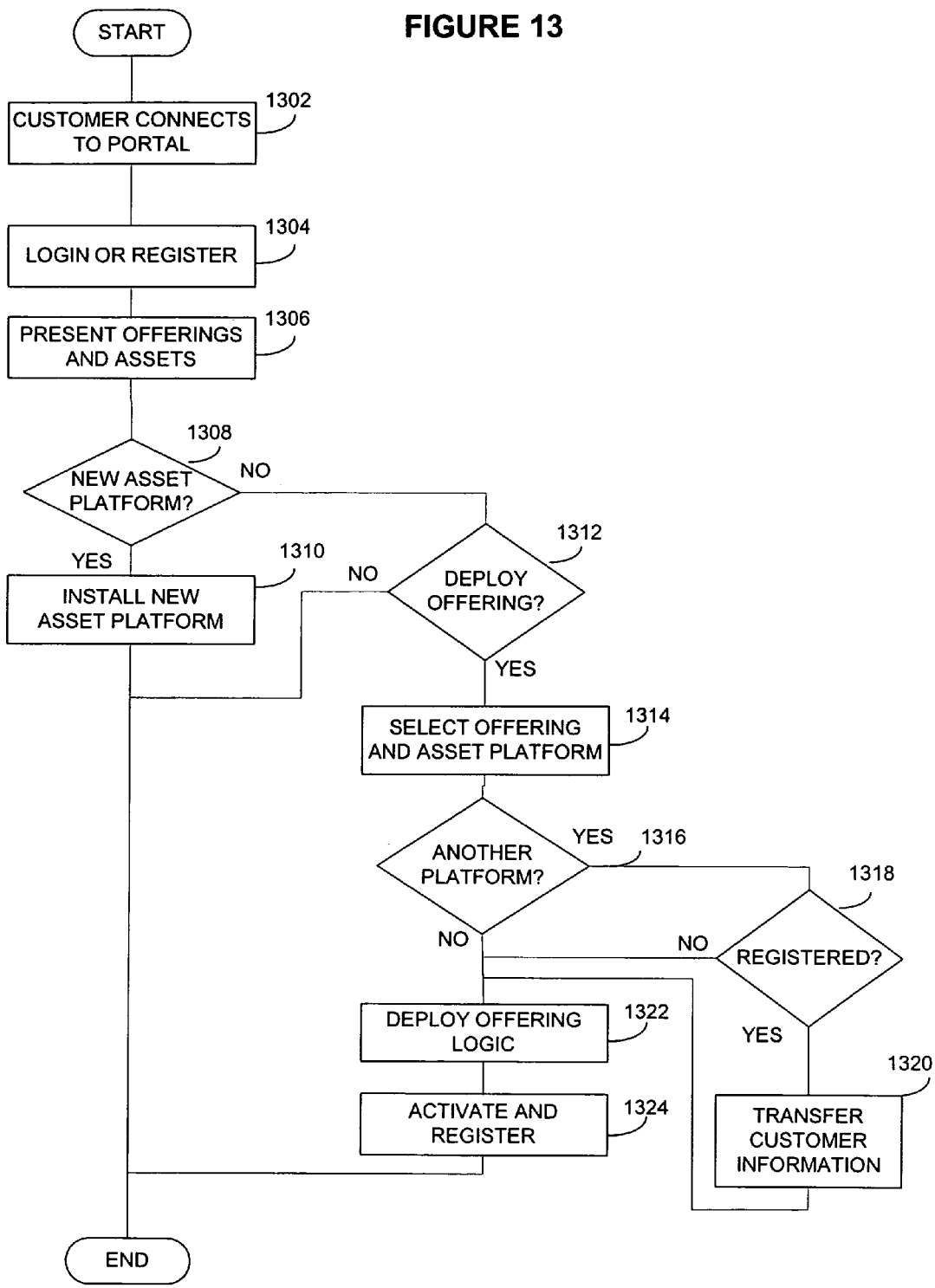
FIG. 13 is a flow diagram illustrating the exemplary steps performed by the offering platform for registering customers, asset platforms, assets, and offerings.

After an offering platform is installed on a vendor, partner, or customer system, the offering platform is available for registering customers, asset platforms, assets, and offerings. FIG. 13 is a flow diagram illustrating the exemplary steps performed by the offering platform for registering customers, asset platforms, assets, and offerings. The customer registers with an offering platform that is known to them. For example, if the customer wants to deploy an offering that is made available from an on-site offering platform, the customer registers with the offering platform on the customer system. To register, the customer accesses the offering platform portal 1302. In the illustrative example, the customer does this by using a web browser and entering a known Web address of the portal. The portal presents a request for the user (e.g., an employee of the customer accessing the portal) to login or register for the first time (step 1304). The user login information includes, for example, a username and password. If the user has not previously registered with the offering platform, the user may register.

Figure 14:
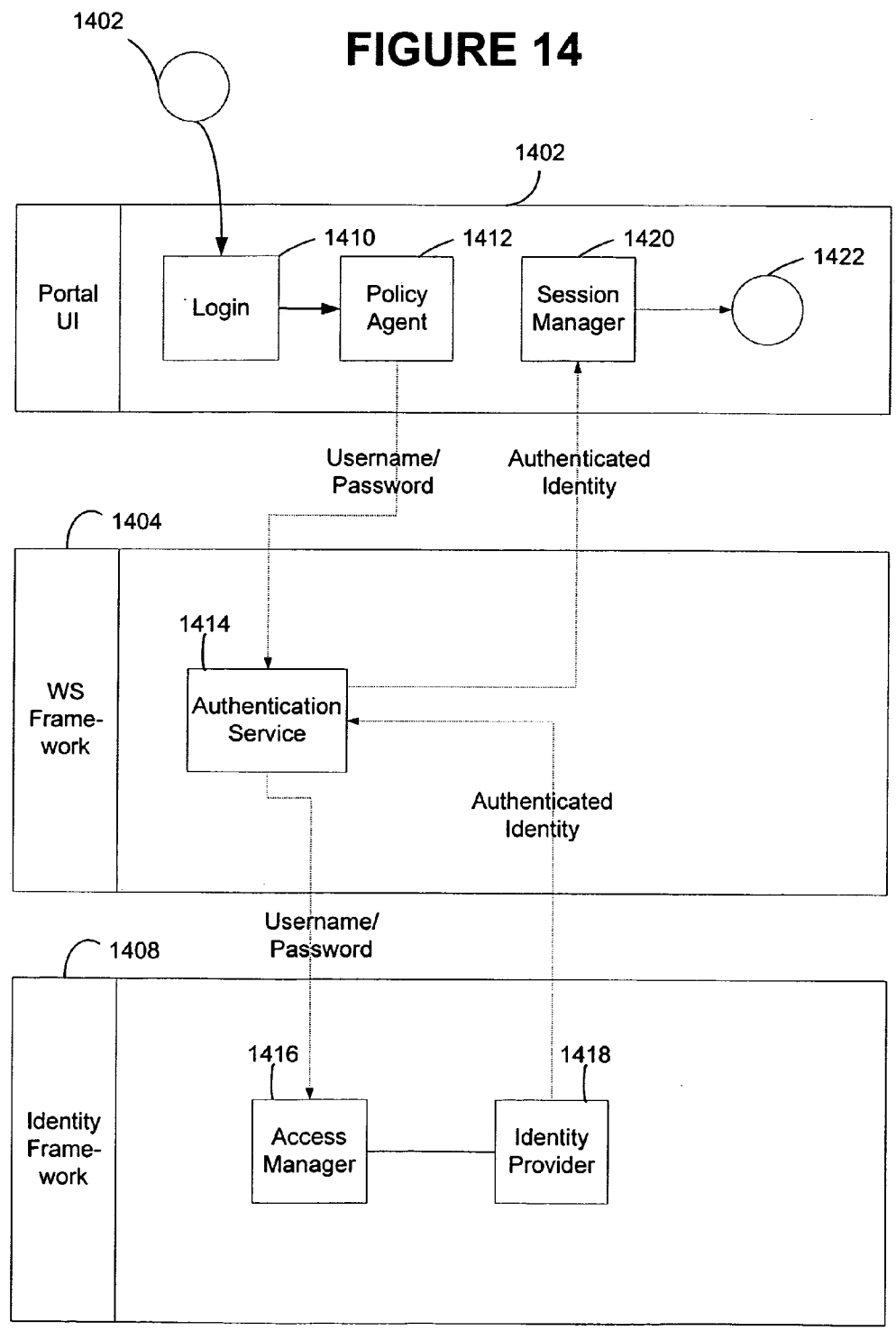
FIG. 14 depicts in more detail the processes performed by the offering platform during for authenticating a user.

FIG. 14 depicts, in more detail, processes performed by the offering platform during step 1304 for authenticating a user. The illustrative frameworks include the portal user interface 1402, the web services framework 1404, and the identity framework 1406. The portal user interface 1402 receives the user's username and password information 1408 at its login module 1410, which accepts user input. The login module forwards the information to policy agent 1412, which screens the user input to determine whether the basic format is correct and determines the relevant identity framework. Policy agent 1412 forwards the information to an authentication service 1414 in the web services framework 1404. The authentication service in turn forwards the information to an access manager 1416 in the identity framework 1406. The access manager is a module that receives information transmitted to the identity framework. Access manager 1416 forwards the username and password to an identity provider 1418, which authenticates the information by comparing it to known usernames and passwords stored in the local database in secondary storage. The identity provider returns the authentication results to the authentication service, which forwards the results to a session manager 1420 of the portal. For the case in which the user identity is to be federated, the identity provider further obtains a federated identifier for the user that is used at the associated offering platforms. The session manager outputs the results 1422 to the user.

Returning to step 1304 of FIG. 13, the offering platform associates the authenticated user with a unique customer identification (ID). Customer IDs and their associated users are stored in the local database in the local secondary storage, such as database 520. The offering platform determines the user's associated customer ID by querying the database. If a corresponding customer ID does not exist, the offering platform registers a new unique customer ID by storing the customer ID in the database and associating the user with the new customer ID.

After the customer has been authenticated, the offering platform displays the customer's available offerings and their associated assets (step 1306). The customer can then choose whether to deploy a new asset platform or an offering (step 1308). If the offering platform receives customer input to deploy a new asset platform in step 1308, then the offering platform, effects deployment of the asset platform (step 1310). Activation of an asset platform comprises instantiating the asset platform on the relevant data processing system, and registering the asset platform by recording a unique asset platform ID in the database with an association to the customer ID. After the asset platform is registered, it identifies available assets and registers those assets with the offering platform, as will be described in more detail below.

The customer can also request registration of a clientless interface. As described above, a clientless interface provides for deploying offerings to customer assets without the use of an asset platform. To register the clientless interface, the customer requests registration of each data processing system that will mount the clientless interface file system. Then, the offering platform creates a corresponding file system on a per system basis. Asset discovery is then performed to identify associated assets and populate the database with information about the discovered assets that are connected through the clientless interface. Once registration is complete, the customer may select what offerings are needed for each asset. If the offerings are clientless interface compliant, the offering platform deploys them into the created file system.

The offering platform may receive an input from the customer to deploy an offering (step 1312). Using the portal, the customer selects which offering to deploy and the desired asset platform for deploying the offering to the relevant asset (step 1314). If the offering is handled by another offering platform (step 1316) (e.g., the offering is transmitted from the vendor system but the customer is logged onto the customer offering platform portal), then the offering platform determines whether the customer is registered with the new offering platform (step 1318). If the customer is not registered with the new offering platform, then the current offering platform transmits the customer's registration information to the new offering platform, where the customer is registered (step 1320).

The relevant offering platform then deploys the offering logic (e.g., front-end offering logic) to the asset platform (step 1322). In addition to the offering, the offering platform also transmits information on the relevant asset and instructions on how to install and configure the offering. How the offering is deployed depends on the nature of the offering and the asset platform configuration. For example, if the offering is a product upgrade that is made available on CD-ROM, the offering is deployed via mail. In another example, the offering may be downloaded from the vendor system or customer system. In that case, the offering platform may send the offering to the asset platform or the asset platform may retrieve the offering when it periodically polls the offering platform for available offerings. If the asset platform has been notified of the offering, the asset platform may then poll the offering platform for the offering. Once the offering is received by the asset platform, the asset platform deploys the offering to the relevant asset, which is identified in the offering logic. The offering platform registers deployment of the offering in the local database, such as database 520 (step 1324). The database entries include the offering's unique offering ID, as well as information about the asset platform and relationships between relevant offering platforms.

Figure 15:
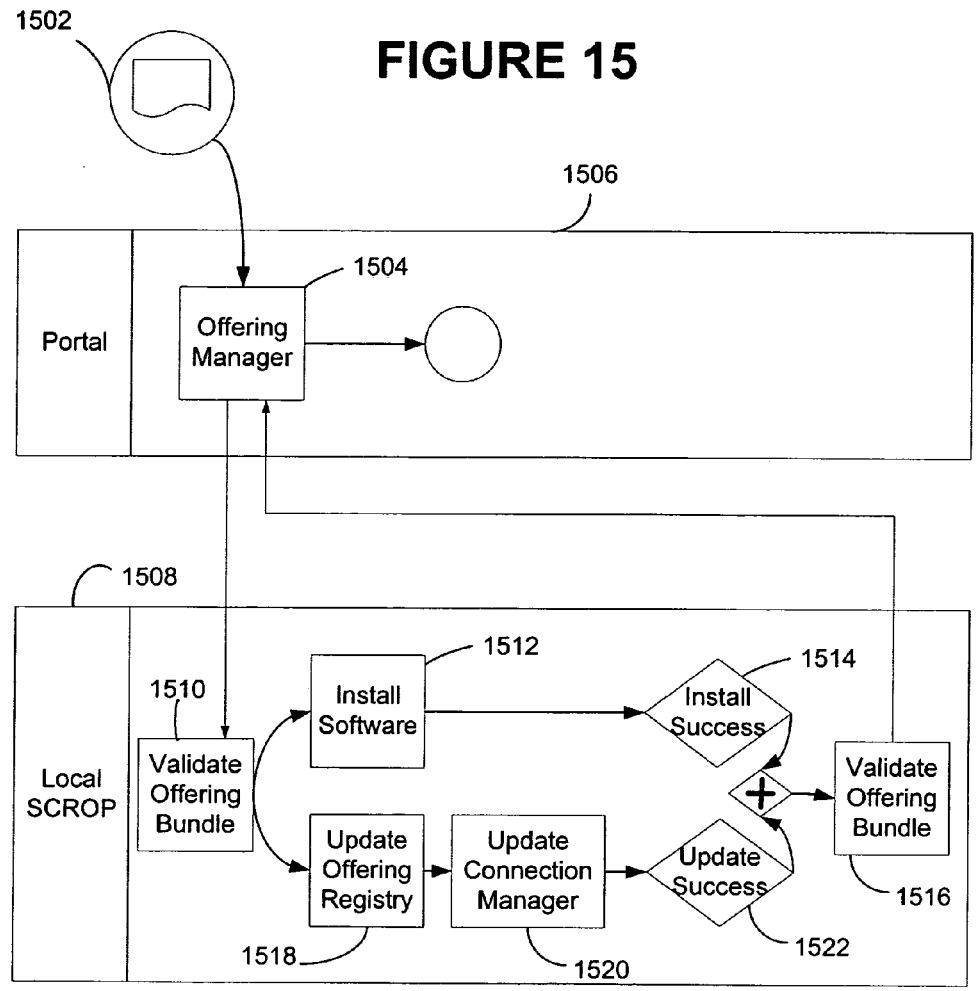
FIG. 15 is a functional block diagram that illustrates an exemplary business process for registering an offering.

FIG. 15 is a functional block diagram that illustrates an exemplary business process for registering an offering. In the example, a customer submits a request 1502 to deploy an offering via the portal 1506. An offering manager component 1504 in the portal receives the request and forwards the request to the portal's offering platform 1508. The offering platform validates 1510 the desired offering bundle, which includes the offering software and offering-related information (e.g., installation instructions), and deploys 1512 the offering. If the offering platform receives a message from the asset platform that the installation was successful 1514, then the offering platform notifies the originating offering platform and the customer 1516. The offering platform also updates the registry with information that the offering is deployed 1518 and updates the connection manager with information about connection requirements for deploying the offering 1520. If the registration was successful 1522, the offering manager notifies the originating offering platform and the customer 1516.

Offering platforms are deployed using a desired offering platform deployment architecture consistent with the customer's needs. Offerings fit into the offering platform deployment architecture where most practical. In the illustrative embodiment, offering platforms are deployed with flexibility to scale from small deployments, such as on a single customer system, to large distributed deployments such as at the vendor location. In a simple case, an offering platform is deployed in a single server. However, the offering platform may be deployed on multiple servers or even multiple servers located in different locations. The amount of availability of the servers has an impact on cost. The appropriate level of availability depends on the offering and perhaps the level of service within an offering. For example, a lower level availability may be acceptable for a free service, but a high level of availability may be required to support mission-critical internal and customer systems.

The offering platform relationship deployment architecture may leverage horizontal scaling techniques. That is, the workload may be computed on multiple low-cost servers instead of a single or much fewer larger servers. Horizontal scaling may be cost effective from the capital perspective and avoid re-architecting or re-engineering if the workload requires more capacity than available from the largest servers. A horizontally scaled architecture enables workload scalability to be independent of the capacities of individual servers.

As discussed above, an asset platform is a component that is deployed on a target data processing system to support interaction with the system and provide a container where offering-specific capabilities can be loaded. An asset platform provides common elements that simplify the development and integration of offerings. Common elements include the abstraction of the communications method to the offering platform, a job scheduler that can manage offerings execution, and security and privacy control that can be leveraged by offerings.

Figure 16:
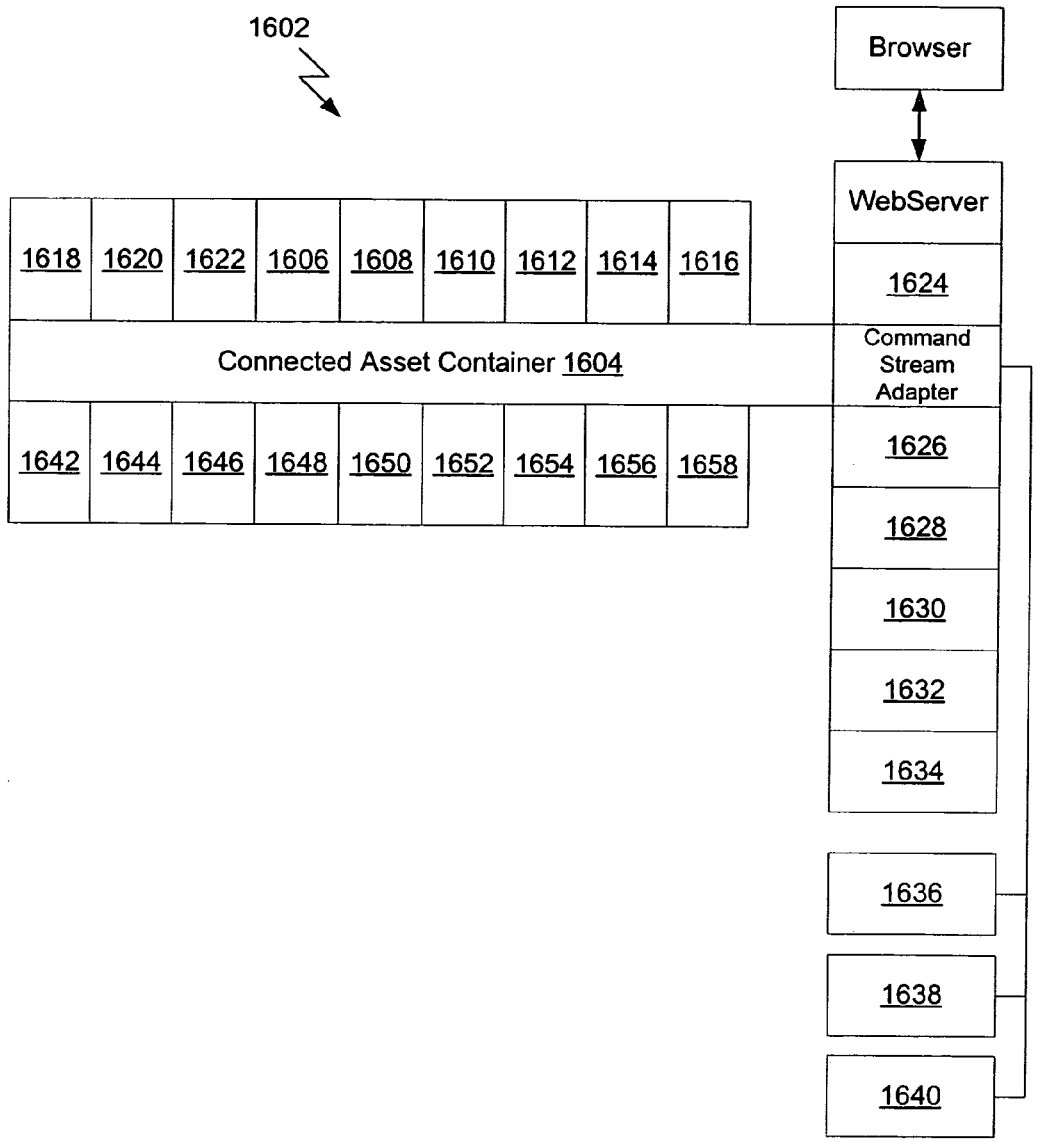
FIG. 16 depicts an asset platform consistent with the present invention.

FIG. 16 depicts an illustrative asset platform 1602. As shown in FIG. 16, the asset platform includes an asset container 1604. In the illustrative embodiment, the asset container is a Cacao container. Cacao is manufactured by Sun Microsystems, Inc. of Santa Clara, Calif. Cacao includes several functional modules, such as an event forwarding discriminator 1606, a command invoker 1608, a logging manager 1610, an access control module 1612, container instrumentation 1614, and a key manager 1616. In addition to the Cacao modules, methods and systems consistent with the present invention provide additional modules for the Cacao-based asset platform. For example, the following illustrative base modules are built on top of Cacao: asset platform management 1618, job scheduler 1620, and an audit module 1622. The asset platform management module provides services to manage the container, including asset platform registration and offering provisioning Asset platform registration includes functionality necessary to make the asset platform known to one or more offering platforms. Offering provisioning allows a management interface to browse the offerings available from the connected offering platforms and to download and install the dependent offering and asset management modules.

Job scheduler 1620 provides scheduling services so that telemetry can be sent to the offering platforms periodically, and so that commands which are received at the asset platform may be scheduled to execute at a particular time. For example, the job schedule may periodically poll the attached offering platform for deployable offerings. Audit module 1622 provides for recording and retrieving audit events. Offering modules may call the audit module when an auditable event occurs.

One or more protocol adapters are also built on top of the Cacao-based asset platform to provide core communication services. The offering management modules use these protocol adapters to communicate with the offering platform. A web service adaptor 1624 allows an offering platform to communicate synchronously with offering modules in the asset platform. A web service client transport 1626 is a protocol adaptor that allows offering modules to synchronously communicate with an offering platform. A message transport 1628 is a protocol adaptor that allows bidirectional asynchronous communication between offering modules and an offering platform. A distribution transport 1630 is a protocol adaptor that allows offering modules to download bulk data/content from an offering platform. A legacy agent interface 1632 is a protocol adaptor that allows legacy agents to communicate with an offering platform. In the illustrative example, these legacy agents may be ported over time to the current platform. A remote access protocol adaptor 1634 allows for remote access applications, such as Shared Shell and Shared Web by Sun Microsystems, Inc., to communicate.

Further, one or more management user interfaces are also built on top of the Cacao-based asset platform. The enable a user to manage the asset platform and interact with the modules resident in the container. An asset management user interface 1636 accesses the base modules to manage the asset platform. Illustrative functions include asset platform registration with the offering platform, offering provisioning, audit review, and job management. An asset browser user interface 1638 allows a user to browse or navigate the assets instantiated by the asset modules, which are described below. A software updater user interface 1640 may be used to manage the software deployed for an asset. This user interface uses the software update offering module.

In addition, one or more asset modules may be implemented on top of the Cacao-based asset platform. The types of asset modules that are implemented depends on what offerings have been provisioned. These modules discover and manage assets visible from an asset platform. In the illustrative example, the asset modules are factored along CIM-like lines, and expose a set of JMX attributes and methods. They also support serialization of the discovered assets into CIM XML format. There may be a different asset module for each type of asset. For example, a system asset module 1642 discovers system assets, such as a workstation. A device asset module 1644 discovers device assets, such as a CPU in a workstation. A network asset module 1646 discovers a network asset. An event asset module 1648 discovers an event asset. An application asset module 1650 discovers an application asset, such as a word processing program. A software package asset module 1652 discovers a software package asset, such as StarOffice.

One or more offering modules may be implemented on top of the Cacao-based asset platform to support offerings hosted on connected offering platforms. These modules may depend on one or more of the asset modules or other offering modules. Illustrative offering modules include an asset management module 1654, which exposes the assets instantiated by the asset management modules. A software update module 1656 manages software deployed on an asset. An offering-3 1658 module manages another illustrative offering named offering-3.

As described above, an asset can be something identified by and monitored or acted upon by an offering. Having been discovered by an asset platform, assets have relationships to each other. For instance, the asset platform instance itself is an asset that runs in the context of an operating environment (such as an operating system or/and a Java VM). That operating environment has a relationship to one or more hardware assets on which it runs. Complex asset relationships can be determined using the relationships determined from each individual asset.

Figure 17:
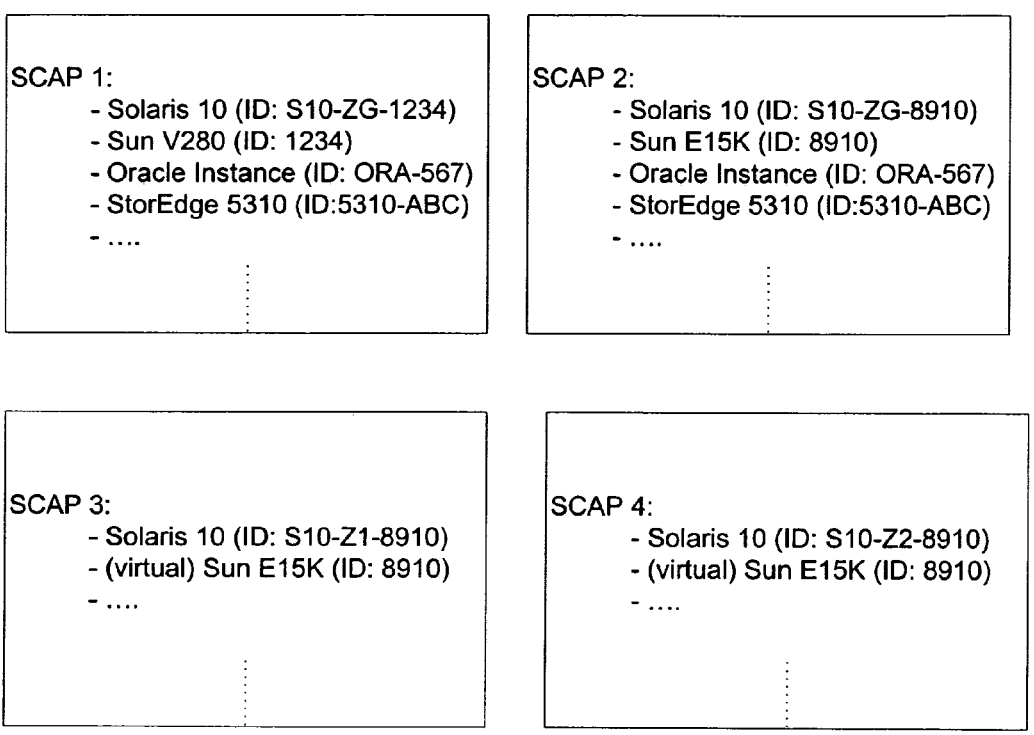
FIG. 17 shows an example of illustrative assets detected by four asset platform instances and reported back to an offering platform.
Figure 18:
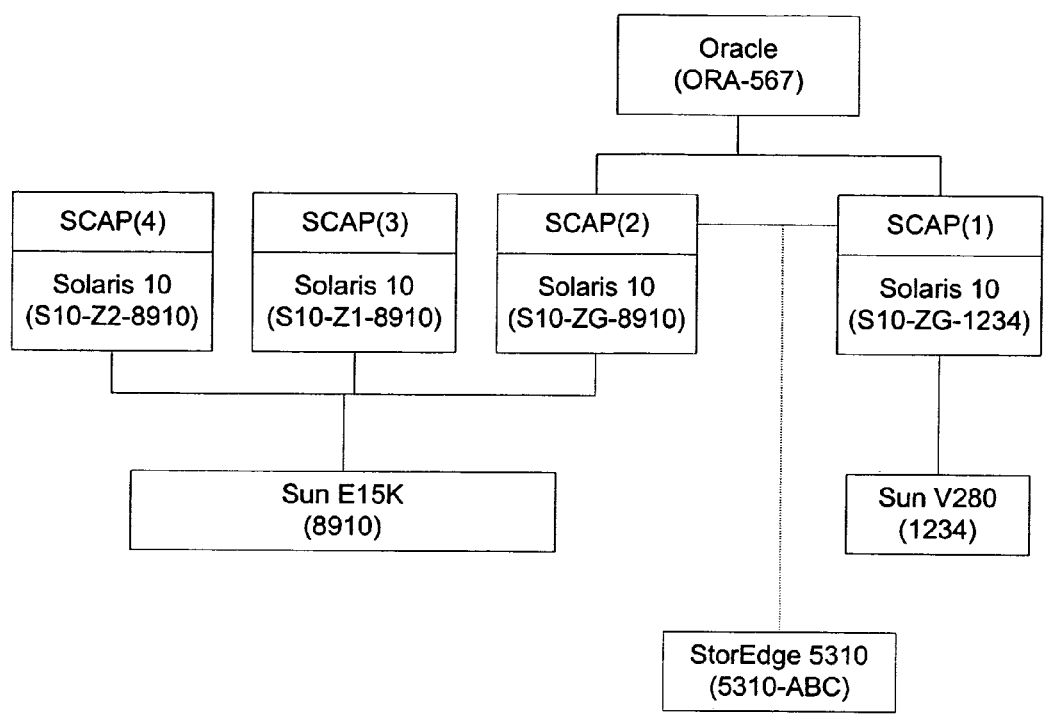
FIG. 18 depicts the resulting set of relationships that the offering platform could deduce from the assets of FIG. 17.

FIG. 17 depicts an example of some high-level assets detected by four asset platform instances and reported back to an offering platform. FIG. 18 depicts the resulting set of relationships that the offering platform could deduce. As shown in FIG. 18, the offering platform could conclude, based on the relatively simple data reported by the asset platforms, that:

Asset platform 2, Asset platform 3, and Asset platform 4 are all running on the same physical hardware in different Zones, Asset platform 2 is in the Global Zone on the E15K and owns (in this case) reporting on the hardware itself, Asset platform 1 and Asset platform 2 share an instance of Oracle (i.e., they are clustered in some fashion), and Asset platform 1 and Asset platform 2 can both see the StorEdge 5310, and the offering platform does not think it is two different devices.

As assets are related to offerings, the discovery of individual assets is directed by the offerings. That is offerings identify which assets are to be discovered and provide information on where to look for the offerings. However, each offering does not have to rediscover the same set of assets. To facilitate the discovery of assets in a shared fashion, the asset modules on the asset platforms include the discovery methods and populate local data models in the asset platform. Thus, redundancy can be prevented.

For example, an offering bundle may be shipped to a customer for installation on the customer system. The offering includes a set of asset platforms that discover the operating environment (such as the operating system or/and a Java Virtual Machine (VM)) on which the asset platform runs, as well as the basic hardware components on which the operating environment runs. As assets may be local or remote to the asset platform, the offerings' discovery methods may also leverage local facilities (e.g., local APIs or data in files) or remote/networked ones (e.g., SLP or JNDI).

When an asset is discovered by an asset module, the asset module populates a name space with information on the asset. Offerings may not have specific asset modules with discovery facilities of their own, and may instead leverage the asset modules of another offering. In this case, the offering without the asset module has a dependency on the other which needs to be checked at time of provisioning. For an offering with an asset module, it populates the name space for each asset uniquely. More specifically, each asset has a name which may no be used by another asset discovered by the asset module, regardless of the asset platform context in which the asset module is running. As a result, if two different asset platforms report the same asset to an offering platform, the offering platform will not be fooled into thinking it is two different assets. For example, in a JMX implementation, the discovery MBeans of the various asset modules, in the aggregate, populate an overall name space of assets to which the given asset platform can communicate. Each offering also communicates the identities (and other information necessary as determined by the offering) of each asset upon discovery to its associated offering platform.

When the asset is a person, the person is identified by their account/identifier in the federated name space managed at one or more of the offering platforms. The asset platform may know about specific identifiers for purposes of granting specific rights, but may not discover them and populate the name space directly.

Figure 19:
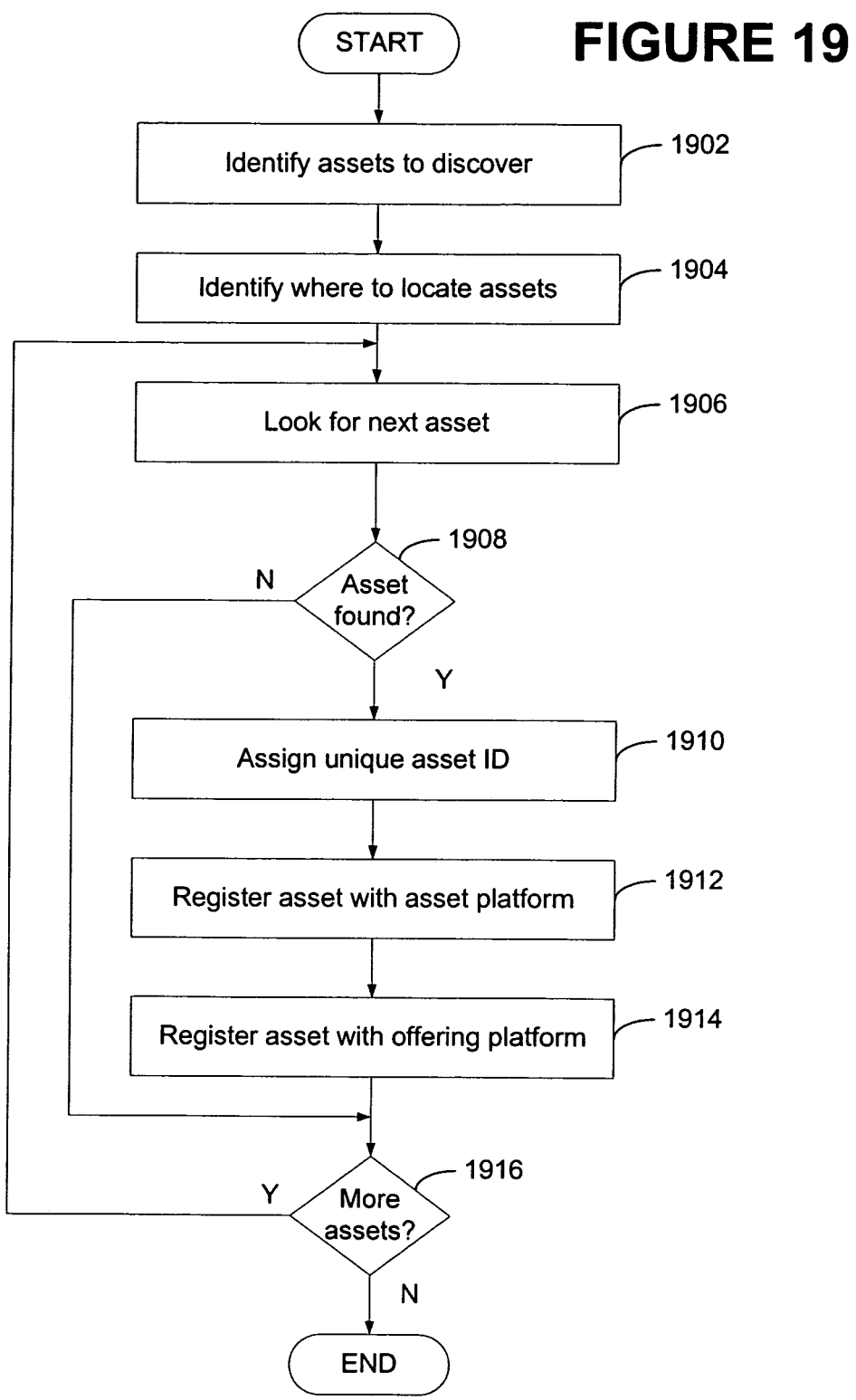
FIG. 19 is a flow diagram illustrating the exemplary steps performed by an asset platform for discovering assets.

FIG. 19 depicts a flow diagram illustrating the exemplary steps performed by an asset platform for discovering assets. As stated above, the asset platform receives information from the offering on which assets to discover and where to look. The asset manager of the asset platform identifies which assets to discover from the information received from the offering (step 1902). The information from the offering includes, for example, signatures of what to look for, such as a server running on Linux. The offering also provides information on where to look for the assets, such as in the operating system registry (step 1904). Having received this information from the offering, the asset manager looks for the first asset (step 1906).

If the asset manager finds the desired asset (step 1908), the asset manager assigns the asset a unique asset ID (step 1910). Then, the asset manager registers the asset with the asset platform by recording the asset ID and its location in a local database (step 1912). Also, the asset manager forwards the asset ID and location to the offering platform for registration by the offering platform (step 1914). After registering the asset with the offering platform in step 1914 or if the desired asset was not found in step 1908, the asset platform determines whether there are additional assets to discover (step 1916). If there are more assets, then program flow returns to step 1906 to look for the next asset.

In certain situations, there may be no data processing system on which to store and register an asset platform to discover assets. For example, the asset may be firmware on a mobile phone, on which an asset platform cannot be installed. The clientless interface enables an offering platform to interact with a customer asset without having to deploy an asset platform. In the illustrative example, the clientless interface can rely on client software that may already be built into the customer's operating system to deliver information bi-directionally.

The clientless interface provides a networked file system. The offering platform hosts a file system for customers to connect to using the remote file system capabilities of their respective operating systems. Customers register in the same way regardless of whether they are using an asset platform or a clientless interface. The technology used for communication with the assets is driven by the offering. For example, if the asset is firmware on a mobile phone, the offering may define the protocol to be a the Wi-Fi protocol. If a customer selects an offering that requires a clientless interface then the offering platform instantiates a clientless interface file system. The clientless interface may be deployed for the asset in addition to an asset platform. This model enables the offerings to decide which technology to implement and to allow deployments to be driven by the needs of the offerings.

The clientless interface may be a base level deliverable with an offering. That is, the clientless interface provides, at a minimum, a capability for basic level offerings with zero touch on the customer device since an asset platform may not need to be deployed. As the customer moves up the offering complexity chain, the customer may need an additional interface on the customer's device. At that point, an asset platform can be deployed through the existing clientless interface link enabling a seamless upgrade path.

Figure 20:
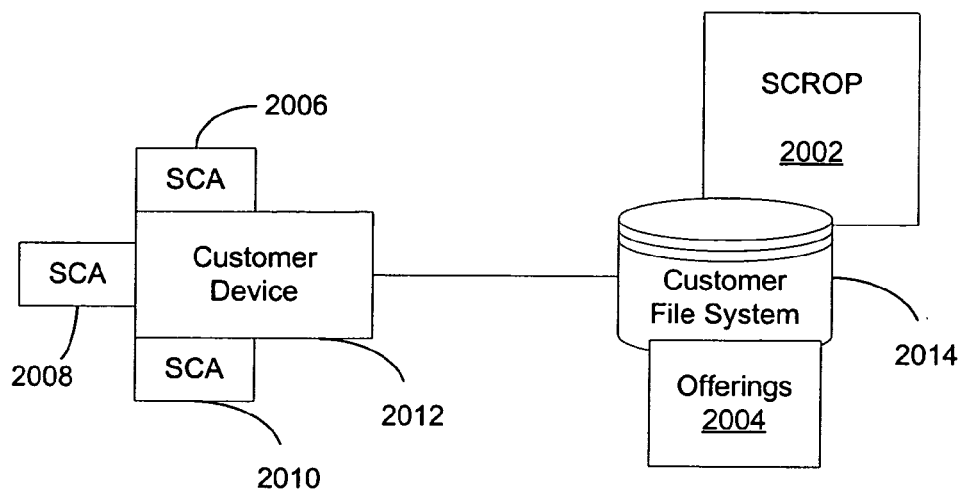
FIG. 20 shows a functional block diagram of an offering platform supporting a clientless interface connection to a customer device.

FIG. 20 shows a functional block diagram of an offering platform supporting a clientless interface connection to a customer device. The illustrative architecture abstracts out the communications model from its resource tier, so the clientless interface provides the same information as would an asset platform. In the illustrative example, offering platform 2002 includes an offering 2004. The offering is associated with one or more assets 2006, 2008, and 2010 on a customer device 2012. The assets may be, for example, a firmware 2006, an operating system 2008, and a mobile phone hardware model 2010 associated with a mobile phone 2012. Offering platform 2002 creates a file system 2014 for the customer device.

Figure 21:
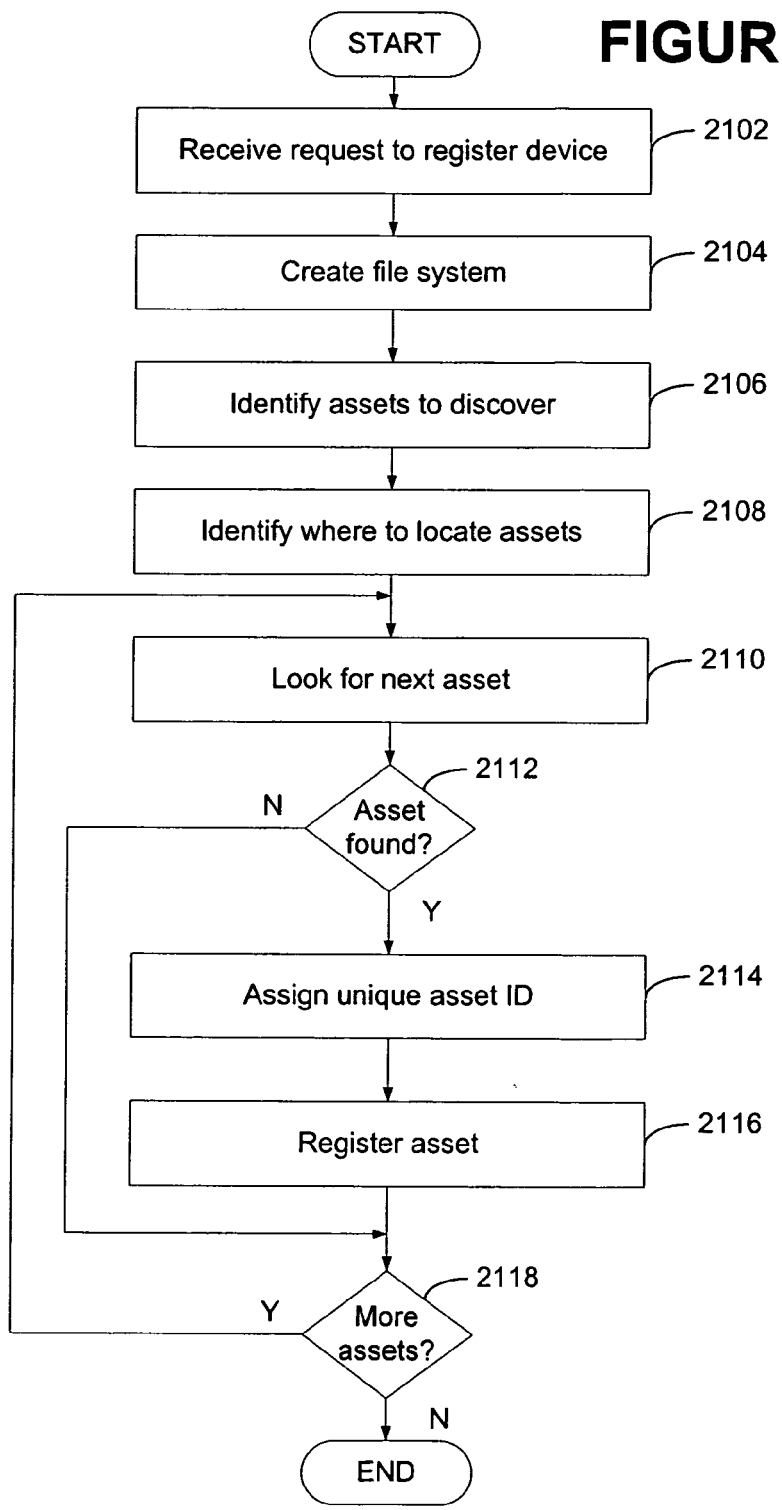
FIG. 21 is a flow diagram illustrating the exemplary steps performed by an offering platform to register a clientless interface.

FIG. 21 is a flow diagram illustrating the exemplary steps performed by the offering platform to register a clientless interface. To register the clientless interface, the customer requests registration of each data processing system that will mount the clientless interface file system. The offering platform receives a request from the customer via the offering platform's portal to register a customer device, such as a computer system or mobile phone (step 2102). Then, the offering platform creates a file system for the device (step 2104). To perform step 2104, the offering platform assigns memory space for the device, such as on the offering platform's local secondary storage. Further, the offering platform maintains a file system for items stored in the device's assigned memory space. In the illustrative example, the file system is layered over a protocol, such as the secure socket layer (SSL) protocol that can traverse the Internet. Known standards, such as WebDAV may be implemented. The creations and maintenance of file systems for network devices are known in the art and will not be described in more detail herein.

The offering platform then obtains information about the customer device's associated assets using one or more asset discovery modules (step 2106). The asset discovery modules are similar to the asset managers, which are used by the asset platform to discover assets. Like the asset managers, the asset discovery modules receive information from the offering on which assets to discover and where to look. The asset discovery module identifies which assets to discover from the information received from the offering. The information from the offering includes, for example, signatures of what to look for, such as a server running on Linux. The offering also provides information on where to look for the assets, such as in the operating system registry (step 2108). Having received this information from the offering, the asset discovery module looks for the first asset (step 2110).

If the asset discovery module finds the desired asset (step 2112), the asset discovery module assigns the asset a unique asset ID (step 2114). Then, the asset discovery module registers the asset with the offering platform by recording the asset ID and its location in a local database (step 2116). After registering the asset with the offering platform in step 2116 or if the desired asset was not found in step 2112, the offering platform determines whether there are additional assets to discover (step 2118). If there are more assets, then program flow returns to step 2110 to look for the next asset. After registration is complete, the customer may select what offerings are needed for each asset. If the offerings are clientless interface compliant, the offering platform deploys them into the created file system.

Figure 22:
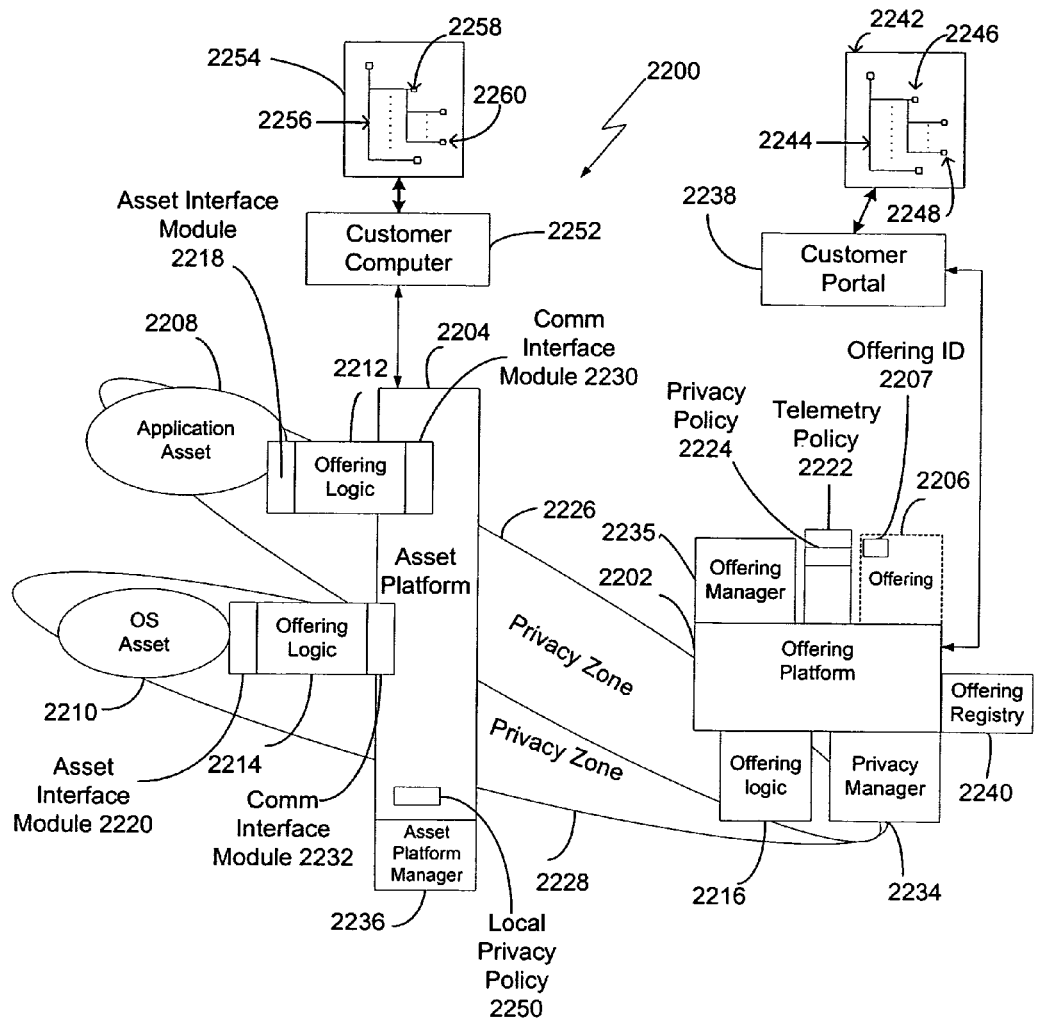
FIG. 22 depicts an exemplary block diagram of a data processing system adapted to implement a privacy zone in accordance with methods and systems consistent with the present invention.

FIG. 22 depicts an exemplary block diagram of a data processing system 2200, which is an embodiment of the system 100, adapted to implement a privacy zone in accordance with methods and systems consistent with the present invention. The data processing system 2200 includes an offering platform 2202 associated with a vendor or a vendor partner as discussed above. The data processing system 2200 also includes an asset platform 2204 associated with one or more customer assets and that is operatively connected to the offering platform 2202. The asset platform 2204 may be implemented in a first system or server and the offering platform 2202 may be implemented in a second system or server as discussed above. The offering platform 2202 hosts one or more offerings (e.g., offering 2206) that may be deployed to the asset platform 2204 to provide corresponding service to the customer via one or more assets associated with the asset platform 2204. Each offering 2206 may have a respective offering ID 2207, assigned to the offering 2206 when the offering 2206 is registered to the system 2200 as described above.

In the implementation shown in FIG. 22, the asset platform 2204 is in communication with a first asset 2208 and a second asset 2210. In an illustrative example, in accordance with methods consistent with the present invention, the asset platform 2204 discovers that the first asset 2208 is an application asset, such as StarOffice™ from Sun Microsystem, Inc., and the second asset 2210 is an operating system asset, such as Solaris™ from Sun Microsystem, Inc. The first asset 2208 and the second asset 2210, however, may be any hardware asset (e.g., a computer system, a computer processor, an I/O device, storage device, or personal data assistant), software asset (e.g., firmware for the computer system, operating system, or presentation application), or combination thereof, that is associated with the asset platform 2204.

As discussed herein, the offering 2206 is offered by a vendor or a partner to provide a business application service to a customer or company associated with the asset platform 2204. When deployed in one implementation, the offering 2206 has front-end offering logic (i.e., logic 2212 or 2214) hosted on the asset platform 2204 and back-end offering logic (i.e., logic 2216) hosted on one or more offering platforms (e.g., offering platform 2202) associated with the vendor's system or the partner's system. Thus, in the example, rather than the offering 2206 residing at or on the customer's system, the business service process portion of the offering 2206 is hosted remotely at or on the vender's premises or the partner's system to increase utilization and management cost efficiencies for the company associated with the asset platform 2204.

In the implementation shown in FIG. 22, each front-end offering logic 2212 and 2214 has an associated asset interface module 2218 and 2220. Each asset interface module 2218 and 2220 is operatively configured to provide the associated front-end offering logic 2212 or 2214 with a respective application program interface (API) to enable the associated front-end offering logic 2212 or 2214 to communicate with the respective first asset 2208 or second asset 2210. In one implementation, the asset interface module 2218 or 2220 is assigned to the respective front-end offering logic 2212 or 2214 during deployment of the front-end offering 2212 or 2214 to the asset platform 2204. Thus, each front-end offering 2212 and 2214 does not have to be hard coded to communicate with a specific asset type (e.g., an application asset 2208 or OS asset 2210) and may be readily deployed to communicate with a number of assets on multiple asset platforms using an asset interface module or API designed for the respective asset.

The front-end offering logic 2212 and 2214 is operatively configured to collect and transfer data to the back-end offering logic in accordance with a data telemetry policy 2222 defined for the offering 2206 by an administrator or programmer knowledgeable about the specific offering 2206. The data telemetry policy 2222 may include a privacy policy 2224 that identifies the one or more data elements associated with an asset 2208 and 2210 that will be collected and transferred from the asset platform 2204 to the offering platform 2202 by the front-end offering logic for processing by the back-end offering logic 2216, including remote storage outside the company's environment (e.g., outside of the asset platform 2204). The privacy policy 2224 is associated with an offering 2206 that has been registered to the data processing system 2200. In one implementation, the privacy policy is assigned the same offering ID as the associated offering 2206 so that the privacy policy 2224 is implemented to define a privacy zone when the associated offering 2206 is deployed to the asset platform 2204 as discussed below.

For each data element identified by the privacy policy 2224, the privacy policy 2224 also identifies who will have access to the data element, how long the data element will live after it is instantiated or initially transferred to the offering platform 2202 for processing or storage. As described in further detail below, the company associated with the asset platform 2204 is able to view each data element associated with an asset 2208 or 2210 that may be transferred to and processed by the back-end offering logic 2216, the source of the data element, the destination of the data element, and selectively modify who has access to the data element and how long the respective data element is to live or be maintained (i.e., time-to-live) by the offering platform 2202.

When the offering 2206 is deployed to provide corresponding service to a customer via one or more assets 2208 and 2210 associated with the asset platform 2204 and the front-end offering logic 2212 or 2214 is instantiated on the asset platform 2204 to operate on a respective asset 2208 or 2210, a privacy zone 2226 or 2228 is defined in accordance with the privacy policy 2224 associated with the offering 2206 as discussed in further detail below. Each privacy zone 2226 and 2228 reflects a relationship between the asset 2208 or 2210 associated with the asset platform 2204, the front-end offering logic 2212 or 2214 instantiated to operate on the respective asset 2208 or 2210, and the back-end offering logic 2216, in which a data element associated with the asset 2208 or 2210 is handled in accordance with the privacy policy 2224 associated with the offering 2206.

In the implementation shown in FIG. 22, each front-end offering logic 2212 and 2214 has an associated communication interface module 2230 or 2232 that is configured to function as a data element collection filter for the front-end offering logic 2212 or 2214 to control the transfer and the access of one or more data elements associated with the respective asset 2208 or 2210 in accordance with the privacy policy 2224. For example, the front-end offering logic 2212 or 2214 may be operatively configured to inhibit transmission of a data element associated with the asset 2208 or 2210 that is not identified in the privacy policy 2224, tag a properly identified data element to provide a duration for and protect access to the data element, and to encrypt the data element in accordance with the privacy policy 2224.

The offering platform 2202 includes a privacy manager program or module 2234 that is operatively configured to monitor the processing of the back-end offering logic 2216 and manage the transfer and exposure of a data element in accordance with the privacy policy 2224 associated with the offering 2206. The offering platform 2202 includes an offering manager program or module 2235 is also operatively configured to receive a request from a customer, via a portal 2238 operatively connected to the server offering platform 2202, for a selected offering (e.g., offering 2206) to be deployed in association with one or more assets (e.g., application asset 2208 and OS asset 2210). In response to the request, the offering platform 2202 deploys the selected offering 2206 in accordance with methods consistent with the present invention as discussed above. In one implementation, the offering manager 2235 is incorporated into the privacy manager 2234 such that the privacy manager 2234 responds to the request to deploy a selected offering 2206. In another implementation, the offering manager 2235 is operatively configured to inform the privacy manager 2234 of the request to deploy a selected offering 2206 when the request is received so that the privacy manager 2234 may monitor the processing of the back-end offering logic 2216 and manage the transfer and exposure of a data element in accordance with the privacy policy 2224 associated with the offering 2206.

The asset platform 2204 includes an asset platform manager program or module 2236 that is operatively configured to a communication interface module 2230 or 2232 to function as a data element collection filter for the respective front-end offering logic 2212 or 2214 in accordance with the privacy policy 2224 in response to the deployment of the front-end offering logic 2212 or 2214 and the privacy policy 2224 by the privacy manager 2234 as further discussed below.

As discussed above, the asset platform 2204 may be implemented in a first system or server that has a memory to store the asset platform 2204 with the asset platform manager 2234, and that has a processor to run the asset platform manager 2236. In addition, the offering platform 2202 may be implemented in a second system that has a memory to store the offering platform 2202 with the privacy manager 2234 and the offering manager 2235, and that has a processor to run the privacy manager 2234 and the offering manager 2235. The offering 2206 may also be stored in the second system's memory when deployed to the offering platform 2202.

TABLE 1 below identifies an illustrative format of the privacy policy 2224 associated with the offering 2206, which in this implementation provides a software update service for the StarOffice™ application asset 2208. In the implementation shown in TABLE 1, the privacy policy 2224 includes a name (e.g., Data Element Name=Sparc Model A Computer System Inventory) or identifier (e.g., Data Element ID=Sparc1) of a data element that identifies the inventory of components for the computer system (not shown in FIG. 22) hosting the application asset 2208. When deployed, the back-end offering logic 2216 uses the inventory data element to process a new software update or patch for the application asset 2208. By defining a privacy zone 2226 between the application asset 2208, the front-end offering logic 2212, and the back-end offering logic 2216, the privacy manager 2234 is able to manage the computer system inventory data element to ensure that the inventory data element is maintained in accordance with the privacy policy 2224 to meet privacy related law requirements as well as keep confidential the company's strategic business objectives.

TABLE 1

| Data Element Name | Data Element ID | Source ID | Desti-nation ID(s) | Access Control List (ACL) | Time Stamp | Time-to-Live (in seconds, minutes, hours, days, weeks, or years) |
|---|---|---|---|---|---|---|
| Sparc Model A Computer System Inventory | Sparc1 | Asset Platform 2204 ID | Offering Platform 2202 ID | Group or User IDs with access to Sparc1 | Date and time Sparc1 created or received at source | 1 day |
| Current Appli-cation Asset Patch List | App_list | Asset Platform 2204 ID | Offering Platform 2202 ID | Group or User IDs with access to App_list | Date and time Sparc1 created or received at source | 4 weeks |
| Current Operating System Asset Patch List | OS_list | Asset Platform 2204 ID | Offering Platform 2202 ID | Group or User IDs with access to Offering Platform 2202 ID | Date and time Sparc1 created or received at source | 10 years |

The privacy policy 2224 may also include the Source ID that indicates to the privacy manager 2234 and the asset platform manager 2236 the asset platform (e.g., Asset Platform 2204 ID) from which the respective data element is to be received by the back-end offering logic 2216. For each data element, the privacy policy 2224 may also include one or more destination IDs that indicate to the privacy manager 2234 and the asset platform manager 2236 the approved destinations (e.g., Offering Platform 2202 ID) of the respective data element for further processing or storage. As shown in TABLE 1, the privacy policy 2224 may further include an access control list (ACL) that identifies the authorized group IDs or user IDs with access to the identified data element (e.g., Sparc1), a time stamp reflecting the date and time that the respective data element was created or received by the identified source, and a time-to-live. The time-to-live identifies to the privacy manager 2234 and the asset platform manager 2236 the duration from the time stamp that the respective data element is to be exposed to the back-end offering logic 2216 or the identified destinations. When the time-to-live associated with a respective data element expires, the privacy manager 2234 removes the data element from memory 2262 and persistent storage (not shown in FIG. 22) associated with the back-end offering logic 2216 or the identified destinations for the respective data element.

As shown in the implementation of the privacy policy 2224 shown in TABLE 1 for an software update service offering 2206, the back-end offer logic 2216 may also require receiving other data elements, such as a "current application asset patch list" and a "current operating system asset patch list," in order to analyze or process a new software update or patch for the application asset 2208. As disclosed herein, a company or customer may access the privacy policy 2224 associated with an offering 2206 to modify the privacy policy for one or more of the data elements identified in the privacy policy. For example, a customer may not require that the "current operating system asset patch list" be kept private and allow all users with access to Offering Platform 2202 ID to view this data element for the projected life (e.g., 10 years) of the computer system (not shown in FIG. 22) hosting the identified operating system. Accordingly, methods and systems consistent with the present invention, allow a privacy policy 2224 associated with an offering 2206 from a vendor or vender partner to be modified by a customer of the offering so that the customer's data elements are handled in accordance with the modified privacy policy 2224.

Figure 23A:
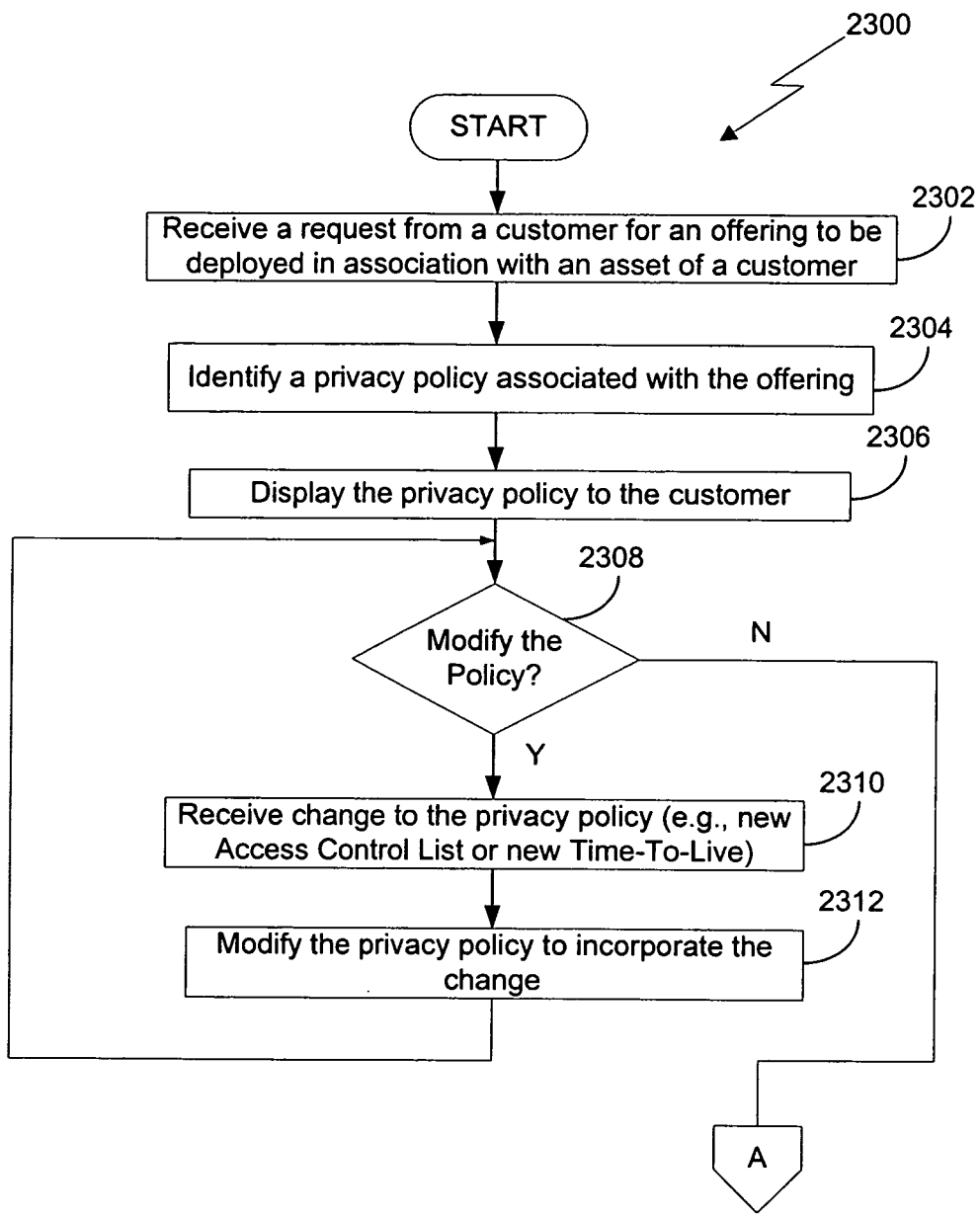

FIGS. 23A-B depict a flow diagram illustrating an exemplary process 2300 for defining a privacy zone 2226 or 2228 in accordance with the deployment of an offering from the offering platform to the asset platform and the privacy policy associated with the offering. Initially, the privacy manager 2234 receives a request from a customer for an offering to be deployed in association with an asset of a customer (step 5102). In one implementation, the privacy manager 2234 receives the request from the offering manager 2235, which receives the request when the customer selects the offering 2206 to be deployed via the customer portal 2238. Alternatively, the privacy manager 2234 may be configured to monitor the portal 2238 for requests to deploy a selected offering 2206 after the customer has registered with the data processing system 2200 in accordance with methods consistent with the present invention.

The privacy manager 2234 then identifies a privacy policy associated with the offering (step 2304). In one implementation, the privacy manager 2234 recognizes that the privacy policy 2224 is associated with the offering 2206 based on offering ID 2207 that is assigned to the offering 2206 upon registration to the data processing system and subsequently associated with the privacy policy 2224. The offering ID 2207 may be associated with the privacy policy 2224 by generating the privacy policy 2224 to include the offering ID. Alternatively, the offering platform 2202 may include an offering registry 2240 that lists the ID 2207 or name of each offering 2206 registered with the offering platform 2202 in association with an identifier or name of the privacy policy 2224 to be implemented or invoked when the offering 2206 is selected for deployment to a respective asset platform 2204.

Next, the privacy manager 2234 displays the privacy policy to the customer (step 2306). In one implementation, the privacy manager 2234 may display the privacy policy 2224 to the customer by allowing the customer to access the privacy policy via the customer portal 2238 using a customer computer, personal data device (PDA), or other display device 2242. In this implementation, the privacy policy 2224 may be selectively viewed in a hierarchical or tree structure 2244 corresponding to the one or more data elements in the privacy policy 2224 as shown in TABLE 1. As shown in FIG. 22, each data element (e.g., "Current Application Asset Patch List" data element in TABLE 1) of the privacy policy 2224 may be graphically or textual represented as a segment 2246 of the displayed tree structure 2244 and each parameter associated with the data element (e.g., ACL or Time-To-Live in TABLE 1) may be graphically or textual represented as a sub-segment 2248.

The privacy manager 2234 then determines whether the privacy policy associated with the offering is to be modified (step 2308). In one implementation, the customer may identify to the privacy manager 2234 that the privacy policy 2224 is to be modified by using any a keyboard, mouse, stylus, or other input device (not shown in the figures) associated with the customer display device 2242 to select a sub-segment 2248 of the displayed tree structure 2244 and change the corresponding parameter (e.g., Time-To-Live of the "Current Application Asset Patch List" data element).

If the privacy policy associated with the offering is to be modified, the privacy manager 2234 receives a change to the privacy policy, such as a new ACL or new time-to-live for a named data element as shown in TABLE 1 above (step 2310). The privacy manager 2234 then modifies the privacy policy 2234 associated with the offering 2206 to incorporate the change (step 2312). The privacy manager 2234 may continue processing at step 2308 until the customer has completed modifying the privacy policy 2224.

Turning to FIG. 23B, if the privacy policy associated with the offering is not to be modified or modifications have been completed, the privacy manager 2234 or the offering manager 2235 associates an asset interface module with the front-end offering logic (step 2314). In one implementation, the offering manager 2235 identifies the asset interface module 2218 from among a plurality of available asset interface modules 2218 and 2220 that corresponds to the asset 2208 or 2210 that the front-end offering logic 2212 or 2214 will be collecting data elements from in accordance with the data telemetry policy 2222 and the associated privacy policy 2224 of the offering 2206.

The privacy manager 2234 or the offering manager 2235 deploys the front-end logic 2212 or 2214 associated with the offering 2206 to the asset platform (step 2316), such that the front-end logic 2212 or 2214 is operatively configured to collect the data elements associated with the respective asset 2208 or 2210 hosted on the asset platform 2204.

The privacy manager 2234 or the offering manager 2235 may also provide the privacy policy 2224 associated with the offering 2206 to the asset platform 2204 (step 2318) so that it is available to the asset platform manager 2236 as a local privacy policy 2250. In one implementation discussed in further detail below, the asset platform manager 2236 allows the customer to view and modify the local privacy policy 2250 via a customer computer 2252 operatively connected to the asset platform 2204. The customer computer 2252 may be a standard personal computer (e.g., IBM or Apple compatible machine), a PDA, or other device having a display screen 2254. In this implementation, the asset platform manager 2236 may allow the local privacy policy 2250 to be selectively viewed in a hierarchical or tree structure 2256 or other GUI interface corresponding to the one or more data elements in the local privacy policy 2250 as shown in TABLE 1. Before the local privacy policy 2250 is modified in accordance with the present invention, the hierarchical structure 2256 or GUI interface of the local privacy policy 2250 displayed by the asset platform manager 2236 corresponds to the hierarchical structure 2244 of the privacy policy 2224 of the privacy policy 2224 displayed by the privacy manager 2234. As shown in FIG. 22, each data element (e.g., "Current Application Asset Patch List" data element in TABLE 1) of the local privacy policy 2250 may be graphically or textual represented as a segment 2258 of the displayed tree structure 2256 and each parameter associated with the data element (e.g., ACL or Time-To-Live in TABLE 1) may be graphically or textual represented as a sub-segment 2260.

Next, the asset platform manager 2236 generates a data element collection filter for the asset between the front-end offering logic and the back-end offering logic in accordance with the privacy policy associated with the offering (step 2320) before ending processing. In one implementation, when the privacy policy 2224 is received by the asset platform manager 2236, the asset platform manager 2236 configures a communication interface module 2230 or 2232 to function as a data element collection filter for the respective front-end offering logic 2212 or 2214 in accordance with the privacy policy 2224 or local privacy policy 2250 so that the communication interface 2230 or 2232 will allow a data element collected by the front-end offering logic 2212 or 2214 to be transferred to the back-end offering logic 2216 when the data element is identified in the privacy policy and tagged with a time-to-live and an ACL as identified in the privacy policy 2224 or local privacy policy 2250. In another implementation, processing step 2320 may be performed by the privacy manager 2234 before the front-end offer logic is deployed to the asset platform 2204 in step 2316. In this implementation, the privacy manager 2234 configures a communication interface module 2230 or 2232 to function as a data element collection filter for the respective front-end offering logic 2212 or 2214 in accordance with the privacy policy 2224 so that the communication interface 2230 or 2232 will allow a data element collected by the front-end offering logic 2212 or 2214 to be transferred to the back-end offering logic 2216 when the data element is identified in the privacy policy and tagged with a time-to-live and an ACL as identified in the privacy policy 2224.

Thus, after the front-end offering logic 2212 or 2214 is deployed in accordance with the process 2300, a privacy zone 2226 or 2228 is defined or created between the offering platform 2202 and the associated asset 2208 or 2210 hosted on or in communication with the asset platform 2204.

Figure 24A:
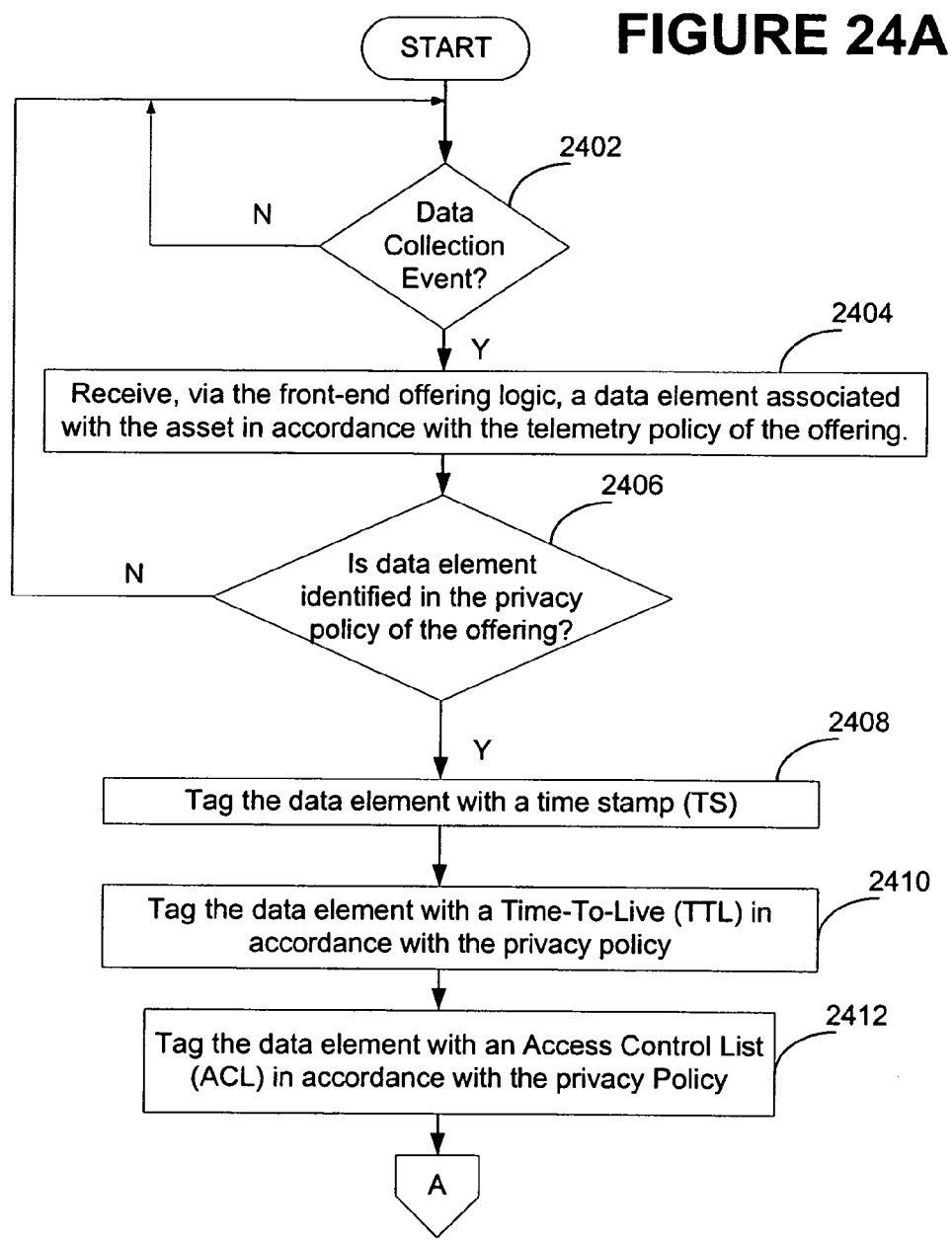

FIGS. 24A-B depict a flow diagram illustrating an exemplary process 2400 for maintaining the privacy of a data element within the privacy zone 2226 or 2228 in accordance with the privacy policy associated with the offering. Initially, the front-end offering logic 2212 or 2214 determines whether a data collection event has occurred (step 2402). Each front-end offering 2212 and 2214 may independently determine whether a data collection event has occurred. A data collection event may be a periodic period (e.g., every hour) or a condition (e.g., request to store new version of the data element) corresponding to a data element associated with the asset 2208 or 2210 that the front-end offering 2212 and 2214 was deployed to communicate with. In one implementation, the data collection event is stored in association with the data element name or ID in the telemetry policy 2222 or privacy policy 2224 defined for the offering 2206. Thus, in this implementation, each front-end offering logic 2212 and 2214 is able to identify the data collection event for each data element identified in the privacy policy 2234 by cross referencing the name or ID of the respective data element to the associated data collection event stored in association with the data element.

If a data collection event has not occurred, the front-end offering logic 2212 or 2214 may continue processing at step 2402 until the respective event is detected or end processing (not shown in FIG. 24A). If a data collection event has occurred, the front-end offering logic 2212 or 2214 receives or collects a data element associated with the asset in accordance with the telemetry policy or privacy policy of the offering (step 2402). In the example depicted in FIG. 22, the "Current Application Asset Patch List" data element may be stored in association with a data collection event corresponding to a new version condition to prompt the front-end offering logic 2212 to receive or collect the "Current Application Asset Patch List" data element from the application asset 2208 when the "Current Application Asset Patch List" is updated or edited.

Next, the front-end offering logic 2212 or 2214 determines whether the received or collected data element is identified in the privacy policy associated with the offering (step 2404). In one implementation, the front-end offering logic 2212 or 2214 determines whether the received or collected data element is identified in the privacy policy via the communication interface module 2230 or 2232 that is generated to function as a data collection filter for the front-end offering logic 2212 or 2214 in accordance with the privacy policy 2224 as discussed above. For example, when the "Current Application Asset Patch List" data element identified in the privacy policy 2224 depicted in TABLE 1 is updated, the front-end offering logic 2212 is operatively configured to collect the updated "Current Application Asset Patch List" data element and transfer the data element to the communication interface module 2230.

Continuing with the example, the communication interface module 2230, which may be generated based on the privacy policy 2224 associated with the offering 2206 deployed to the asset platform 2204, is able to recognize that the "Current Application Asset Patch List" data element is identified in the privacy policy 2224.

If the received or collected data element is not identified in the privacy policy associated with the offering, the front-end offering logic 2212 or 2214 continues processing at step 2402. If the received or collected data element is identified in the privacy policy associated with the offering, the front-end offering logic 2212 or 2214 via the respective communication interface module 2230 or 2232 may associate or tag the data element with a time stamp or TS (step 2408), associate or tag the data element with a time-to-live or TTL in accordance with the privacy policy (step 2410), and associate or tag the data element with an access control list or ACL in accordance with the privacy policy (step 2412).

As shown in FIG. 24B, the front-end offering logic 2212 or 2214 via the respective communication interface module 2230 or 2232 then encrypts the data element (step 2414). The front-end offering logic 2212 or 2214 may encrypt the data element using a suitable encryption technique known in the art.

Next, the front-end offering logic 2212 or 2214 transfers the encrypted data element with the associated TS, TTL, and ACL to the back-end offering logic 2216 (step 2418).

The privacy manager 2234, which is operatively configured to monitor data traffic to the back-end offering logic 2216 within each defined privacy zone 2226 and 2228, stores the instance of the encrypted data element at each destination identified in the privacy policy associated with the offering (step 2418).

The privacy manager 2234 then determines whether the TTL associated with the encrypted data element has expired (step 2420). If the TTL associated with the encrypted data element has not expired, the privacy manager 2234 determines whether access to the data element has been requested (step 2422). If access to the data element has not been requested, the privacy manager 2234 may continue processing at step 2420 in order to continue to maintain the defined privacy zone 2226 or 2228. The privacy manager 2234 may perform portions of the process 2400 in parallel in order to maintain each defined privacy zone 2226 and 2228.

If access to the data element has been requested, the privacy manager 2234 determines whether the requester is identified in the ACL associated with the data element (step 2424). If the requester is not identified in the ACL associated with the data element, the privacy manager 2234 denies the requested access (step 2426) and continues processing at step 2420. If the requester is identified in the ACL associated with the data element, the privacy manager 2234 decrypts and allows access to the data element (step 2428) before continuing processing at step 2420.

If the TTL associated with the encrypted data element has expired, the privacy manager 2234 deletes each stored instance of the data element (step 2430) before ending processing or continuing processing at step 2402. In one implementation, the privacy manager 2234 is able to identify the location of each stored instance of the data element based on the "Destination ID" associated with the respective data element in the privacy policy 2224 as shown in TABLE 1.

Figure 25:
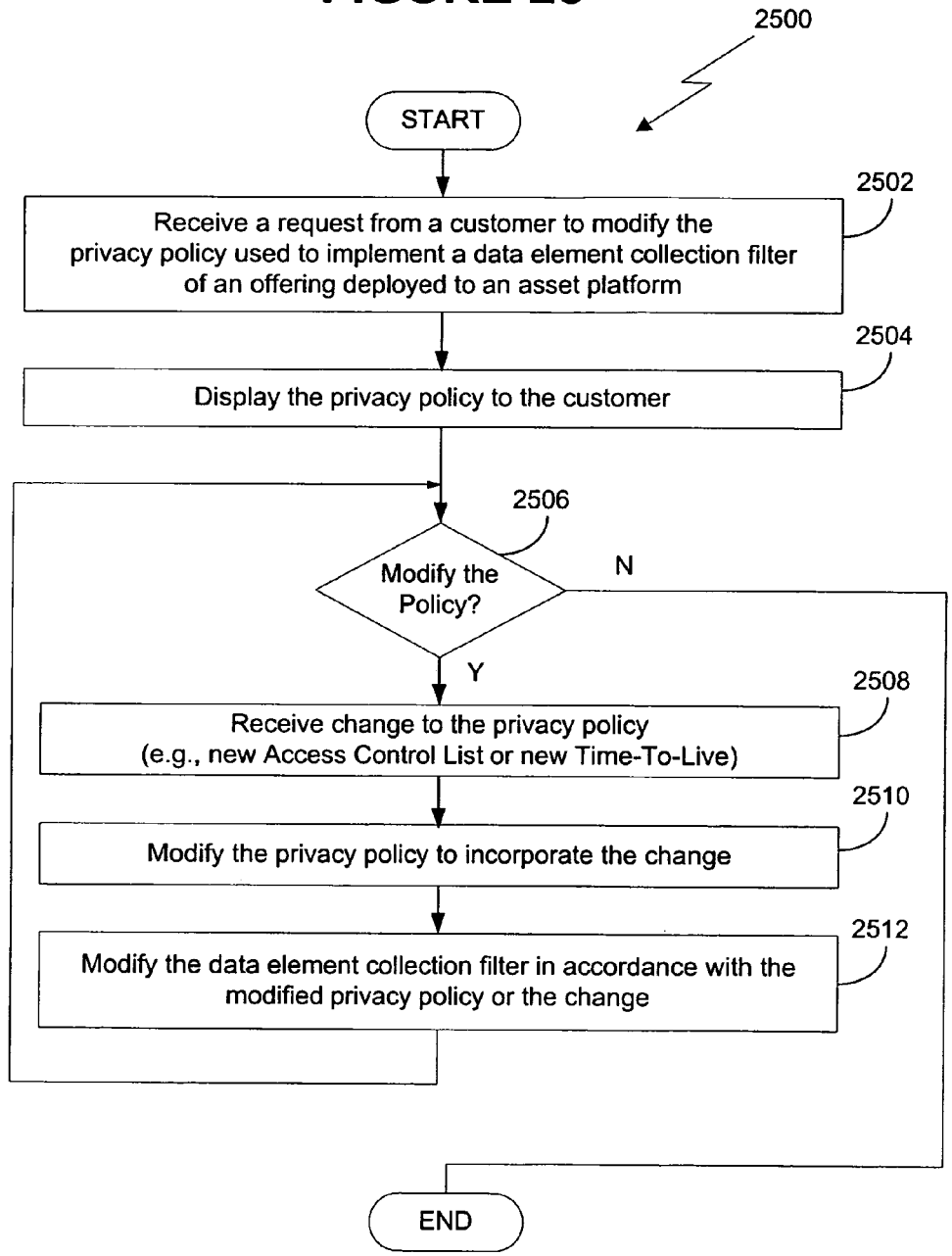
FIG. 25 depicts a flow diagram illustrating an exemplary process for modifying the privacy policy associated with the deployed offering to alter the defined privacy zone.

FIG. 25 depicts a flow diagram illustrating an exemplary process 2500 for modifying the privacy policy associated with the deployed offering to alter the defined privacy zone. By performing process 2500, the asset platform manager 2236 allows the customer associated with the asset platform

2204 to modify the local privacy policy 2250 (e.g., change the Time-To-Live of a data element) used to implement the data element collection filter 2230 or 2232 associated with the front-end offering logic 2212 or 2214 deployed to interface with a customer asset 2208 or 2210. Initially, the asset platform manager 2236 receives a request from a customer to modify the privacy policy used to implement a data element collection filter of an offering deployed to an asset platform (step 2502). The customer may indicate the request to the asset platform manager 2236 via the customer computer 2252 using keyboard input (not shown in figures) or other known data input technique.

Next, the asset platform manager 2236 displays the privacy policy to the customer (step 2306). In one implementation, the asset platform manager 2236 may allow the local privacy policy 2250 to be selectively viewed in a hierarchical structure 2256 or other GUI interface corresponding to the one or more data elements in the local privacy policy 2250 as shown in TABLE 1 as previously discussed.

The asset platform manager 2236 then determines whether the privacy policy associated with the offering and deployed to the asset platform is to be modified (step 2506). In one implementation, the customer may identify to the asset platform manager 2236 that the local privacy policy 2250 is to be modified by using any a keyboard, mouse, stylus, or other input device (not shown in the figures) associated with the customer computer 2252 to select a sub-segment 2260 of the displayed tree structure 2256 and change the corresponding parameter (e.g., Time-To-Live of the "Current Application Asset Patch List" data element).

If the privacy policy associated with the offering is to be modified, the asset platform manager 2236 receives a change to the privacy policy, such as a new ACL or new time-to-live for a named data element as shown in TABLE 1 above (step 2508). The, asset platform manager 2236 then modifies the local privacy policy 2250 associated with the deployed front-end offering logic 2230 or 2232 to incorporate the change (step 2510).

Next, the asset platform manager 2236 modifies the data element collection filter 2230 or 2232 associated with the deployed front-end offering logic 2230 or 2232 in accordance with the modified privacy policy 2250 or to incorporate the change (step 2516). Thus, the asset platform manager 2236 may allow the customer to modify, for example, a time-to-live or an ACL of a data element identified in the local privacy policy 2250 used to implement the data element collection filter 2230 or 2232 of the front-end offer logic 2212 or 2214. Accordingly, when the data element is collected in accordance with the process 2400, the data element is tagged via the data element collection filter 2230 or 2232 with the modified time-to-live or ACL.

The asset platform manager 2236 may then continue processing at step 2506 until the customer has completed modifying the local privacy policy 2506. If the privacy policy associated with the offering is not to be modified, the asset platform manager 2236 may end processing as shown in FIG. 25.

Figure 26:
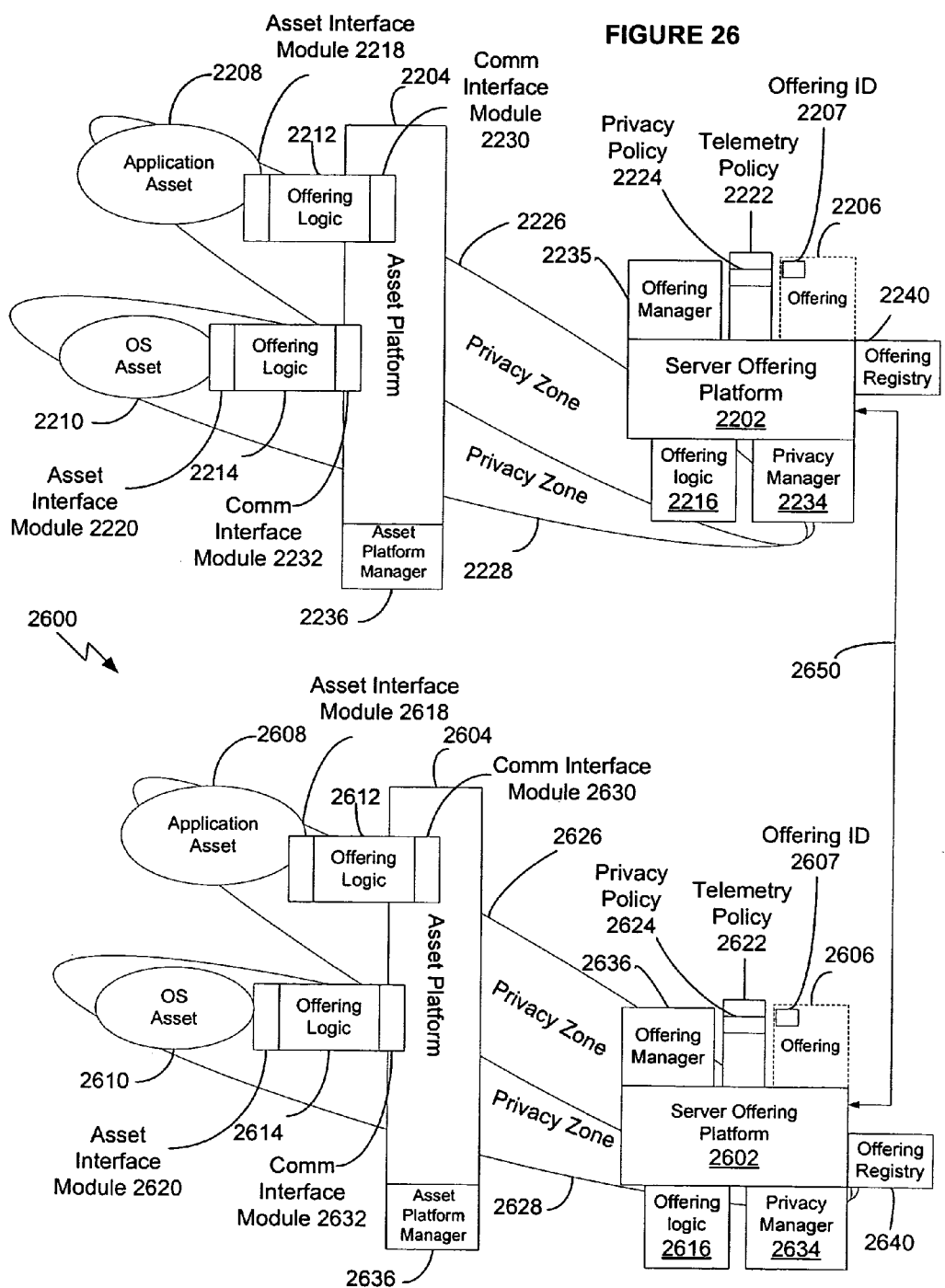
FIG. 26 depicts an exemplary block diagram of a data processing system having a first privacy zone defined between a first asset platform and a first offering platform, and a second privacy zone defined between a second asset platform and a second offering platform, where the first offering platform is adapted to lease information from the first privacy zone to the second privacy zone.

FIG. 26 depicts an exemplary block diagram of a system 2600, which is an embodiment of the system 100. The system 2600 has a first privacy zone 2226 or 2228 defined between a first asset platform 2204 implemented on a first data processing system (e.g., customer system 110) and a first offering platform 2202 implemented on a second data processing system (e.g., vendor system 102), and a second privacy zone 2626 or 2628 defined between a second asset platform 2604 implemented on a third data processing system (e.g., another customer system 110) and a second offering platform 2602 implemented on a fourth data processing system (e.g., another vendor system 102 or a partner system 106). Each privacy zone 2226, 2228, 2626 and 2628 is associated with an offering 2206 or 2606 that has been transferred to the offering platform 2202 or 2602 for deployment to the asset platform 2204 or 2604 of a customer. As described above, each offering 2206 or 2606 provides a corresponding service (e.g., a software update service, document retention service, fault detection service, or other business service) to the customer, requiring collection, processing, and management by the offering components. Each privacy zone 2226, 2228, 2626 and 2628 is implemented during deployment of the respective offering 2206 or 2606 based on the privacy policy 2224 or 2624 associated with the offering 2206 or 2606 as described above. In one implementation, the offering 2206 and the offering 2606 are the same offering deployed across multiple offering platforms 2202 and 2602 to provide one combined service (e.g., a software update service, document retention service, fault detection service, or other business service) to a customer having multiple assets 2208, 2210, 2608, and 2610 associated with different asset platforms 2204 and 2604. In this implementation, each offering platform 2202 and 2602 is adapted to lease information from the privacy zone 2226 or 2626 associated with a respective offering platform 2202 or 2602 across the network to another privacy zone 2626 or 2226 associated with another offering platform 2602 or 2202. Specifically, in accordance with methods and systems consistent with the present invention, when an offering 2206 or 2606 is distributed across multiple offering platforms 2202 and 2602 in order to provide the service associated with the offering 2206 or 2606 to the customer, a data element collected by one offering platform 2202 or 2602 within a respective privacy zone 2226, 2228, 2626, or 2628 may be leased to another one of the offering platforms 2202 or 2602 while maintaining the privacy of the data element.

Figure 27:
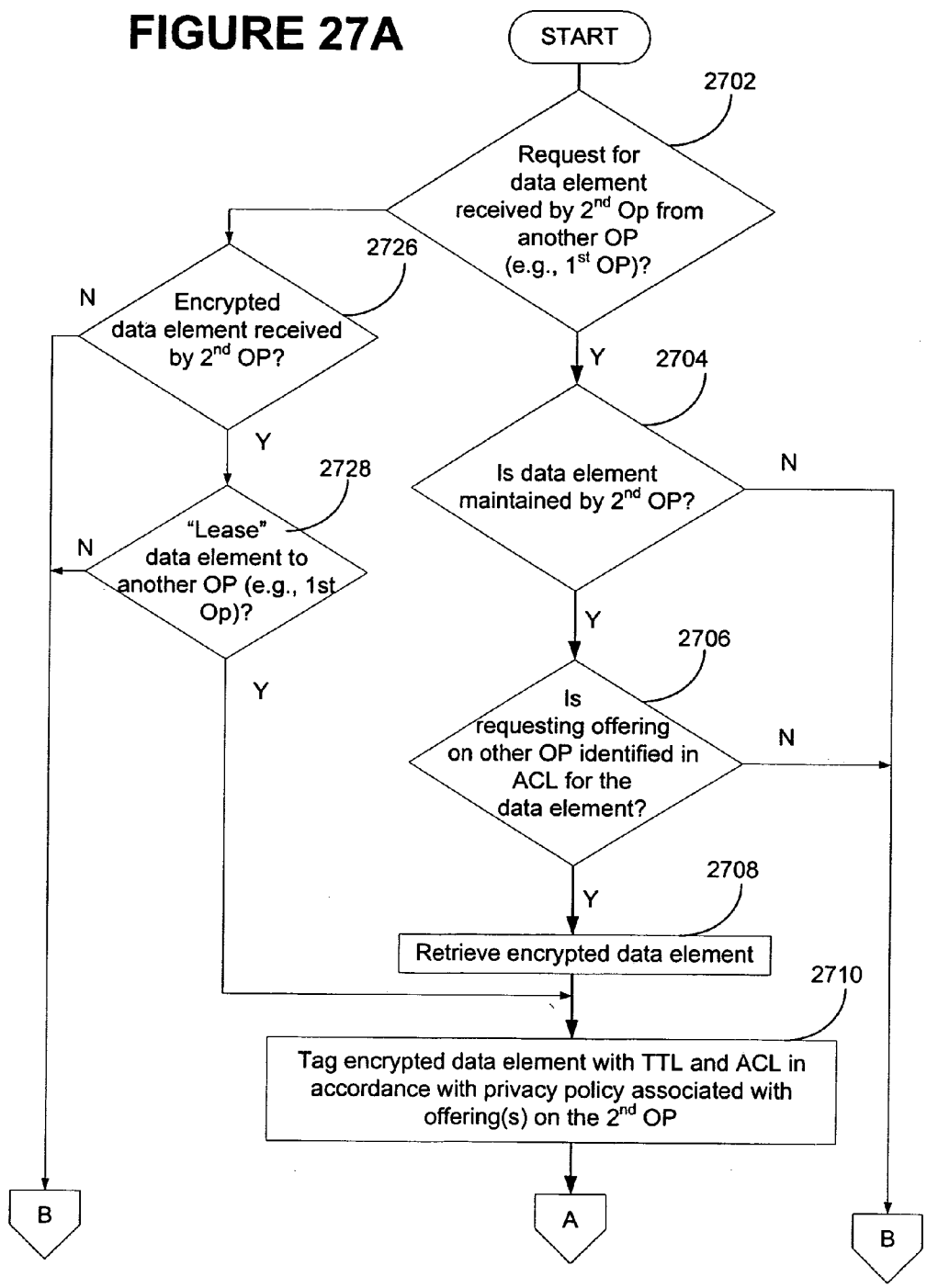
FIGS. 27A-B depict a flow diagram illustrating an exemplary process for leasing information from the second privacy zone to the first privacy zone.

FIGS. 27A-B depict a flow diagram 2700 illustrating an exemplary process for leasing information from one privacy zone to another privacy zone. In one illustrative embodiment, for example, the process 2700 may be performed between the privacy managers 2234 and 2634 hosted on the respective offering platforms 2202 and 2602 to lease information from the second offering platform 2602 associated with the second privacy zone 2626 or 2628 to the first offering platform 2202 associated with the second privacy zone 2226 or 2228.

Initially, the privacy manager 2634 hosted on the second offering platform 2602 determines whether a request for a data element (e.g., "Current Application Asset Patch List" data element in TABLE 1) has been received by the second offering platform 2602 from the first offering platform 2202 (step 2702). In one implementation, the privacy manager 2634 may receive the request via a message from the first offering platform 2202 when the back-end offering logic 2216 on the first offer platform 2202 requires the requested data element to complete processing of the service associated with the back-end offering logic 2216 or to provide access to a user in accordance with the access control list associated with the data element as identified in the privacy policy 2224 associated with the deployed offering 2216. For example, the back-end offing logic 2216 hosted on the first offering platform 2202 may orchestrate the software update offering 2206 across multiple offering platforms 2202 and 2204 that interface with respective asset platforms 2204 and 2604 to communicate with and collect data from associated customer assets 2208, 2210, 2608, and 2610. In this example, the back-end offering logic 2216 may need to access the "Current Application Asset Patch List" data element that is collected and processed by the back-end offering logic 2616 on the second offering platform 2602 in order to verify software update compliance for each instance of the customer's application asset 2208 and 2608 being serviced in accordance with the software update offering 2206.

If a request for a data element is received by the second offering platform, the privacy manager on the second offering platform determines whether the requested data element is maintained by the second offering platform (step 2704). In one implementation, the privacy manager 2634 verifies that the requested data element (e.g., "Current Application Asset Patch List" data element) is maintained by the second offering platform 2602 by verifying that the data element is identified in the privacy policy 2624 associated with the deployed offering 2616.

If the requested data element is not maintained by the second offering platform, the privacy manager 2634 may end processing. If the requested data element is maintained by the second offering platform, the privacy manager 2634 determines whether the requesting offering (e.g., back-end offering logic 2216) on the first offering platform is identified in the access control list associated with the data element (step 2706). For example, the privacy manager 2634 on the second offering platform 2602 searches the privacy policy 2622 associated with the back-end offering logic 2616 as shown in TABLE 1 to identify the access control list associated with the requested data element (e.g., "Current Application Asset Patch List") and then searches the identified access control list for the requested data element to confirm whether the requesting offering 2216 on the first offering platform is identified in the access control list.

If the requesting offering on the first offering platform is not identified in the access control list associated with the requested data element, the privacy manager 2634 may end processing. If the requesting offering on the first offering platform is identified in the access control list associated with the requested data element, the privacy manager 2634 retrieves the encrypted data element (step 2708).

Next, the privacy manager 2634 on the second offering platform 2602 tags the encrypted data element with the associated Time-To-Live and Access Control List (e.g., ACL as shown in TABLE 1) identified in the privacy policy 2624 associated with the offering 2606 on the second offering platform 2602 (step 2710). Turning to FIG. 27B, the privacy manager 2634 on the second offering platform 2602 transfers the encrypted data element tagged with the associated Time-To-Live and the associated Access Control List to the first offering platform 2202 (step 2712). The privacy manager 2234 or the offering manager 2236 on the first offering platform 2202 then stores the encrypted data element with the associated Time-To-Live and the associated Access Control List on the first offering platform, for example, in memory or local storage.

Thus, the privacy manager 2634 on the offering platform associated with the second privacy zone 2626 or 2628 and receiving the request for a data element (e.g., the second offering platform 2602) is able to lease the data element to the requesting offering platform (e.g., the first offering platform 2202) associated with the first privacy zone 2226 or 2228 for a period corresponding to the Time-To-Live associated with the data element. The privacy manager 2234 on the first offering platform 2202 that receives the leased data element is operatively configured to maintain the privacy of the data element as discussed below.

As shown in FIG. 27B, after the encrypted data element is tagged with the associated TTL and ACL and transferred to the first offering platform, the privacy manager 2234 on the first offering platform 2202 determines whether the TTL associated with the encrypted data element has expired (step 2716). If the TTL associated with the encrypted data element has not expired, the privacy manager 2234 determines whether access to the data element has been requested (step 2718). If access to the data element has not been requested, the privacy manager 2234 may continue processing at step 2716 in order to continue to maintain the privacy of the leased data element in accordance privacy zone 2626 or 2628 where the leased data element was collected. The privacy manager 2234 may perform portions of the process 2700 in parallel in order to lease multiple data elements from one privacy zone 2626 or 2628 associated with one offering platform 2602 to another privacy zone 2226 and 2228 associated with another offering platform 2202.

If access to the data element has been requested, the privacy manager 2234 on the first offering platform 2202 determines whether the requester is identified in the ACL associated with the data element (step 2720). If the requester is not identified in the ACL associated with the data element, the privacy manager 2234 denies the requested access (step 2722) and continues processing at step 2716. If the requester is identified in the ACL associated with the data element, the privacy manager 2234 decrypts and allows access to the data element (step 2724) before continuing processing at step 2716.

If the TTL associated with the encrypted data element has expired, the privacy manager 2234 on the first offering platform 2202 deletes each instance of the leased data element stored in association with the first offering platform (step 2726).

In one implementation, the offering 2206 may be deployed across a hierarchy of offering platforms 2202 and 2602 in accordance with offering 2206 so that the back-end offering logic 2616 on a second offering platform 2602 is operatively configured to automatically lease a collected data element that is required by the back-end offering logic 2216 on a first offering platform 2202 to complete or provide the service corresponding to the deployed offering 2206 to the customer. For example, a fault detection and maintenance offering 2206 may require that a data element associated with an identified fault (e.g., administrator in charge of customer asset 2608 experiencing the fault) be collected and transferred or pushed up to the first offering platform 2202 so that each data element associated with a fault may be easily accessed by the customer.

Accordingly, returning back to FIG. 27A, the privacy manager 2634 on the offering platform 2726 associated with the second privacy zone 2626 or 2628 determines whether an encrypted data element has been collected by the front-end offering logic 2612 or 2614 and received by the back-end offering logic 2616 (step 2726). If an encrypted data element has not been collected, the privacy manager 2634 may end processing or continue processing at step 2702 until a data element is collected. If an encrypted data element has been collected, then the privacy manager 2634 determines whether the collected data element is to be leased to another offering platform (e.g., the first offering platform 2202). To determine whether the collected data element should be leased, the privacy manager 2634 on the second offering platform 2602 may determine whether the ACL associated with the data element identifies a back-end offering logic 2216 (or deployed offering 2206) on another offering platform 2202. If the ACL associated with the data element identifies an offering 2206 or corresponding back-end offering logic 2216, the privacy manager 2634 on the second offering platform 2602 continues processing at step 2710 in order to tag the collected encrypted data element with the TTL and ACL associated with data element in accordance with the privacy policy 2624 and to transfer the encrypted data element to the identified deployed offering 2206 or corresponding back-end offering logic 2216 on the other platform 2202. The privacy manager 2234 on the other platform 2202 is operatively configured to maintain the privacy of the leased data element in accordance with process 2700.

As described above, privacy zones are established through adherence to a privacy policy for data elements of an offering deployed for an asset. However, sometimes an offering may involve multiple offering platforms, and thus a privacy policy may be enforced for data elements used across multiple offering platforms. In these cases, the privacy policy for a data element is sent encapsulated with the data as it is forwarded to another offering platform. Thus, a tight encapsulation of the privacy information with the data is achieved, ensuring that offering platforms may not improperly use the data.

Figure 29:
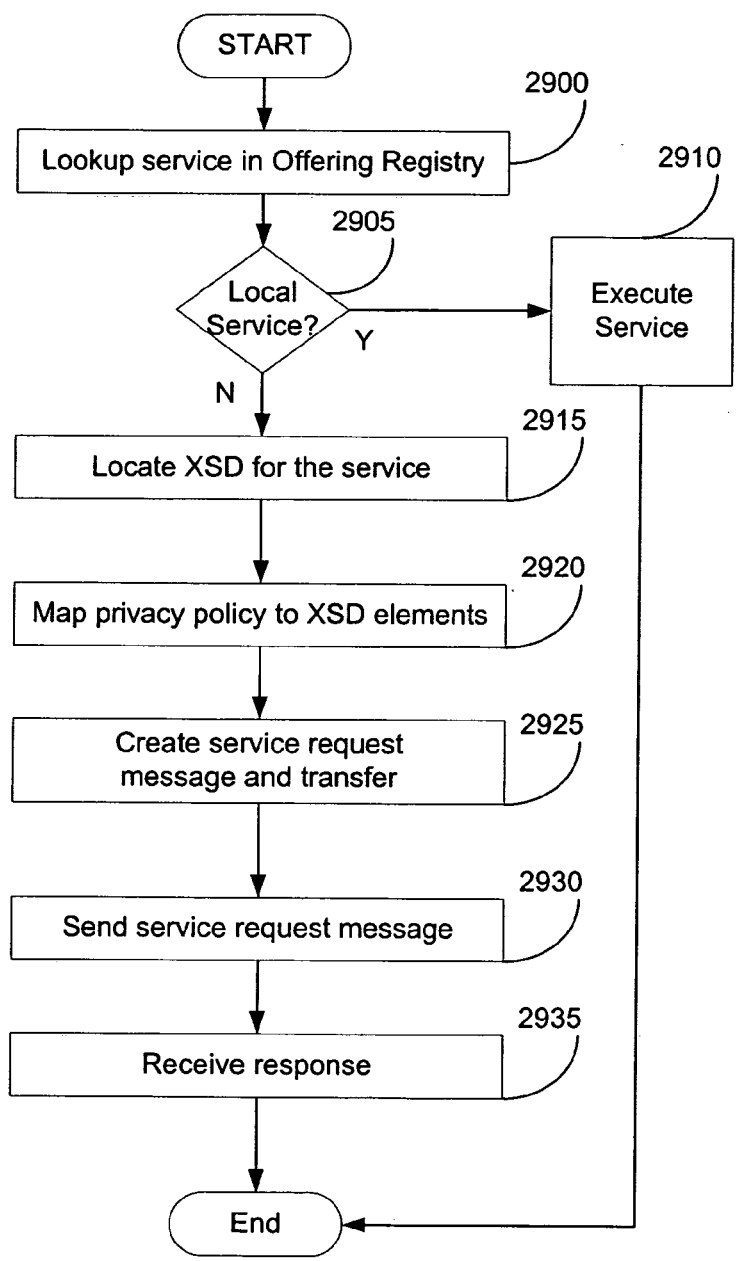
FIG. 29 depicts a flow diagram illustrating a process for requesting a remote service with data already being processed by a local offering platform.

FIG. 29 illustrates a flow diagram depicting an illustrative process for requesting a remote service with data already being processed by a local offering platform. The components for making this request are described with reference to FIGS. 11 and 12. At step 2900, Business Process Framework 1112 makes a request for a service, which is looked up in the Offering Registry Service 1202. If the service is found locally at step 2905, the service is fetched and executed by the Web Services Framework 1110 at step 2910. However, if the service is not found, the XSD Registry Service 1208 is used to locate the XSD for the service at step 2915. The Privacy Policy Service 1206 is used to map the privacy policy, e.g. the ACL and TTL for each element, to the XSD data elements at step 2920. The Connection Management Service 1208 builds the request message using the XSD with the mapped privacy policy, and transfers the message to the Communication Service 1210 at step 2925. At step 2930, the Communication Service 1210 sends the service request to a remote offering platform. The remote offering platform processes the service request, and the Communications Service 1210 receives the results at step 2935.

When the remote offering platform receives the request, it performs the service and transmits the results while adhering to the privacy policy encapsulated with the data. In this way, control is maintained over data used by the offering, who can use that data, and how long that data may be retained by the offering.

As previously discussed with regard to step 1910 (see FIG. 19) and step 2114 (see FIG. 21), each discovered asset is assigned a unique asset ID. When an asset is discovered by an asset manager's or asset discovery module's discovery routine, a namespace is populated with the assets unique ID. This namespace is populated uniquely and predictably, and each asset has one identity that will not be assigned to another asset that is discovered, regardless of the Connected Asset Container context in which the discovery routine is running. As a result, if two different Connected Asset Containers report the same asset to a SOP, the asset will be reported with the same name, and the SOP will not mistakenly recognize the asset as two different assets.

In an embodiment consistent with the invention, the asset may already have an immutable identifier that may be used as a unique asset ID. By way of example and not limitation, the asset may be a SPARC system, in which case a host ID of the SPARC system may be used as the unique asset ID. In another embodiment contemplated by the invention, the asset may contain a component that has an immutable identifier. By way of example and not limitation, the asset could include a power supply with field replaceable unit ID (FRUID). The FRUID may be used in composition with a non-unique identifier for the asset to create a formal unique asset ID (e.g., <computer name>.<power supply FRUID>, assuming the power supply has a FRUID). In yet another embodiment contemplated by the invention, the asset may contain or have a set of attributes that, when combined, create a predictable unique asset ID. For example, an asset may be an operating system, e.g. Solaris. The operating system's attributes include a zone or container in which the operating system is running, as well as an asset ID for the host system running the operating system. In an illustrative example, these attributes may be combined to create the unique asset ID (e.g., Solaris.<container ID>.<unique asset ID for the host system>).

Figure 30:
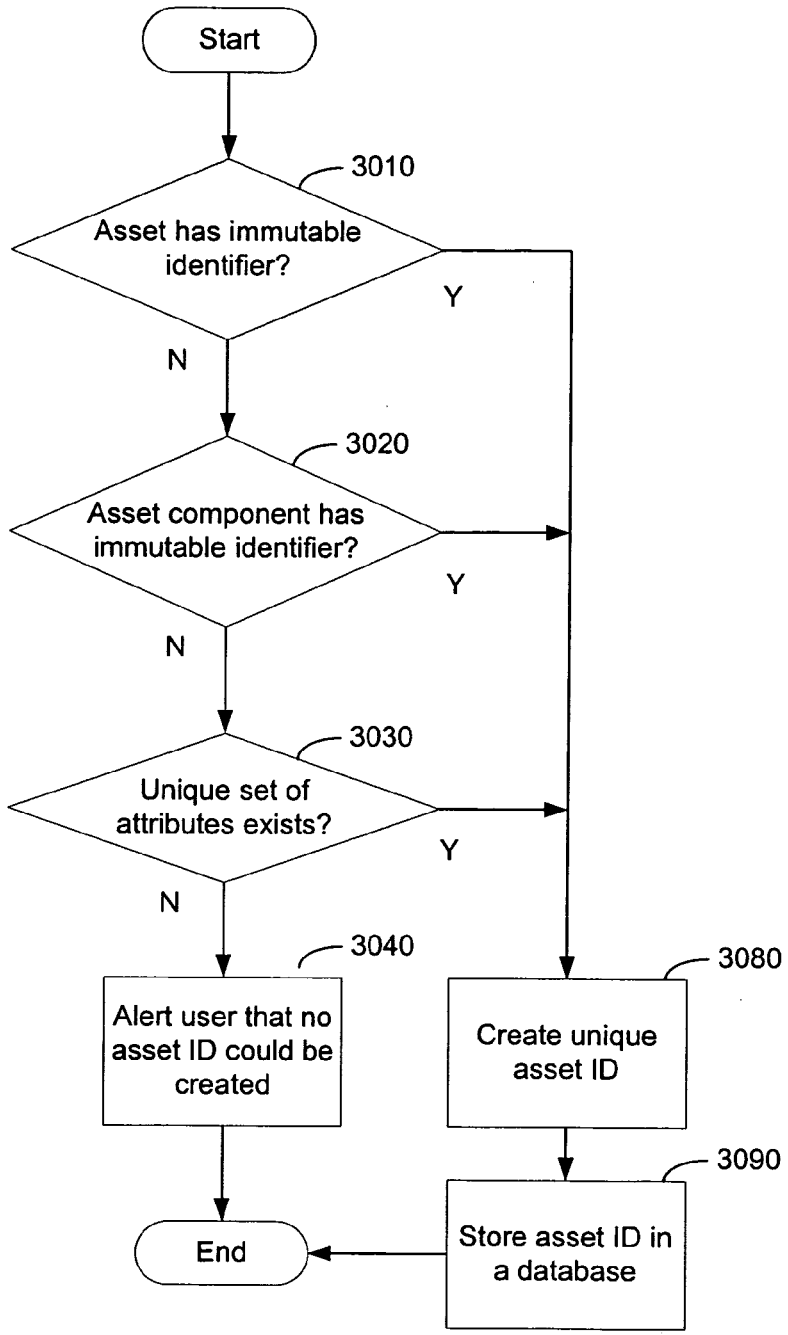
FIG. 30 depicts an exemplary flow diagram illustrating the exemplary steps of assigning a unique asset identifier.

One of ordinary skill in the art will recognize that a combination of these processes for assigning a unique asset ID may be used, as well as additional processes not described in this specification. Referring now to FIG. 30, an exemplary method for assigning a unique asset ID consistent with one embodiment of the present invention is described.

At step 3000, the asset manager (or asset discovery module of an offering platform, in the case where the asset is a thin client device) discovers the asset. As described above, the asset manager may actively search for assets, or may provide an API by which assets may notify the asset manager of their existence. At step 3010, the asset manager determines whether the asset possesses an immutable identifier. If so, the asset manager proceeds to step 3080. At step 3020, the asset manager determines whether a component of the asset has an immutable identifier. If so, the asset manager selects the immutable identifier and combines it with a non-unique asset identifier to create a formal unique asset ID (e.g., <computer name>.<power supply FRUID>, assuming the power supply has a FRUID), and proceeds to step 3080. At step 3030, the asset manager determines whether there is a set of attributes that may be predictably combined to uniquely identify the asset (e.g., Solaris.<container ID>.<unique asset ID for the host system>). If so, the asset manager selects those attributes and proceeds to step 3080. At step 3040, having not yet created a unique asset ID, the asset manager determines that a unique asset ID could not be automatically and predictably created, and indicates that a unique asset ID could not be created for the asset. At step 3080, the unique asset ID is created from the information determined at steps 3010, 300, or 3030. At step 3090, the unique asset ID is stored in a local database. One of ordinary skill in the art will recognize that the ordering and inclusion of the previously described steps, or the inclusion of equivalent steps, may be altered without diverging from the spirit of the invention. The illustrative steps may also be performed by the asset discovery module, as previously described.

In cases where the asset ID assigned to an asset cannot be predictably created, human intervention may be required. An example might be a switch visible on the network with no unique identifier of its own, and no persistent store that is programmatically available. In this case, multiple Connected Asset Containers will report it, and there may be no way to positively and programmatically determine that they are all talking about the same asset. In this case, the asset manager may create an identifier with relevant context (e.g., <asset type>.<model number>.<firmware version>). If the asset is visible to one Connected Asset Container, a predictable identifier may be combined with the Connected Asset Container's own unique identifier to generate a predictable unique identifier for that asset. When the asset is a person, the person is identified by their account/identifier in the federated name space.

The asset module in the asset platform acts an adapter between the asset's native interfaces and an offering platform.

The asset module translates native telemetry, control, and event information and provides that information in a standard manner that may be understood by the offering modules, which are exposed to the offering platforms as web service endpoints. In presenting asset modules through a standard interface, the asset modules may be used across a number of offering modules, which allows assets to be introduced into a network independent of the offerings that may use them. By separating local business logic in the offering module from the abstraction of native telemetry, control, and event mechanisms in the asset module, reuse of both components is facilitated.

Figure 31:
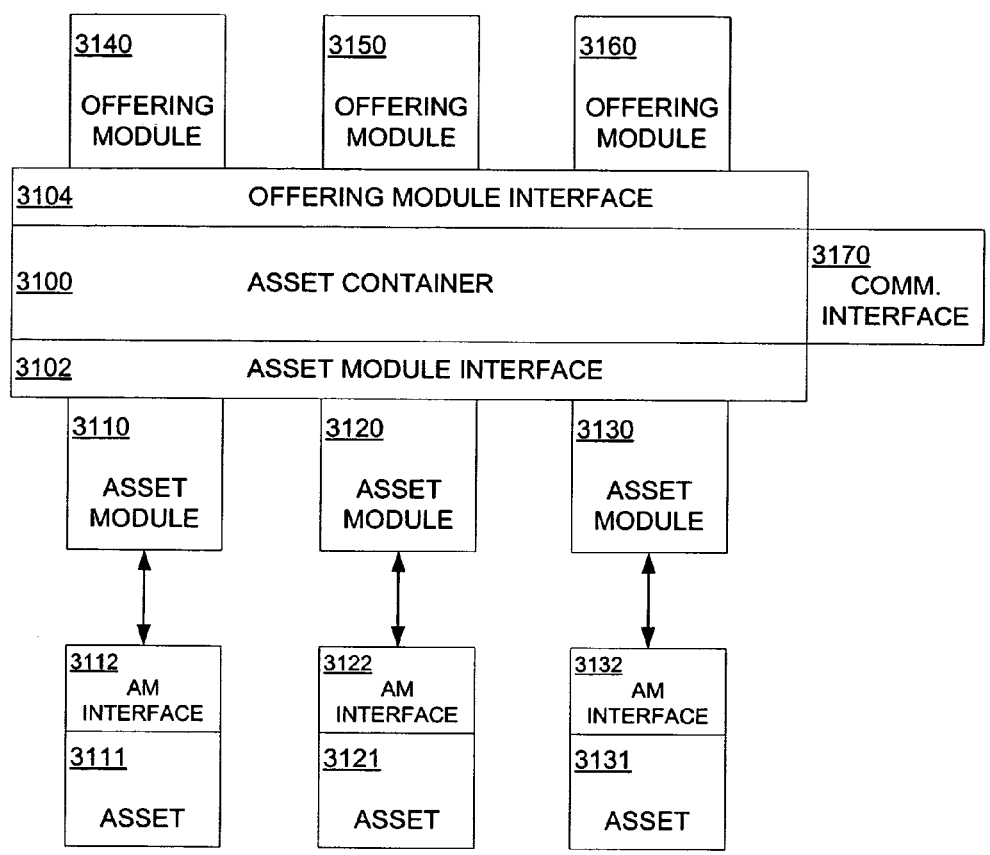
FIG. 31 depicts an exemplary logical diagram of an asset platform in accordance with methods and systems consistent with the present invention.

FIG. 31 depicts a logical model of the asset platform. Asset modules 3110, 3120, and 3130 are implemented on top of asset container 3100 and interface with the asset container 3100 through asset module interface 3102. Offering modules 3140, 3150, and 3160 are also implemented on top of asset container 3100 and interface with the asset container 3100 through offering module interface 3104. Asset module 3110 communicates with asset 3111 through asset management interface 3112. Asset module 3120 communicates with asset 3121 through asset management interface 3122. Asset module 3130 communicates with asset 3131 through asset management interface 3132. Through the asset container 3100, the offering modules 3140, 3150, and 3160 may communicate with the asset modules 3110, 3120, and 3130. Through asset container 3100, offering modules 3140, 3150, and 3160 may also communicate with a network through communications interface 3170.

As previously described with reference to FIG. 16, a Connected Asset Container 1604 has built upon it an asset management module 1654, which exposes the assets instantiated by the asset management modules, and a web service adaptor 1624 that allows an offering platform to communicate synchronously with offering modules in the asset platform. In the illustrative embodiment, the offering modules in the asset platform include business processes that may be better suited residing local to the asset, for reasons such as privacy and security. A business process may describe a work flow or sequence of steps that are to be executed in a desired manner as specified. One such exemplary process is a process used to identify a user to a network. By including offering modules in the asset, those offering modules may also leverage the capabilities of the business process framework 1012 (see FIG. 10) such as exception handling.

Figure 32:
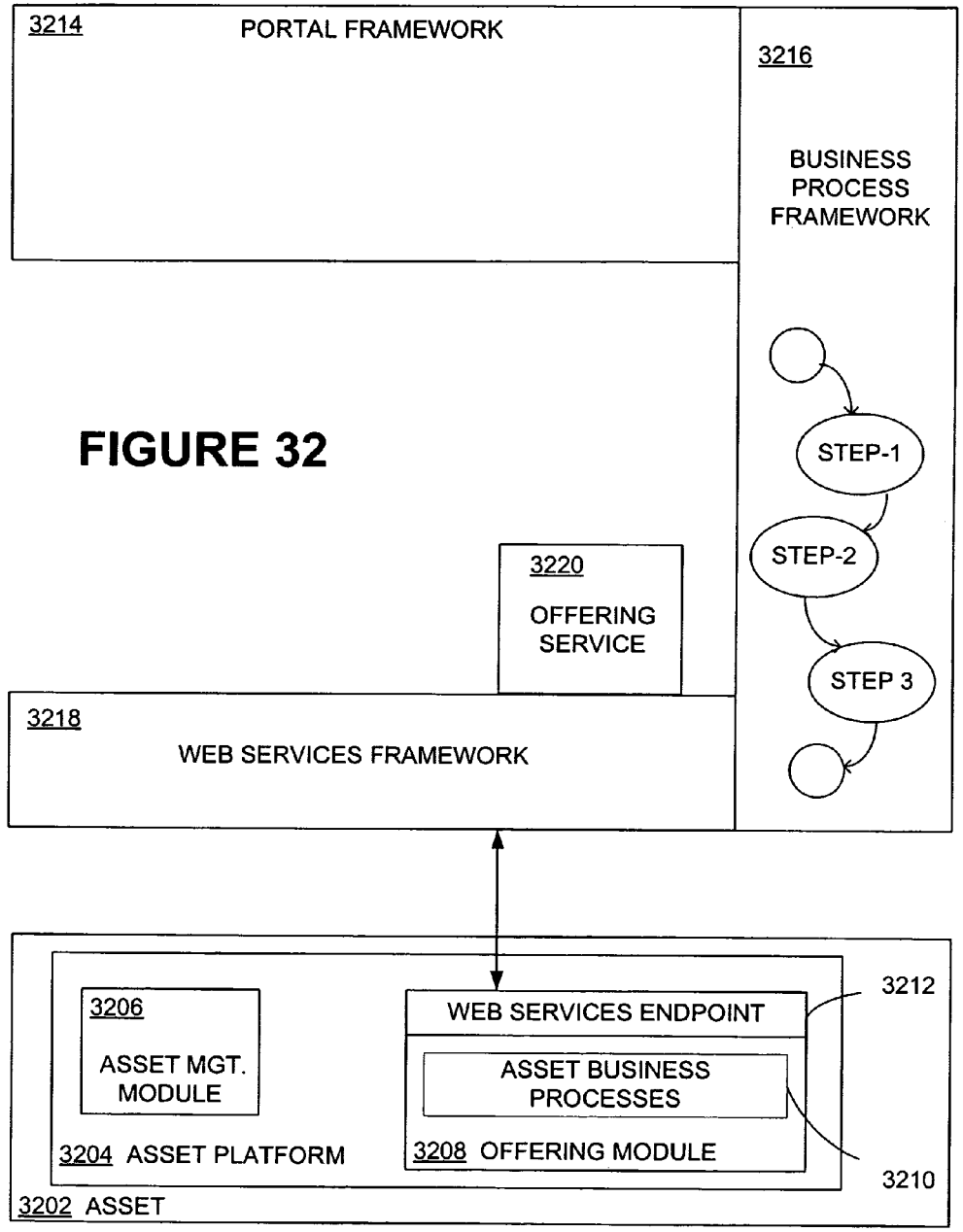
FIG. 32 is a block diagram that illustrates components of the offering platform and the asset module that exposes the offering module.

FIG. 32 illustrates an architectural pattern in consistent with the present invention that provides an offering module within the asset platform of an asset. Exemplary asset 3202 includes an asset platform 3204, which further comprises an asset management module 3206 and an offering module 3208. The offering module includes asset-side business processes 3210, and a web services endpoint 3212 to communicate with the offering platform. The offering platform comprises a portal 3214, a business process framework 3216, and a web services framework 3218. The business process framework performs offering business process execution and status tracking. The offering business processes can be fully automated or a blended mixture of human and automated tasks. The business process framework interfaces with the portal, which manages requests from a user that may initiate a new process or be the continuance of a process. The web services framework executes tasks through the interfaces exposed by the business capabilities through offering web services 2220. These web services interfaces can be read in through the business process framework to provide the business process designer a palette of existing capabilities. The service oriented architecture enables reuse by supporting assembly of existing components described within the web services registry.

In contrast to traditional offering management systems, business processes that are required to reside closest to the asset, i.e., encapsulated in the offering module, fully participate in the processing of business logic. Thus, if a step in the asset business processes that reside in the offering module fails, the asset business processes can take compensating or exception handling steps directly in the context of the business logic. In addition, exposing asset-side business processes as a web service endpoint promotes reuse of that logic and enable assembly of richer offerings over time.

Figure 33:
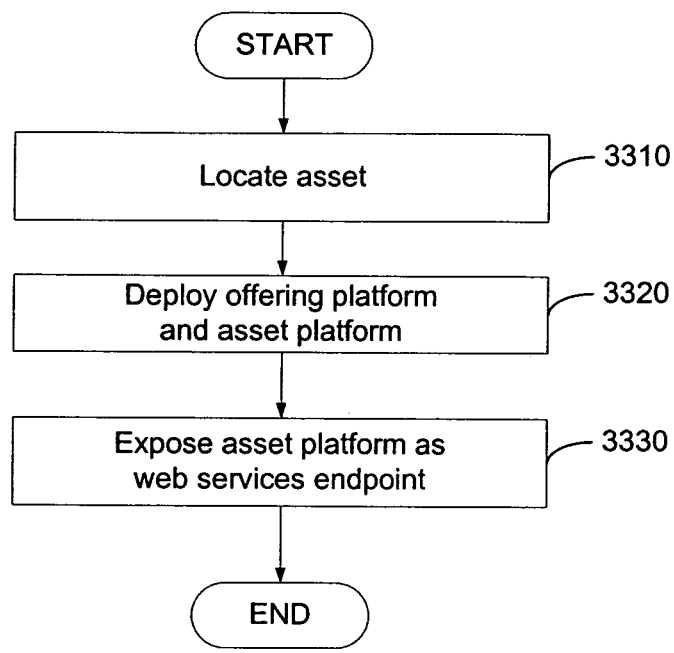
FIG. 33 is a flow diagram illustrating the exemplary steps of instantiating an offering module on an asset.

The location of assets and deployment of asset platforms has been described previously, e.g., in reference to FIG. 13. FIG. 33 depicts a method consistent with the present invention in which an offering platform locates an asset, deploys an asset platform, and exposes the offering module of the asset platform through a web services interface. At step 3310, the asset is located on the customer device, as previously described. At step 3320, the offering platform deploys an asset platform on the customer device, which instantiates an offering received from the offering platform. At step 3330, the offering module of the asset platform is exposed as a web services endpoint through the web services interface. In one embodiment consistent with the present invention, an offering module is exposed as a web service by creating an interface definition file using the Web Services Description Language (WSDL). This file is compiled to create Java language bindings and to publish the network address (e.g. web service end point) in an SOP directory. The business processes of the offering module are thus available to a network through the offering platform.

Figure 34:
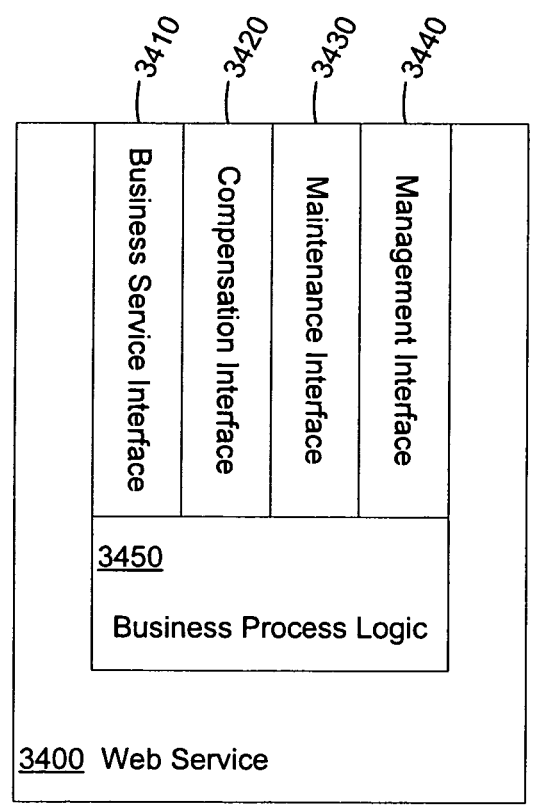
FIG. 34 depicts a logical diagram of standard web service interfaces.

As mentioned above in the description of FIG. 8, the web services of the web services framework expose some standard interfaces. FIG. 34 illustrates a logical depiction of the illustrative interfaces included in an instance of a web service. The Web Service 3400 includes, for example, a Business Service Interface 3410, a Compensation Interface 3420, a Maintenance Interface 3430, and a Management Interface 3440. The Business Service capability exposes the business capabilities of Business Process Logic 3450. The execution of the business capability is determined by document that has been passed in the message to service, and the business processes provided by the offering. As with all interfaces of Web Services, the following interfaces are defined in WSDL and then compiled to create Java language bindings.

The Compensation Interface provides capabilities to address issues of intermittent connectivity and poor transmission quality that may result in operations failing. Business Process Execution Language (BPEL) may include an explicit declarative mechanism to embed compensation transactions for failed Web Services activities. The Compensation Interface provides application developers a standard way to implement compensation code for applications. By providing a standard interface, developers do not have to create application specific interfaces for compensation transactions. In one embodiment consistent with the invention, the Compensation Interface implements an "undo" operation for an operation driven through the Business Service Interface. By providing a standard compensation interface, offering developers may define behaviors that are acceptable when network connectivity or other conditions do not allow proper execution of web services calls.

The Maintenance Interface provides a capability to control the web service as part of an overall system of distributed offering platforms. The Maintenance Interface implements a "start service" and "stop service" operation to start and stop web services. When an offering registers with an SOP, the SOP maintains a dependency map of the web services for all the offerings. Using this dependency map, the start and stop operations of a web service may also start and stop a web service on which it depends. This capability allows an SOP to start and stop offerings and services in an automated manner that prevents the stopping of a web service from causing multiple offerings from functioning. In addition, dependent web services may be shutdown in an asynchronous manner allowing for better performance of management operations.

The Management Interface provides a capability to facilitate the monitoring of web services, and may also implement management controls. For example, the Management Interface implements an "isAlive" function. This simple test allows for basic testing of the overall system state by using a standard Web Services interface. The "isAlive" method simply queries the service, probing on its state, and returns a response. The Management Interface may also implement a trace capability. This functionality allows an administrator to turn tracing on for a web services and periodically acquire updates of that trace.

An entitlement framework consistent with embodiments of the present invention provides a mechanism for restricting access to resources by entities. In the context of this description an entity may be, for example, a user, group of users, or an asset that may access a resource in the network, such as an offering or an asset. The entitlement framework provides linkage between a user or group of users, an asset, and an offering. For example, an offering can be entitled to asset A which may be accessed by user B. A user or asset may acquire an entitlement because some type of business transaction had occurred earlier, for example, a user successfully completing a subscription request to an offering. Entitlements may accommodate not only offerings, but also content associated with an offering. For example, a software update for Solaris 10 may have a different entitlement level for security patches than for low priority bug fixes.

Figure 35:
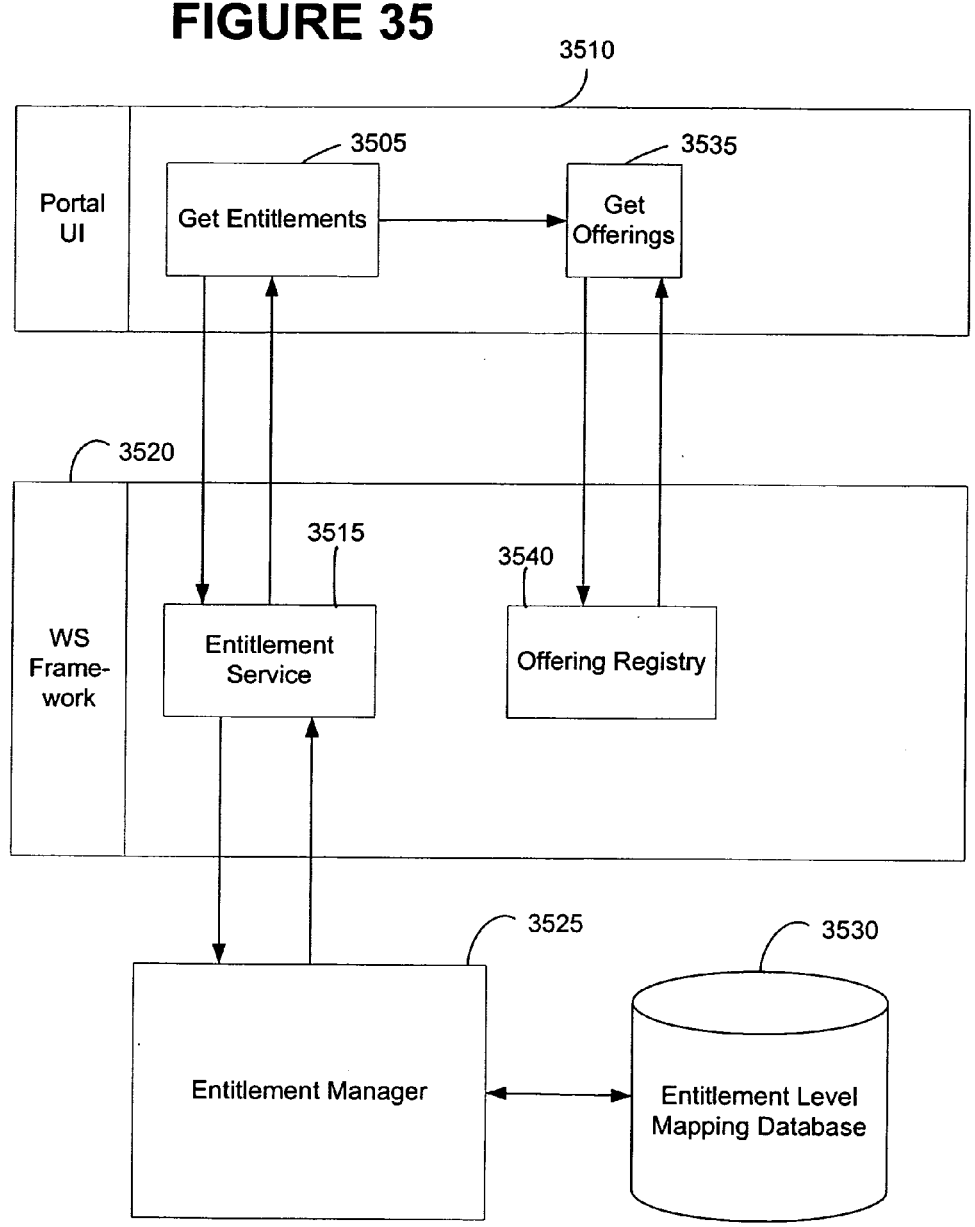
FIG. 35 depicts in more detail the processes performed by the offering platform for offering entitlement.

FIG. 35 illustrates an exemplary process of discovering entitled offerings. An authenticated user or group of users opens a Get Entitlements program 3505 of a Portal Framework 3510 user interface and presents the program with proof of authentication. The Get Entitlements program passes an authorization token indicating that the user has been authenticated to an Entitlement Service 3515 in a Web Services Framework 3520. The Entitlement Service then forwards the authorization token to a back-end Entitlement Manager 3525 in order to retrieve the entitlement classifications for the user or group of users.

The Entitlement Manager maintains an Entitlement Level Mapping Database 3530 that maps entitlement classifications to entitlement levels. For example, Offering A may provide patch content including patch-123 and patch-456 classified under entitlement classification C1, and patch-342 and patch-987 classified under entitlement classification C2. Offering B may provide content including alert-134 and alert-843 classified under entitlement classification D1, and alert-393 and alert-368 classified under entitlement classification D2. The Entitlement Manager maps entitlement levels to these entitlement classifications. For example, a Gold level may have access to all entitlement classifications, a Silver level may have access to classifications C1 and D1, a Bronze level may have access to classifications C1 and C2, and a Group level may have access to classifications D1 and D2. These mappings are maintained in the Entitlement Level Mapping Database.

In the illustrative example, the Entitlement Service presents the Entitlement Manager with an authorization token indicating a Silver entitlement level, obtained as part of a prior subscription agreement. Based on the Silver entitlement level, the Entitlement Manager returns an entitlement token to the Entitlement Service indicating entitlement to offerings having entitlement classifications of C1 and D1. The Entitlement Service returns the entitlement token to the Get Entitlements program of the Portal Framework. The Get Entitlements program then passes the entitlement token to a Get Offerings program 3535 in the Portal Framework, which presents the entitlement token to an Offering Registry 3540 in the Web Services Framework. The Offering Registry includes all of the available offerings and their entitlement classifications. The Offering Registry returns the valid offerings based on the entitlement classifications as indicated by the entitlement token to the Get Offerings program, which then displays the available entitled offerings.

Figure 36:
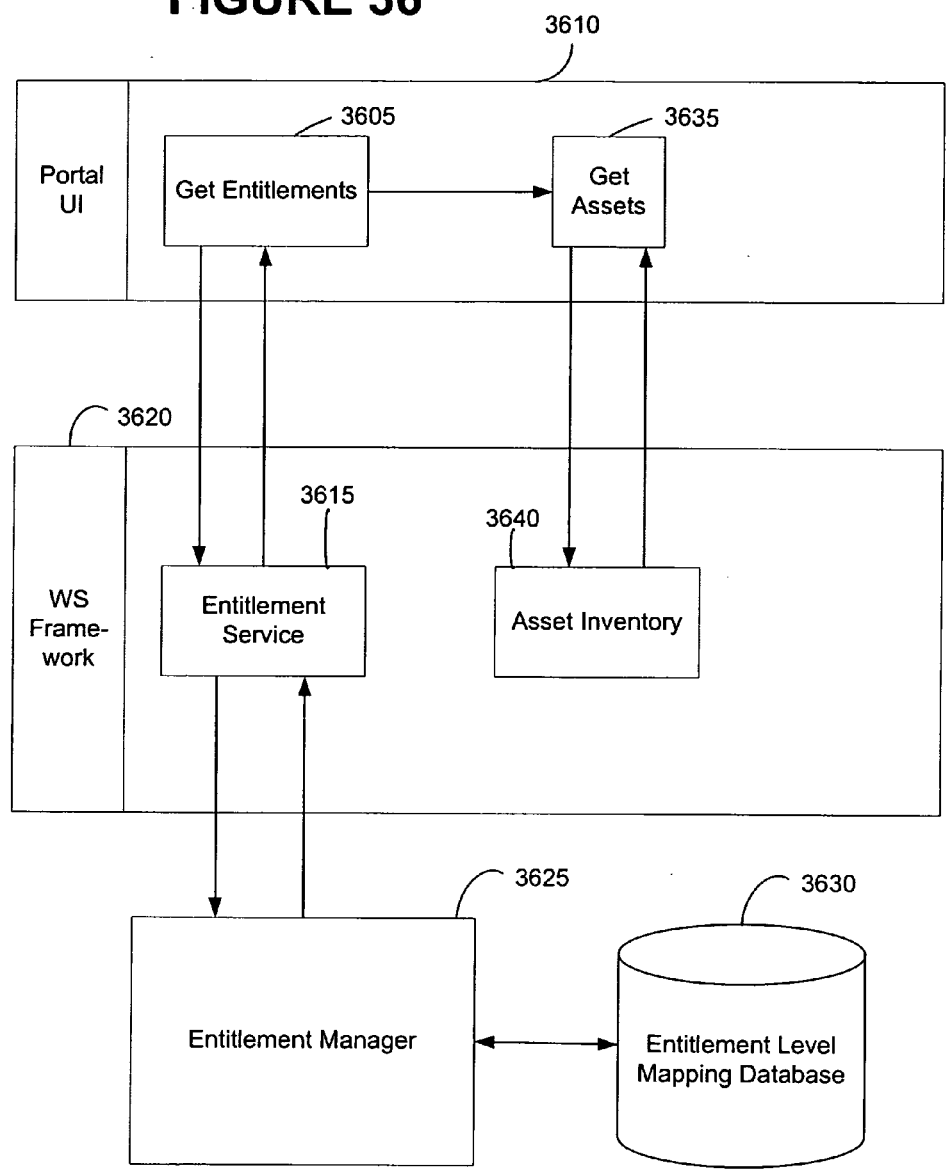
FIG. 36 depicts in more detail the processes performed by the offering platform for asset entitlement.

FIG. 36 illustrates an exemplary process of discovering entitled assets. An authenticated user or group of users accesses a Get Entitlements program 3605 of a Portal Framework 3610. The Get Entitlements program passes an authorization token to an Entitlement Service 3615 in a Web Services Framework 3620. The Entitlement Service then forwards the authorization token to a back-end Entitlement Manager 3625 in order to retrieve the entitlement classifications for the user or group of users.

In the illustrative example, the Entitlement Service presents the Entitlement Manager with an authorization token indicating an entitlement level. Based on the entitlement level, the Entitlement Manager returns an entitlement token to the Entitlement Service indicating entitlement to one or more assets. The Entitlement Service returns the entitlement token to the Get Entitlements program of the Portal Framework. The Get Entitlements program then passes the entitlement token to a Get Assets program 3635 in the Portal Framework, which presents the entitlement token to an Asset Inventory 3640 in the Web Services Framework. The Asset Inventory includes the available assets and their entitlement classifications. The Asset Inventory returns the valid assets based on the entitlement classifications to the Get Assets program.

A network of SOPs may also include a centralized offering catalog, which may be a stand-alone registry, to store offering information for the offering platforms in the SOP network. During an offering provisioning process, a provisioning application present to the offering developer an option to register the offering with the centralized offering catalog. In an illustrative example, the centralized offering catalog is a Lightweight Directory Access Protocol (LDAP)-based directory. In another illustrative example, this LDAP-based directory is implemented by a Sun Java Enterprise System Directory server. The catalog is a registry that may include, for example, the logical name of an offering, a brief description of the offering, the uniform resource identifier (URI) for the SOP providing the offering, the URI pointing to software that may be need to be deployed, configuration options for the offering (e.g. whether the offering can be tiered), and software bundles for offering deployment. One of ordinary skill in the art will understand that the catalog may include alternative or additional entries for an offering.

Figure 37:
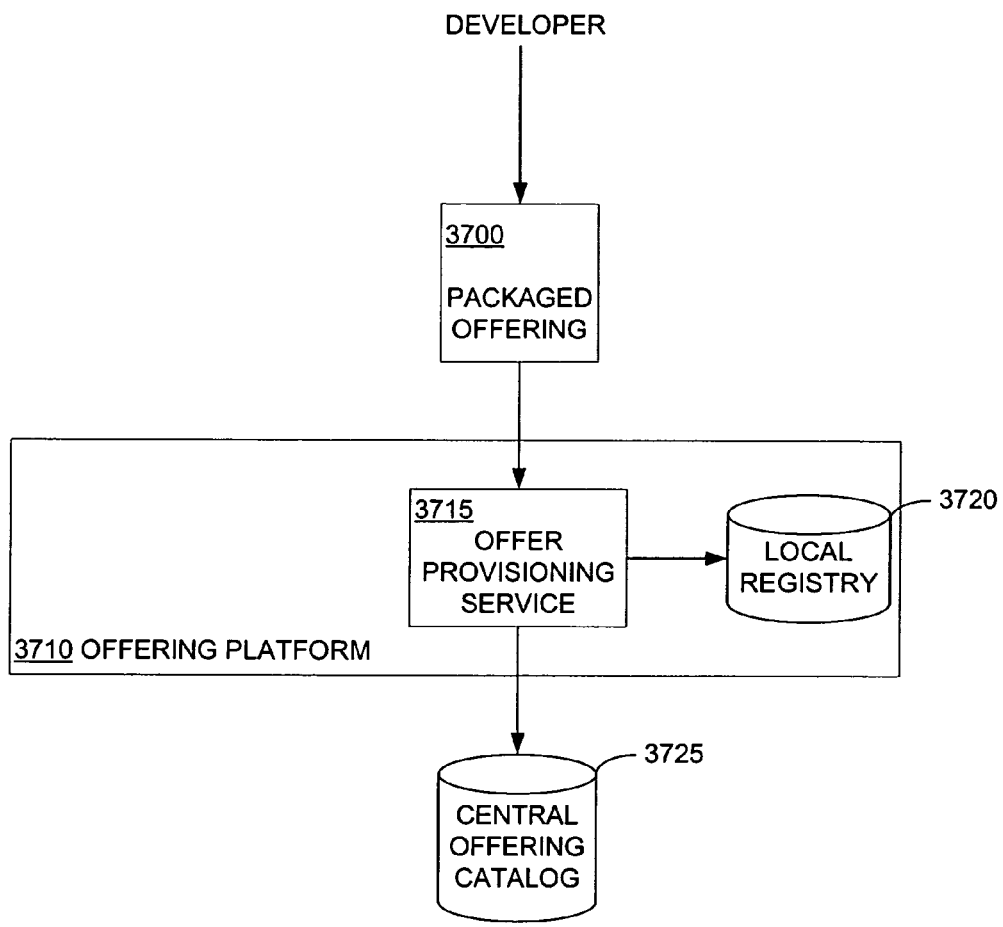
FIG. 37 depicts an exemplary process for registering an offering with a centralized offering catalog.

FIG. 37 depicts exemplary processes performed in registering an offering with a centralized offering catalog. A developer deploys a Packaged Offering 3700 to Offering Platform 3710. Offer Provisioning Service 3715 on Offering Platform 3710 provisions the Offering 3700 to make it available to users, and registers the offering with a Local Offering Registry 3720, which may be the local registry described above.

The Offer Provisioning Service 3715 further registers the offering with Centralized Offering Catalog 3725. This may be carried out by sending a message to the Centralized Offering Catalog 3725, the message may include, for example, information such as the logical name of an offering, a brief description of the offering, the URI for the SOP providing the offering, the URI pointing to any software that may be need to be deployed, configuration options for the offering (e.g. whether the offering can be tiered), and software bundles for offering deployment. This message may be an instance of an XML schema.

Figure 38:
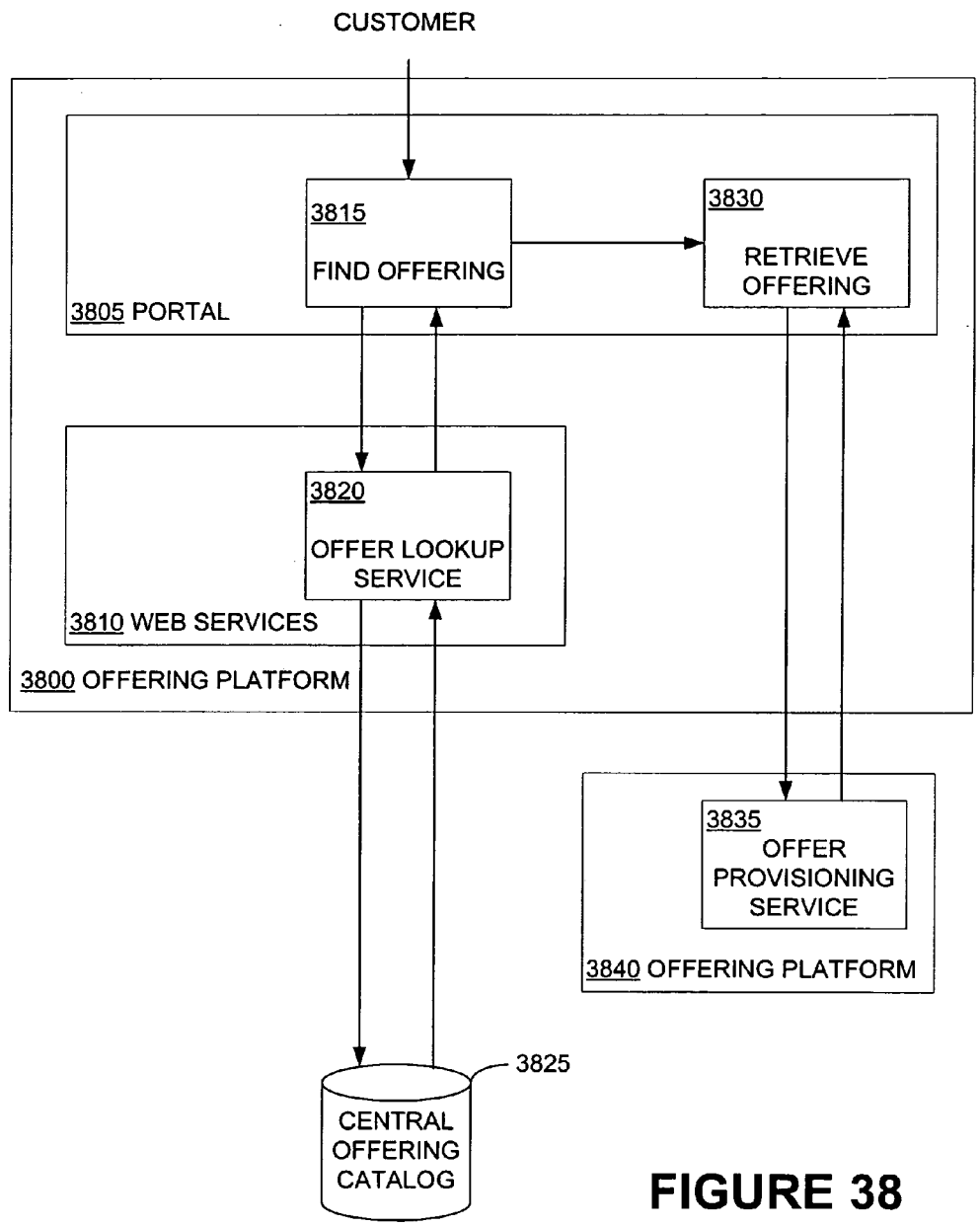
FIG. 38 depicts an exemplary process for finding an offering using a centralized offering catalog.

FIG. 38 depicts exemplary processes performed in finding an offering using the centralized offering catalog. Offering Platform 3800 includes a Portal Framework 3805 and a Web Services Framework 3810. A customer interacts with the portal framework and uses a Find Offering program 3815 in the portal's user interface to request an offering. The Find Offering program 3815 passes the request to an Offering Lookup Service 3820. If the Offering Lookup Service 3820 cannot find the offering locally, a query is made to the Centralized Offering Catalog 3825. The Centralized Offering Catalog 3825 returns information to Offering Lookup Service 3820, the information including, for example, logical name of an offering, a brief description of the offering, the URI for the SOP providing the offering, the URI pointing to any software that may be need to be deployed, configuration options for the offering (e.g. whether the offering can be tiered), and software bundles for offering deployment. The information is then passed to the Find Offering program 3815, which then passes the information to a Retrieve Offering program 3830. The Retrieve Offering program uses the information to contact Offering Retrieval Service 3835 on Offering Platform 3840. In response, the Retrieve Offering program receives the desired offering.

Thus, methods, systems, and articles of manufacture consistent with the present invention provide a privacy control model that allows data privacy to be managed on an offering by offering basis. The offering privacy policy described herein allows a customer to explicitly to see and configure what data is being used by the offering, who is using it, and how long an offering will hold on to the data.

As discussed above, unlike the conventional hub and spoke architecture, methods, systems, and articles of manufacture consistent with the present invention provide distributed servers that provide offering capabilities out to assets. The hub and spoke model is driven by its technological platform topology. Methods, systems, and articles of manufacture consistent with the present invention instead look to the business needs of the offerings. An offering may be part of a set of cohesive offerings that interoperate. The system infrastructure includes services and software infrastructure, such as communications, data management, and data visualization functionality, that are common to the offerings. "Offlets" are components of offerings and include the technology that supports delivery of the offering. Offlets are described in more detail below. Combining the location independence of the servers with the ability to plug-in offlets into the server framework allows the implementation of flexible business scenarios that are unrestricted by the underlying technology.

A centralized offlet catalog is a centralized registry of advertised offlets on the system. In the illustrative example, this catalog is not part of an offering platform, but is instead a standalone registry that can be deployed on its own. It can be deployed, for example, on a vendor system. The offlet catalog is a registry that contains information relating to the name of the offering and a brief description of that offering, and the URI for requesting clients to go to in order to download the appropriate offlet bits.

The offering registry, which is described above, is a container that persistently stores configuration and topology information for an instance of the offering platform to operate in the system. Information regarding what an offering platform needs to operate with its associated assets, asset platforms, offlets, and other offering platforms is stored in the registry. This approach avoids reliance on immature federated registry technologies and places responsibility of relationships between elements of the system on the deployment descriptors for offerings. For example, if a tiered offering is being deployed, the deployment descriptor specifies which offering platforms are delivering the hierarchy of offlets. Accordingly, offering deployment relationships are driven by business relationships instead of technology relationships. In turn, the business relationships effect privacy and security requirements as data moves around the system.

The offering registry may illustratively hold information relating to topology information for assets, asset platforms, and other offering platforms; information to create communication endpoints; a local offlet registry; connection mode and connection quality of service properties for communicating with asset platforms and offering platforms; privacy policies associated with offerings; user authentication and authorization information; user personalization information; and user customization information.

In the illustrative example, each offering platform has a local offlet registry that is deployed within the context of the offering platform. This is a registry of the offlets that are contained within the offering platform that the registry is apart of. The offlet registry may illustratively contain information relating to the name of the offering and a brief description of that offering; the URI for asset platforms and offering platforms to connect to to talk to the running offlet; URIs pointing to software that may need to be deployed to the asset platform; configuration options for the offlet (e.g., can it be tiered or not); software bundles for offering offering platform deployments (e.g., if non tiered—use a basic offering platform deployment; if tiered—use an offering platform and customer server deployment); and the data store of record for each offering platform that represents the information pertinent to accessing, activating, and provisioning offerings on the offering platform and the associated asset platforms.

Figure 39:
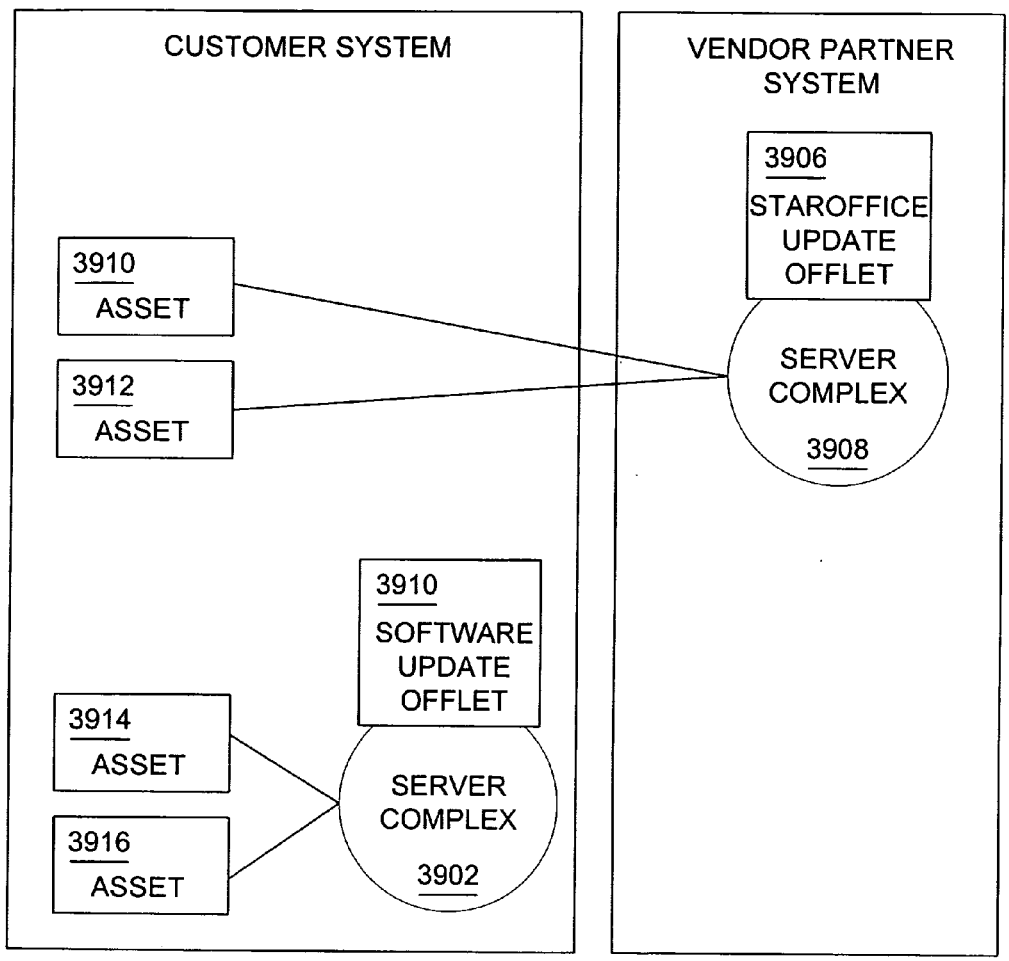
FIG. 39 is a block diagram that depicts systems supporting different deployment requirements.

FIG. 39 shows an illustrative example where a customer concerned with privacy for their datacenter 3902 hosts a Solaris software update offering 3904 within their datacenter, however the customer's StarOffice software updates are managed and provided by an offering 3906 on a vendor partner system 3908. The Solaris software update offering relates to assets 3910 and 3912. The StarOffice software update offering relates to assets 3914 and 3916. The relationship between the customer system and the vendor partner system is based on a business decision by the customer to receive StarOffice updates from a partner, not a technical infrastructure need. Architecturally this provides significant benefits compared to the conventional hub and spoke model, particularly around scale, as assets do not need to communicate with a hub, instead they communicate with the server that delivers their business needs as governed by their own business and privacy parameters.

One of the challenges of the IT industry has been the rapid rate of change and the need to track that change to meet the needs of the customer. The system architecture follows a model of business process abstraction, where the business process that describes the interaction between the customer and the offering is managed separately from the offlet that represents the actual software that delivers the offerings capabilities. This allows the offering providers to change and modify the business process and create new offerings by combining business services exposed by existing offlets without having to create new offlets. This mitigates the software development cycle and allows offering providers to adapt more rapidly to changing business needs.

As described above, offerings are delivered via a network of distributed servers. This topology is highly flexible, allowing offering providers to determine deployment strategies and options that can be accepted by particular customer market segments. Offerings may be distributed across the network of servers, be deployed at a customer, a vendor partner, or at a vendor and be bound together as needed based on business value. Some offerings may have little or no connectivity back to the vendor. Others may rely on the vendor system for its day to day operations.

Figure 40:
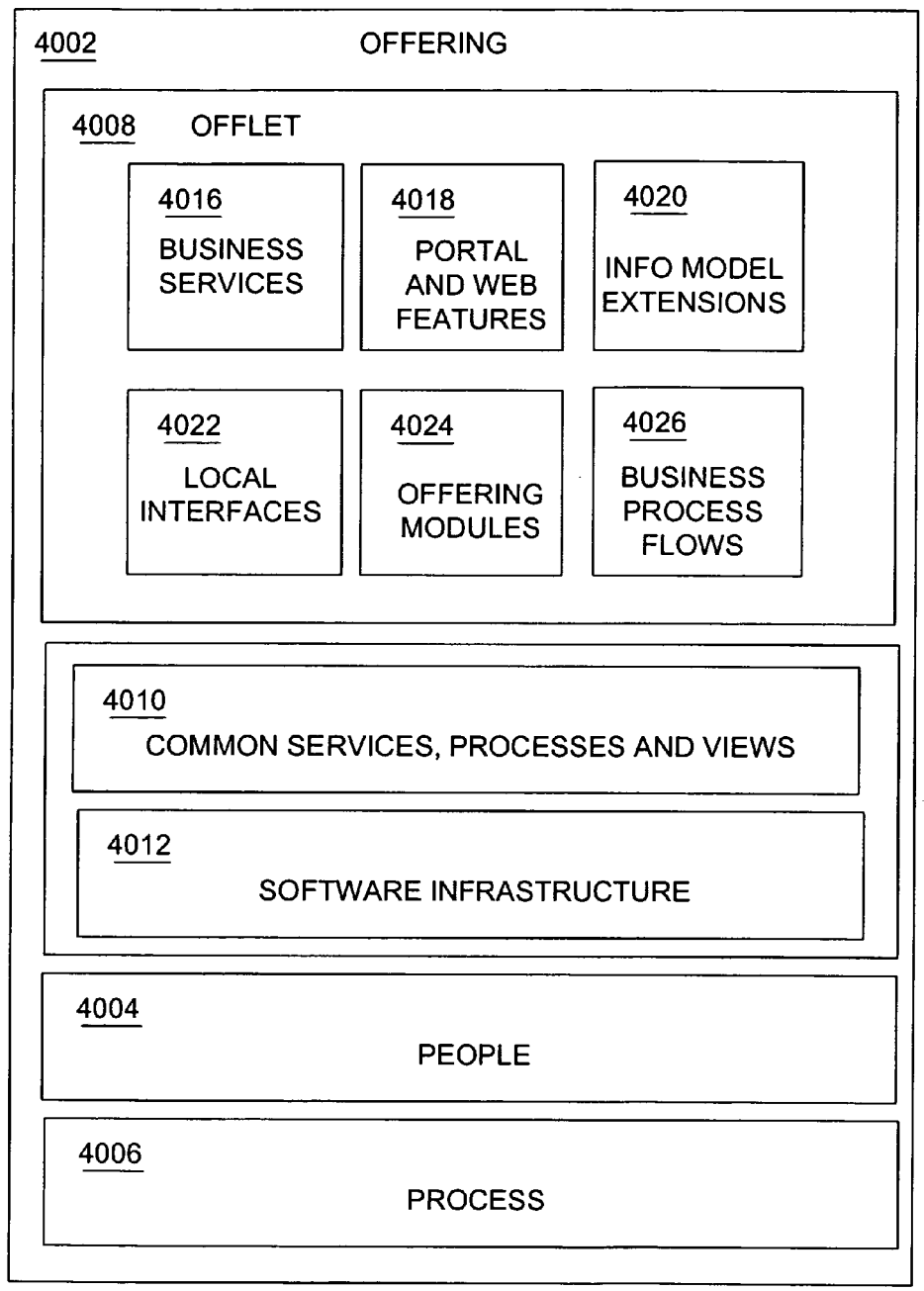
FIG. 40 is a block diagram that shows illustrative components of an offering.

FIG. 40 shows illustrative components of an offering 4002. An offering describes the technology, people 4004, and processes 4006 that are used to provide that offering to the customer. The technology is broken into offlets 4008 and a series of common services 4010 that are supported by a software infrastructure 4012. Offlets take advantage of the common services and common deployment models and integrate into the software infrastructure. Offlets may include a series of business services 4016 that provide business level interfaces, portal and web interfaces 4018 for interaction with a portal or web page, information model extensions 4020 that may be used in addition to the information model, a local client user interface 4022 that may be used to provide a desktop GUI for an asset, an offering module 4024 that performs processing associated with the respective asset, and business process flows 4026 that interconnect the business services, common services, and offering module interface. Each of these elements of an offlet are described in more detail below.

Business services 4016 represent functional activities that may be automated and encapsulated using a document style web service. Illustrative services include checking entitlements and getting a user's software configuration. The implication of providing services at this level of abstraction is that business process developers are not required to not access persistent storage mechanisms directly. Developers of business services may access persistent storage mechanisms, but the encapsulation of data access and business logic allows business services to be more easily reused and orchestrated in a wide-range of business processes.

Portal and web interfaces 4018 are user interface mechanisms. Offerings may use a portlet to deliver user interfaces in the context of a portal. There are three illustrative integration patterns that may be used when developing an application that will have a user interface that is part of the portal. The first approach is to develop a full-featured user interface that encapsulates user interactions for a given application within the portlet or set of portlets deployed into the portal server. A second integration pattern is to have a portlet that is a jump off to a separate web application that presents the user interface of the application. This pattern may primarily be used for applications that have complex user interfaces and process flows that may not easily work within the confines of a portlet. The third integration pattern includes exposing small, functional user interface views into the application that provide limited functionality that can more easily be encapsulated in a portlet. After some interaction takes place, the user is taken out of the portal to a web application that contains the more complex user interfaces and flows.

Figure 41:
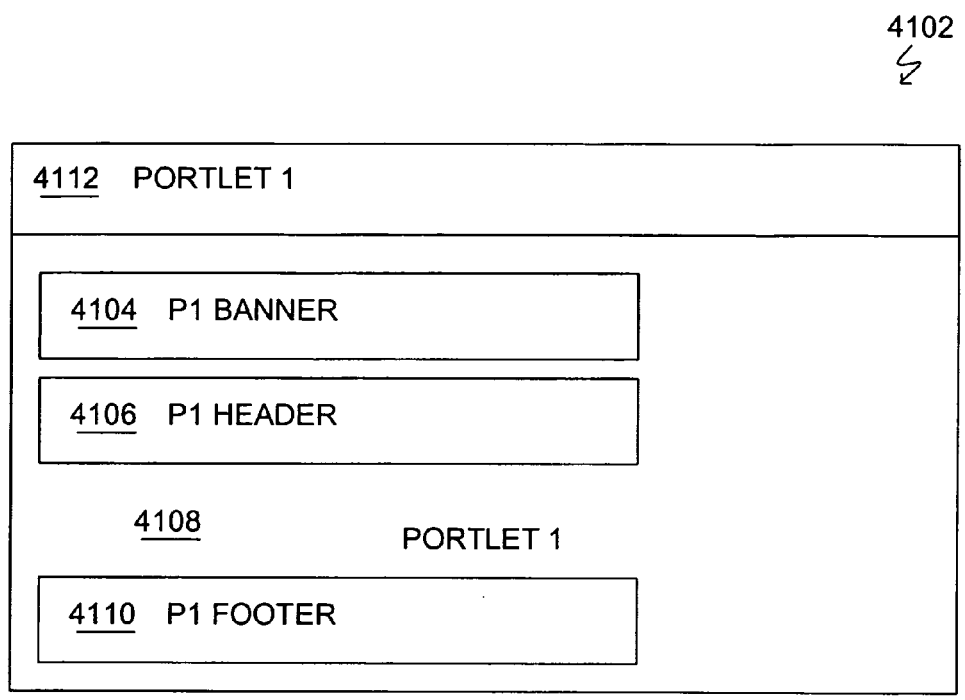
FIG. 41 is a block diagram of an illustrative portlet user interface.

As described above, functionally, a portlet provides a channel of information directed to a specific user or group using a portal as its container. Portlets are a mechanism for offering applications to integrate with the common portal framework. These integrating applications expose presentation logic and functionality via portlets deployed on a server which will then be aggregated into the central portal. Different deployment scenarios allow portlets to be remotely displayed from other service centers. Each portlet can contain certain layout elements. FIG. 41 shows illustrative banner 4104, header 4106, content 4108, and footer 4110 sections of a portlet as they appear in an illustrative portal page 4102. In this example, one of a number of title bars 4112 can be displayed, based on the state of the portlet at runtime.

The information model extensions 4020 element of an offlet provides interoperability among business processes and business services, and may be based on industry and other standards. For example, the information model extensions may be based on the industry standard Shared Information and Data (SID) model from the Telemanagement Forum (TMF) or the Common Information Model (CIM) from the Distributed Management Task Force (DMTF). The information model is extensible. For example, the abstract model may be extended. This may be done by adding new classes, properties, and associations to the information model. In the illustrative example, the information model is described in UML, however other representations may be used. In this case, the offering developer may extend the information model by registering UML specifications of the extensions with the information model repository. The extension is then compiled into a runtime model verification. Once complete, the offering developer can utilize the new extensions in their business interface.

The local client user interface 4022 element of an offlet provides local client user interfaces in addition to the portal-based user interfaces. These can be, for example, rich client user interfaces or command-line interfaces that interface with the asset platform.

The offering module 4024 element of an offlet performs processing associated with a respective asset. Local business logic is offering specific logic that resides in close proximity to the assets. An example of this type of logic is to "enrich" events by adding additional information to the document that encapsulates the event before it is forwarded. This local business logic is represented in an offering module. Offering modules reside in the context of an asset platform and interact with one or more asset modules on behalf of an offlet. Offering modules interface with the communication services to send and receive requests from the offering platform instance where the respective offering is being hosted. As described above, in the illustrative example, asset modules do not communication directly with an offering platform. Asset modules are deployed on an asset platform and are utilized in the context of an offlet. Depending on the offlet, local user interfaces to the offering module maybe provided. These user interfaces may implement management or configuration tasks. As described above, offering modules also enforce the data privacy policies of offerings.

The business process flows 4026 component of an offlet interconnect the business services, common services, and offering module interface. The system includes a service-oriented architecture that is driven by business processes to assemble existing business services into offlets. Business process flows may be defined separately and managed explicitly through a business process management system. Business process flows comprise two constituents: activities and sequence of activities. Activities are implemented via an invocation of a service, which either represents a programmatic solution or some interaction with a user. The sequence of the activities (flows) are affected by business rules, including decision and synchronization points. As discussed above, a business process may be documented using the Business Process Modeling Notation (BPMN). In BPMN, activities are represented as rounded rectangles and flows are represented as directional arrows.

Figure 42:
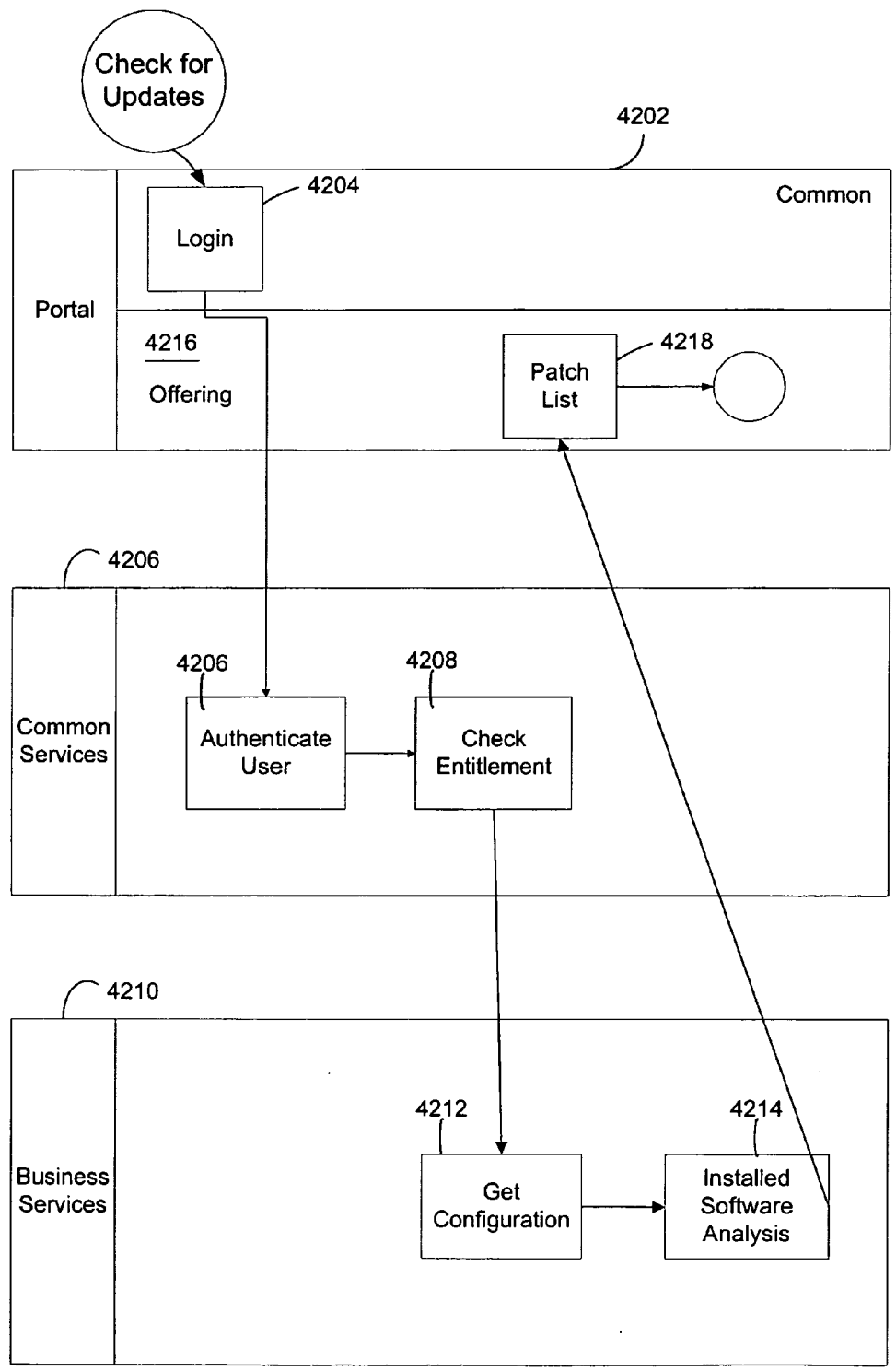
FIG. 42 depicts illustrative processes for checking for a software update.

FIG. 42 shows an illustrative business process flow that orchestrates a number of business services to perform a "Check for StarOffice Updates" operation. A user accesses a portal 4202 and makes the request to check for StarOffice updates. To do so, the user first logs in to the network 4204 via the portal. The common services 4206 authenticates the user 4206 and checks entitlement 4208. A business service 4210 checks gets the user's StarOffice configuration 4212 and analyzes the current StarOffice installed software 4214. The offlet 4216 uses this information to provide a StarOffice patch list 4218. Thus, a task may be implemented as a business service, which is exposed via a document-style web service (e.g., Get User's StarOffice Configuration), or require user interaction (e.g., Login into the network).

Figure 43:
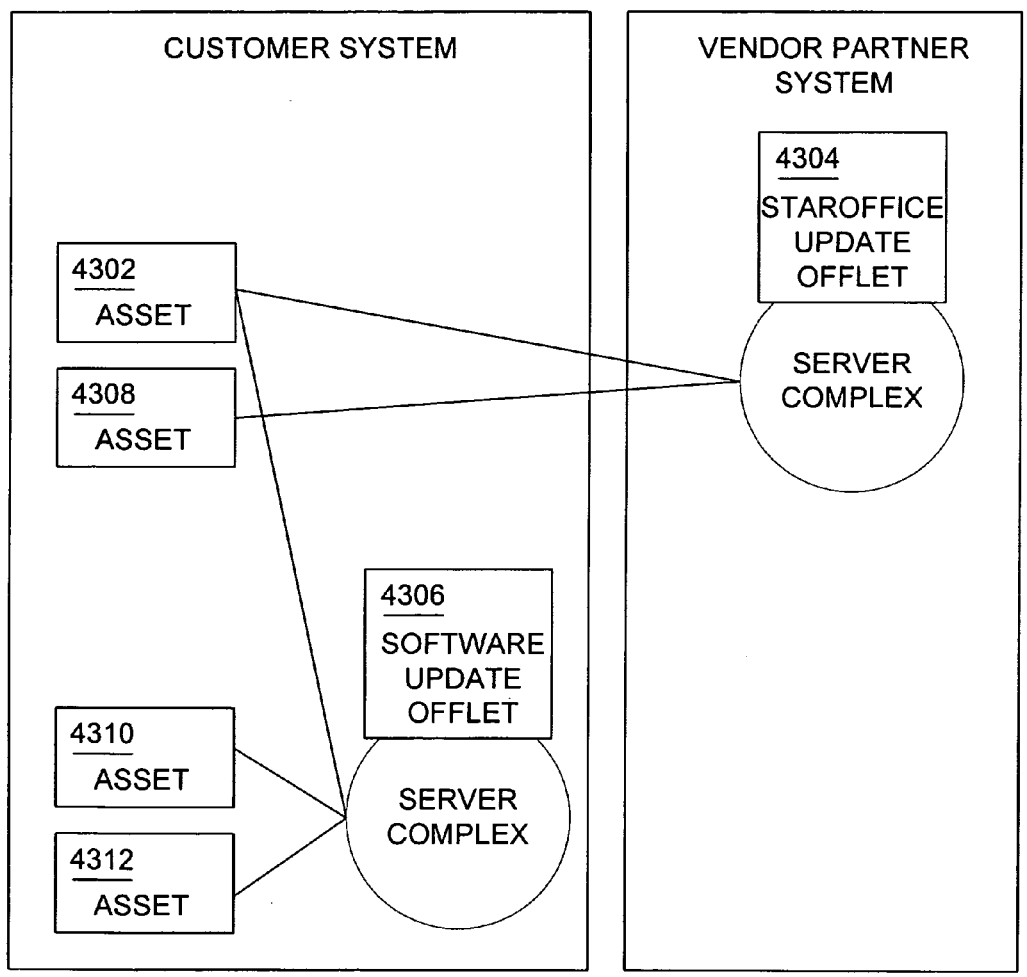
FIG. 43 is a block diagram that shows illustrative relationships between connected assets and offlets.

An asset can be an element that can participate in an offering. As described above, an asset can be hardware, software, storage, a service processor, a cell phone, or another element. Once an asset is registered with the system, it is considered "connected" (i.e., registered). FIG. 43 shows some illustrative relationships between connected assets and offlets. As shown in the illustrative example, assets can be served by more than one offering through offlets. For example, asset 4302 is served via offlets 4304 and 4306, which reside on different servers. Assets 4302 and 4308 are served via offlet 4304. Assets 4310 and 4312 are served via offlet 4306.

Figure 44:
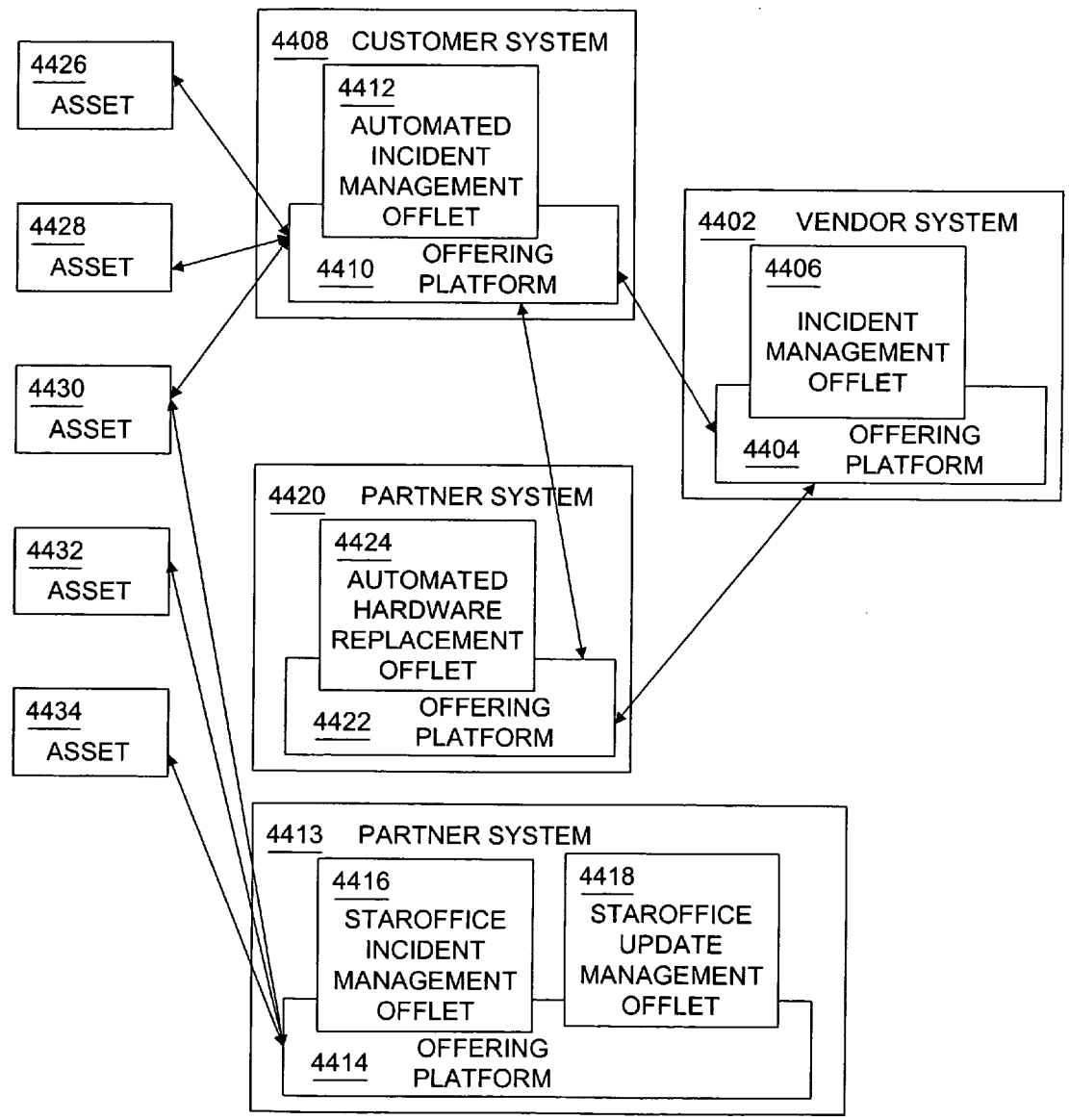
FIG. 44 depicts an illustrative offlet topology that shows a multiple delivery offering scenario.

FIG. 44 shows how a set of offerings can relate and be delivered in relationship to a customer system, a vendor partner system, and a vendor system. Asset platforms are not shown in FIG. 44 for simplicity. In the illustrative example, vendor system 4402 includes an offering platform 4404 that hosts an incident management offlet 4406. Customer system 4408 includes an offering platform 4410 that hosts an automated incident management offlet 4412. The vendor has enlisted the help of a partner to provide two StarOffice-specific offerings via vendor partner system 4413. Vendor partner system 4413 includes an offering platform 4414 that hosts a StarOffice incident management offlet 4416 and a StarOffice update management offlet 4418. Another vendor system 4420 includes an offering platform 4422 that hosts an automated hardware replacement offlet 4424. Relationships between the offerings and delivery of offerings to assets 4426-4434 are shown by the arrows. Assets, such as asset 4430, can be served by more than one offering platform and from different server locations.

As shown in FIG. 44, StarOffice offerings 4416 and 4418 are offered by the vendor partner system with no connection back to the vendor. This can be implemented, for example, via physical media with licensing information flowing back to the vendor outside of the network. Further, since these illustrative StarOffice offerings are self contained, they can be scaled horizontally by the vendor engaging more vendor partners.

The illustrative incident management offering is offered via a set of offlets, which are organized in a hierarchical manner. The customer system provides automated incident management offering via offlet 4412, which offering can log incidents, recommend remediation steps, and integrate with the customer's incident management system. The offering 4424 delivered by vendor system 4420 is for hardware replacement. If the incident management offering at the customer's premise recognizes that a hardware element generating the incident needs replacement, it forwards the request to the hardware replacement service automatically. As part of offering setup, the two instances of the offering platforms have exchanged asset information and the relationship between the two offlets is established. If the incident created at the customer site is not a "hardware replacement" incident and it cannot be handled locally, it is forward to the incident management offering 4406 hosted at vendor system 4402.

Offlet topologies describe information and data that relates to the offlet. They may be stored separately (e.g., in the offering registry) and linked to the infrastructure topology as may be necessary. In an illustrative example, a configuration management database (CMDB) uses its own discovery and schema, in which the schema and the data elements are referred back to the infrastructure topology as needed, but the offering operates off the CMDB.

The offlet topology describes, for example, where offlet services are deployed. These services may be deployed by offering platforms. However, the offlet topology may generally describe business deployment. For example, the offlet topology may describe whether deployment is it at a partner site, or whether the offlet is tiered across customer, vendor partner and vendor deployments. The offlet topology further describes asset-related offering capabilities, such as software that needs to be installed on the asset via the asset platform.

In the illustrative embodiment, the offlet topology acts as an overlay onto the infrastructure topology. Accordingly, the offering does not need to be concerned about how information travels between the asset and the offering platform. Instead, the offering may address, for example, collecting the information it needs to fulfill the offlet, processing to perform to fulfill the offlet, and deployment considerations that may affect supporting services it may need. Offlet topologies are based on the deployment capabilities of the offlet itself, such as where the offlet can be deployed (e.g., which offering platform), the different roles the offlet may play, and the relationships it can maintain.

Figure 45:
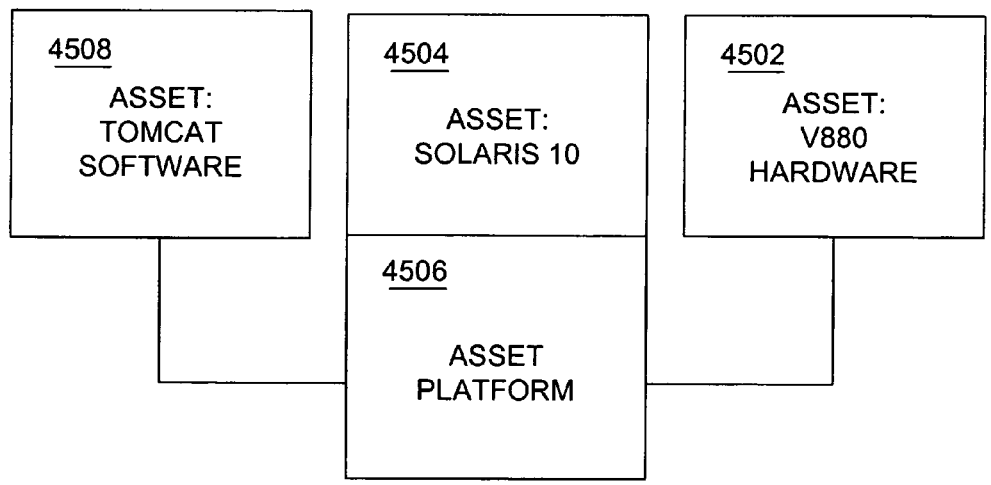
FIG. 45 shows a illustrative inter-asset topology.

As described above with reference to FIGS. 17 and 18, discovered assets are related to offerings. The offering platforms each manage an infrastructure topology of registered assets. Information regarding discovered assets is provided to the offering platforms via the asset platforms, which create associations within their known assets using the information model associations. Assets and their relationships are discovered and connections built in the context of the offering. Thus, each offering may have different asset topologies to operate against. FIG. 45 shows an illustrative inter-asset topology. A Sun Microsystems V880 hardware system 4502 is running Solaris 10 operating system 4504. An asset platform 4506 is installed on the Solaris 10 operating system and the operating system is running Tomcat software 4508. The asset platform registers the associations of the known connected assets with the offering platform.

Figure 46:
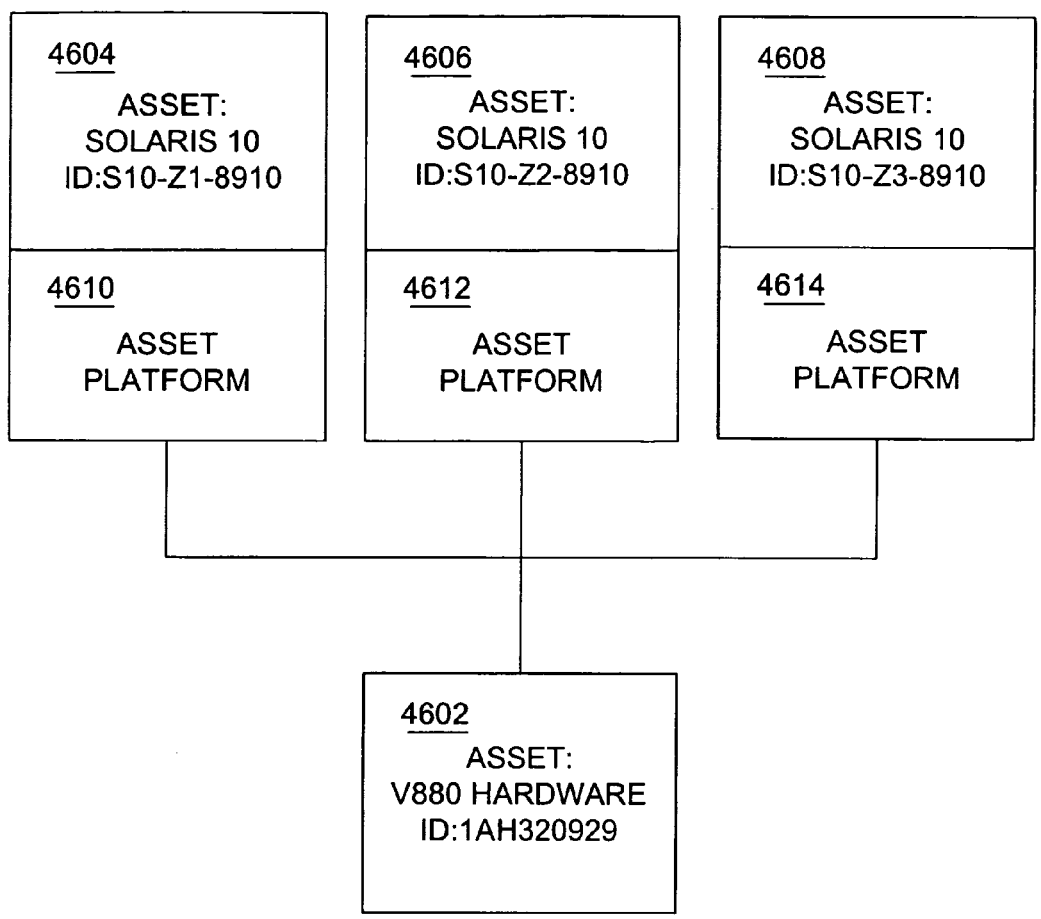
FIG. 46 illustrates another inter-asset topology.

FIG. 46 shows a more complex illustrative topology. This shows how multiple asset platforms and other virtualization concepts can make the topology more complex. The V880 hardware system 4602 is now running three instances of the Solaris operating system 4604, 4606, and 4608 in containers. An asset platform is provisioned to each container (i.e., asset platforms 4610, 4612, and 4614, respectively). During the discovery process each of the three asset platforms recognize the V880 hardware system. Since an asset identifier is unique and predictable, each of the asset platforms will discover the V880 hardware platform with the same id (1ah320929 in the example). This will allow the respective offering platform to build a topology which shows that each of the Solaris operating system instances are dependent on the same v880 hardware system.

Figure 47:
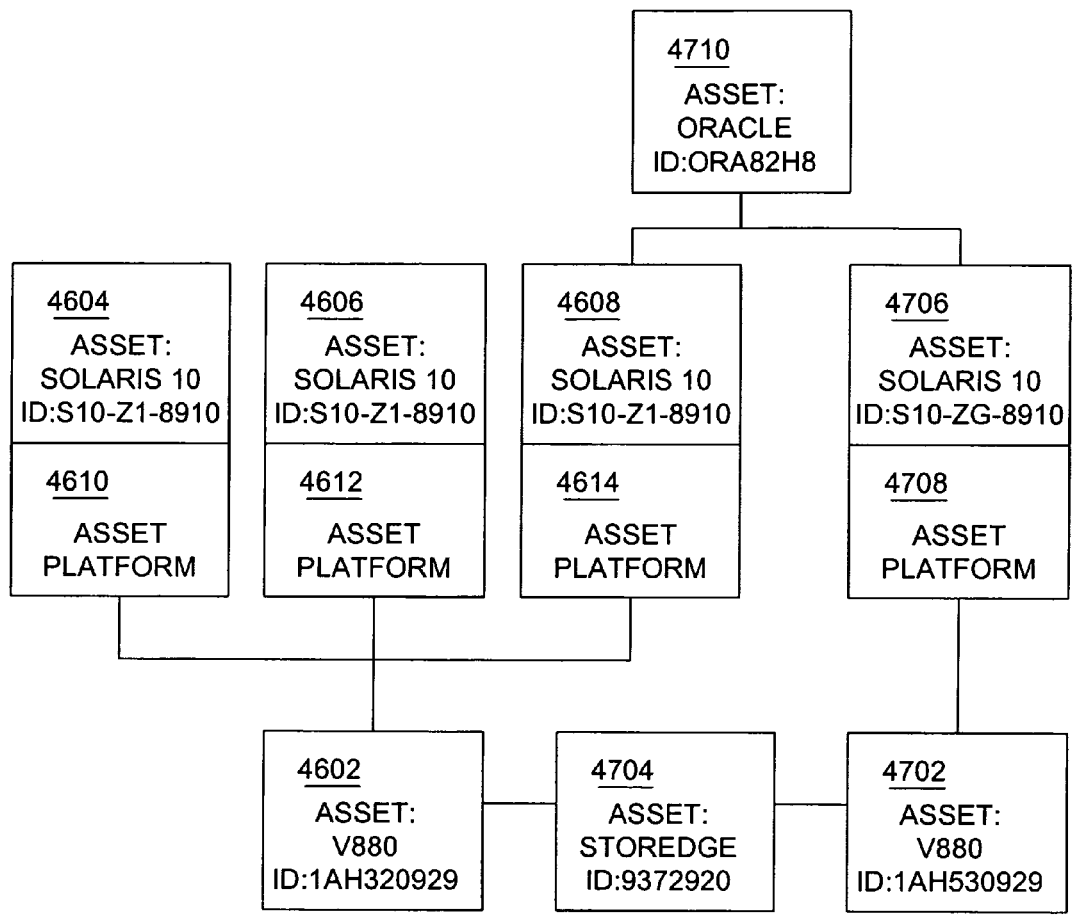
FIG. 47 depicts yet another inter-asset topology.

FIG. 47 shows another illustrative topology. In this illustrative example, the topology also includes a second V880 hardware system 4702, a storage device 4704, another instance of the Solaris operating system 4706 associated with another asset platform 4708, and an instance of Oracle database software 4710. Using rules such as those described above, the offering platform understands that the loss of the V880 hardware system 4602 will not take down the Oracle database software application 4710. An availability offering on the offering platform would recognize that the second V880 hardware system 4702 can keep the application running.

The illustrative infrastructure topology of FIG. 47 is based on the concept of connected assets and offerings are entitled and applied to assets or classes of assets. For example, an availability offering is applied to the Oracle database software 4710. This offering is responsible for availability services for the topology that underpins that Oracle database software. The offering platform can link databases and other knowledge to the topology. For example a CMDB may contain detailed configuration information about the V880 hardware system 4702, which may be linked to the topology by the unique identifier for that asset. Accordingly, the topology provides the offlet with a dependable mechanism for identifying where data came from and how to deliver services to specific end points.

For users or assets to gain access to offlet features, those features are enabled on the asset or on the respective server. Offerings in the system may be delivered by provisioning their elements in an instance of an offering platform. Offlets may also be provisioned into an asset platform. When provisioning an offering, a deployment package describes relationships with offlets that are not installed on the offering platform where the offering is being deployed. The deployment package also describes the connection mode required for the offlet. As part of the provisioning process on the offering platform, the communications management service binds the offlet to the respective communication channel for the connection mode.

Since the components of an offering may be deployed in this manner, different mechanisms may be employed for customers to obtain offering. For example, an offering may be provisioned to an offering platform either by manually provisioning the offering or by automatically provisioning the offering. Provisioning a new offering onto an offering platform, whether manually or automatically, installs the new offering and registers it with the local offering registry on that offering platform. This enables relevant elements of the offering to be automatically be provisioned to the appropriate asset platforms and for users accessing the offering platform portal to be able to interact with the new offering.

Figure 48:
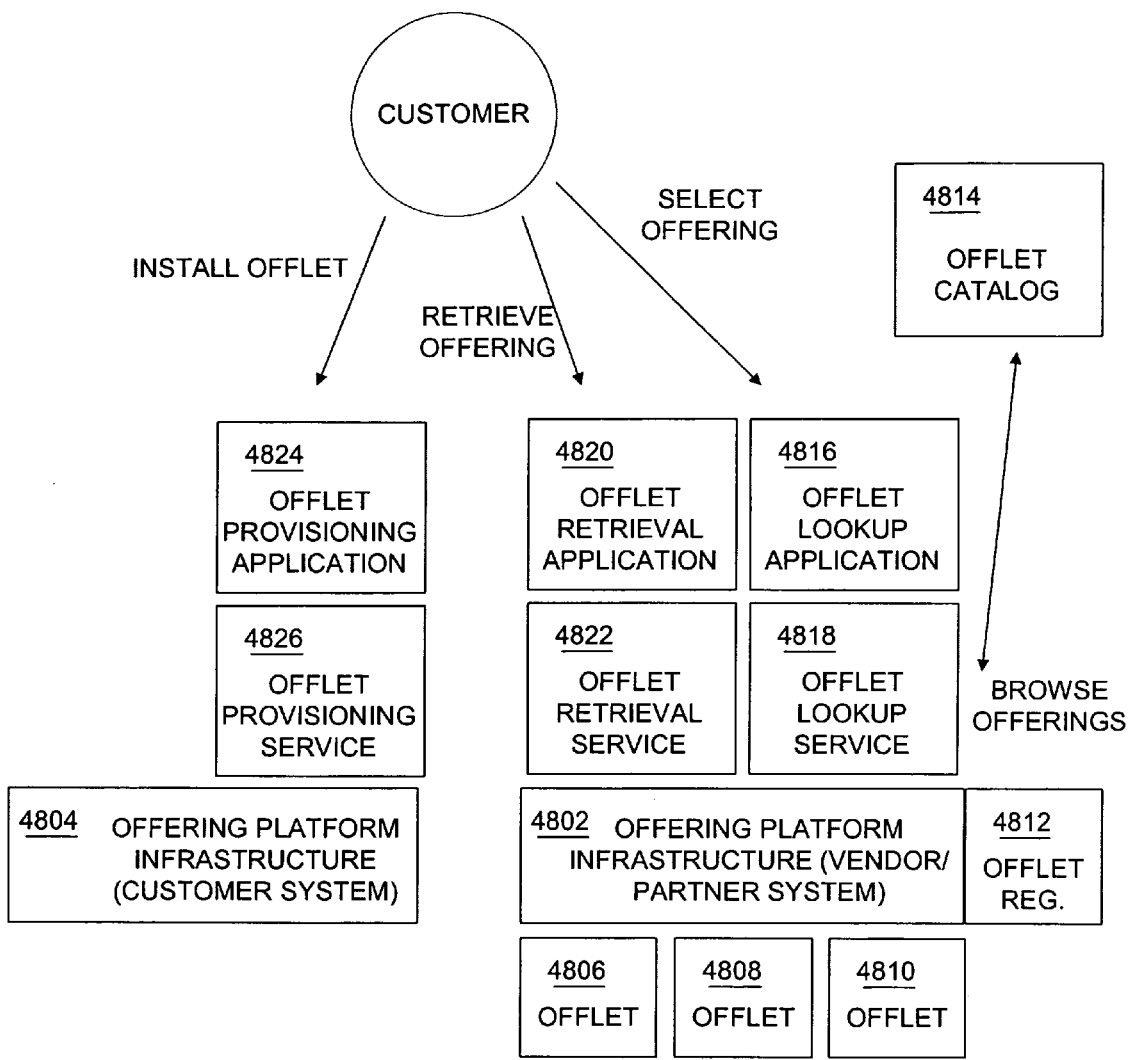
FIG. 48 depicts a functional block diagram of a manual offlet provisioning.

A customer may want to provision offlets onto their customer system manually, for example to maintain control of their environments, to have the ability to take an offering through the customer's own internal quality assurance process, or to maintain privacy and security of their internal networks. FIG. 48 depicts a functional block diagram of an illustrative manual provisioning of an offering on a customer system. In the example, the customer can retrieve an offering from a vendor system or vendor partner system offering platform 4802 and install the offering on the customer system offering platform 4804. Offering platform 4802 includes three offlets 4806, 4808, and 4810. Each of these offlets is identified in the local offlet registry 4812. The customer logs onto the offering platform portal and browses the offerings that are available for the assets that are registered to the customer. These offerings are identified in the offlet catalog 4814. To view the available offerings, the customer accesses an offlet lookup application 4816, which uses an offlet lookup service 4818 to browse the offlet catalog. The customer finds a desired offering and decides to manually provision that offering. To do so, the customer selects an option to download the bits of that offering using an offlet retrieval application 4820. The offlet retrieval application uses an offlet retrieval service 4822 to obtain a copy of the offering and provide the offering to the customer, for example, as a bundle of files.

The customer then logs onto the portal of the customer system to install the offering on that system. Via the portal, the customer accesses an offlet provisioning application 4824 to install the offering. The offlet provisioning application uses an offlet provisioning service 4826 to receive the offering from the customer and register the offering with the offering platform. The offering is received, for example, by reading the offering file bundle from a computer-readable medium. The offering is registered in a manner similar to the process described above with reference to FIG. 15. Once the offering is installed on the customer system, the customer can choose the asset platforms that should have a portion of the offering component provisioned onto them.

Figure 49:
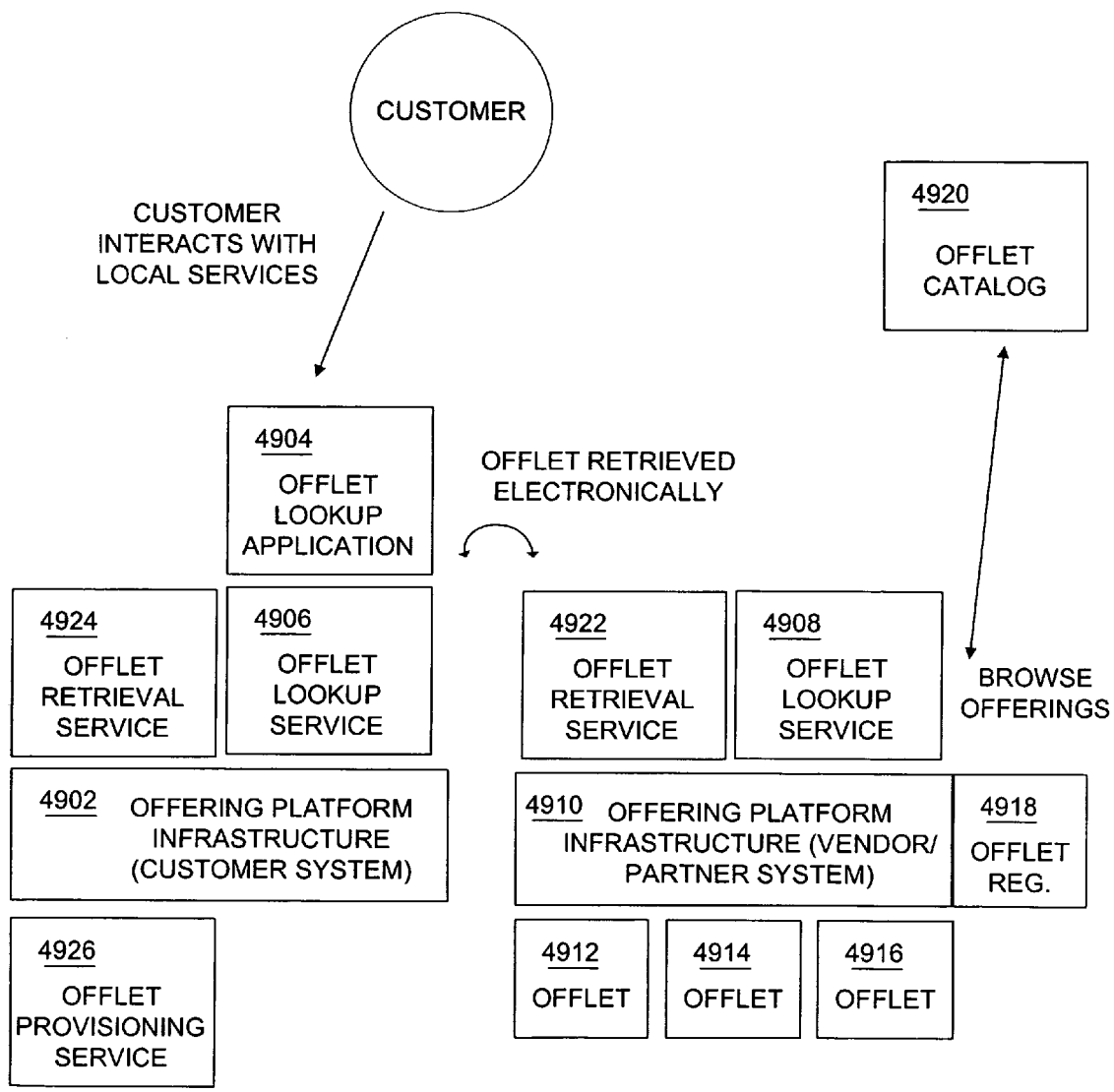
FIG. 49 is a functional block diagram of an automatic offlet provisioning.

FIG. 49 depicts a functional block diagram of an illustrative automatic provisioning of an offering on a customer system. The customer interacts with the local services on the customer system offering platform 4902 portal to browse and select a desired offering. The local services will interact with the service provider to generate the list of available offerings that can be provisioned. In the illustrative example, the customer logs onto the portal and looks up available offerings using an offlet lookup application 4904. The offlet lookup application uses an offlet lookup service 4906, which communicates with an offlet lookup service 4908 on the vendor offering platform 4910. Offering platform 4910 includes three offlets 4912, 4914, and 4916. Each of these offlets is identified in the local offlet registry 4918. The customer can view available offerings that are identified in the offlet catalog 4920. Once the customer has selected an offering to be provisioned, the local services will electronically retrieve the offering 4922 and 4924. In a manner similar to the process described above with reference to FIG. 15, an offering provisioning service 4826 installs the offering into the customer system, registers the new offering with the local offering catalog, and enables the offering for consumption by services of the customer system and asset platforms.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present implementation may be implemented as a combination of hardware and software or hardware alone. The invention may be implemented with both object-oriented and non-object-oriented programming systems. The scope of the invention is defined by the claims and their equivalents.

What is claimed is:

1. A method for managing offerings in a data processing system including a processing unit and a plurality of offering platform programs operatively connected to a distributed offering network, the method comprising the steps of:

deploying, by the processing unit, a first offering via a first offering platform program on a first system;

deploying, by the processing unit, a second offering via a second offering platform program on a second system;

creating, by the processing unit, a topology including the first offering and the second offering, wherein the topology describes where the first offering and the second offering are deployed within the distributed offering network;

determining, by the processing unit, whether there is an association between the first offering and the second offering;

including, by the processing unit, the association in the topology when it is determined that the association between the first offering and the second offering exists, wherein the association defines a hierarchical relationship between the first offering and the second offering; and providing the first offering and the second offering to an asset of a customer computer system.

2. The method of claim 1, wherein the topology identifies that asset information of the customer computer system is exchanged between the associated first offering and the second offering, and wherein the exchanged asset information defines the association between the first offering and the second offering including the hierarchical relationship.

3. The method of claim 1, wherein the topology may be dynamically modified.

4. The method of claim 1, wherein the topology further includes data on registered assets of the customer computer system including associations between the registered assets that affect providing the first offering or the second offering to the one or more assets in the customer computer system.

5. A non-transitory computer-readable medium for managing offerings and containing instructions that, when executed by a processor, cause a program in a data processing system to perform the steps of:

deploying a first offering via a first offering platform program;

deploying a second offering via a second offering platform program;

creating a topology including the first offering and the second offering, wherein the topology further includes associations of a plurality of software assets in a customer system;

determining whether there is an association between the first offering and the second offering;

including the association in the topology when it is determined that the association between the first offering and the second offering exists; and providing the first offering and the second offering to at least one of the plurality of software assets based on the topology.

6. The non-transitory computer-readable medium of claim 5, wherein the topology identifies that asset information is exchanged between the first offering and the second offering, wherein the exchanged asset information defines the associations between the plurality of software assets and the association between the first offering and the second offering, and wherein the associations between the plurality of software assets and the association between the first offering and the second offering are both included in the topology.

7. The non-transitory computer-readable medium of claim 5, wherein the topology identifies a hierarchical relationship between the first offering and the second offering.

8. The non-transitory computer-readable medium of claim 5, wherein the topology may be dynamically modified.

9. The non-transitory computer-readable medium of claim 5, wherein the associations between the plurality of software assets define a first topology for assets operated on by the first offering platform program and a second topology for assets operated on by the second offering platform program, wherein the second topology differs at least in part from the first topology.

10. A data processing system for managing offerings and having a plurality of offering platform programs operatively connected to a distributed offering network, the data processing system comprising:

a processing unit configured to execute a program that is stored in a memory;

the memory, coupled to the processing unit, configured to store the program; and the program, that when executed by the processor, performs the steps of:

deploy a first offering via a first offering platform program;

deploy a second offering via a second offering platform program;

create a topology including the first offering and the second offering;

determine whether there is an association between the first offering and the second offering;

include the association in the topology when it is determined that the association between the first offering and the second offering exists, wherein the topology defines locations in the distributed offering network for the first offering platform program and the second offering platform program, and wherein the association defines a hierarchical relationship between the first offering and the second offering; and provide the first offering and the second offering to at least one software or hardware asset in the data processing system based on the hierarchical relationship between the first offering and the second offering.

11. The data processing system of claim 10, wherein the topology identifies that asset information is exchanged between the first offering and the second offering, and wherein the exchanged asset information defines associations between two or more of the software or hardware assets in the data processing system.

12. The data processing system of claim 10, wherein the topology may be dynamically modified.

* * * * *